(12) United States Patent
Lee et al.

(10) Patent No.: US 10,222,840 B2
(45) Date of Patent: Mar. 5, 2019

(54) DISPLAY APPARATUS AND CONTROLLING METHOD THEREOF

(71) Applicant: Samsung Electronics Co., Ltd., Suwon-si, Gyeonggi-do (KR)

(72) Inventors: Yong-yeon Lee, Suwon-si (KR); Dong-goo Kang, Seoul (KR); Hae-yoon Park, Seoul (KR); Yeo-jun Yoon, Suwon-si (KR); Sang-ok Cha, Suwon-si (KR); Ji-yeon Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 14/884,162

(22) Filed: Oct. 15, 2015

(65) Prior Publication Data
US 2016/0110010 A1 Apr. 21, 2016

Related U.S. Application Data

(60) Provisional application No. 62/064,149, filed on Oct. 15, 2014.

(30) Foreign Application Priority Data

May 26, 2015 (KR) .......................... 10-2015-0072967

(51) Int. Cl.
*G06F 1/16* (2006.01)
*G06F 3/0488* (2013.01)
(Continued)

(52) U.S. Cl.
CPC .......... *G06F 1/1692* (2013.01); *G06F 1/1624* (2013.01); *G06F 1/1643* (2013.01);
(Continued)

(58) Field of Classification Search
CPC .... G06F 1/1692; G06F 1/1643; G06F 3/0488; G06F 1/1624; G06F 2203/04803;
(Continued)

(56) References Cited

U.S. PATENT DOCUMENTS

2009/0295731 A1* 12/2009 Kim ...................... G06F 1/1616
345/168
2011/0187655 A1* 8/2011 Min ...................... G06F 1/1643
345/173
(Continued)

FOREIGN PATENT DOCUMENTS

| JP | 2011-248209 A | 12/2011 |
| JP | 2011-250165 A | 12/2011 |
| KR | 10-2009-0129193 A | 12/2009 |

*Primary Examiner* — Aneeta Yodichkas
(74) *Attorney, Agent, or Firm* — Jefferson IP Law, LLP

(57) ABSTRACT

A display apparatus is provided. The display apparatus includes a first touch screen, a second touch screen overlaid with or unfolded from the first touch screen and projecting a screen on the first touch screen when the second touch screen overlays the first touch screen, a sensing unit sensing a disposition form of the first touch screen and the second touch screen, and a control unit displaying a user interface (UI) element corresponding to a user touch on at least one of the first touch screen and the second touch screen depending on the disposition form of the sensed two touch screens.

18 Claims, 49 Drawing Sheets

(51) Int. Cl.
*G06F 3/0482* (2013.01)
*H04M 1/725* (2006.01)
*H04M 1/02* (2006.01)

(52) U.S. Cl.
CPC ........ *G06F 3/0488* (2013.01); *H04M 1/0235* (2013.01); *H04M 1/72519* (2013.01); *G06F 3/0482* (2013.01); *G06F 2203/04803* (2013.01); *G06F 2203/04804* (2013.01); *H04M 2250/16* (2013.01); *H04M 2250/22* (2013.01)

(58) Field of Classification Search
CPC ........ G06F 2203/04804; G06F 3/0482; H04M 1/0235; H04M 1/72519; H04M 2250/22; H04M 2250/16
See application file for complete search history.

(56) References Cited

U.S. PATENT DOCUMENTS

| | | | |
|---|---|---|---|
| 2014/0123038 A1* | 5/2014 | Ahn | G06F 3/0488 715/761 |
| 2015/0234507 A1* | 8/2015 | Chun | G06F 1/1616 345/173 |

* cited by examiner

FIG. 8

| INTERACTION | | TOUCH ONLY | TOUCH + SLIDE | SLIDE ONLY | |
|---|---|---|---|---|---|
| INITIAL STATE | | | | SINGLE ACTION | MULTI ACTION |
| COMPLETELY OVERLAID | | TOUCH ONLY TRANSPARENT SCREEN | UNFOLD WHILE TOUCHING | UNFOLD | UNFOLD AND THEN OVERLAY |
| PARTIALLY OVERLAY | | DISTINGUISH TOUCH IN OVERLAID REGION OF TRANSPARENT+MAIN TOUCH | UNFOLD/OVERLAY WHILE TOUCHING | UNFOLD/OVERLAY | UNFOLD AND THEN OVERLAY /OVERLAY AND THEN UNFOLD |
| COMPLETELY UNFOLD | | DISTINGUISH TOUCH IN CONNECTED REGION OF TRANSPARENT+MAIN TOUCH | OVERLAY WHILE TOUCHING | OVERLAY | OVERLAY AND THEN UNFOLD |

FIG. 11A
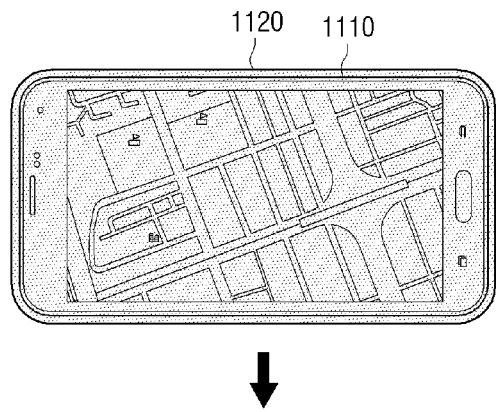
FIG. 11B
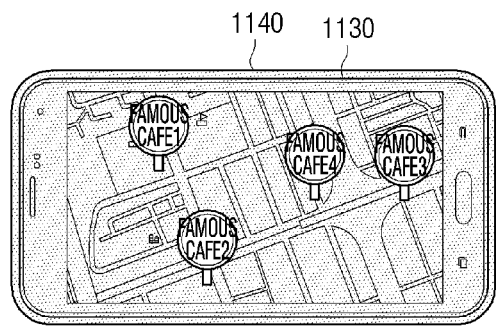
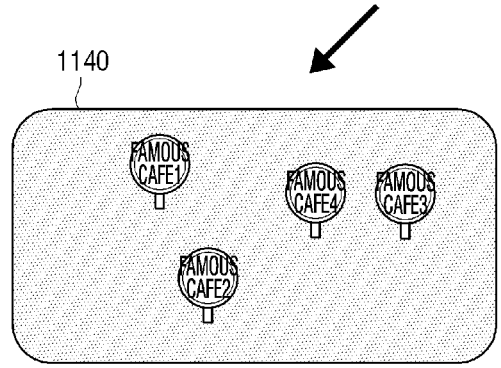 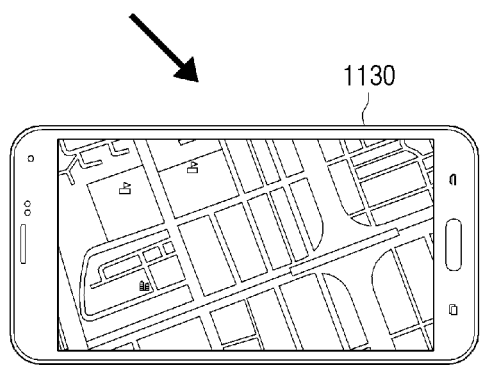

FIG. 28
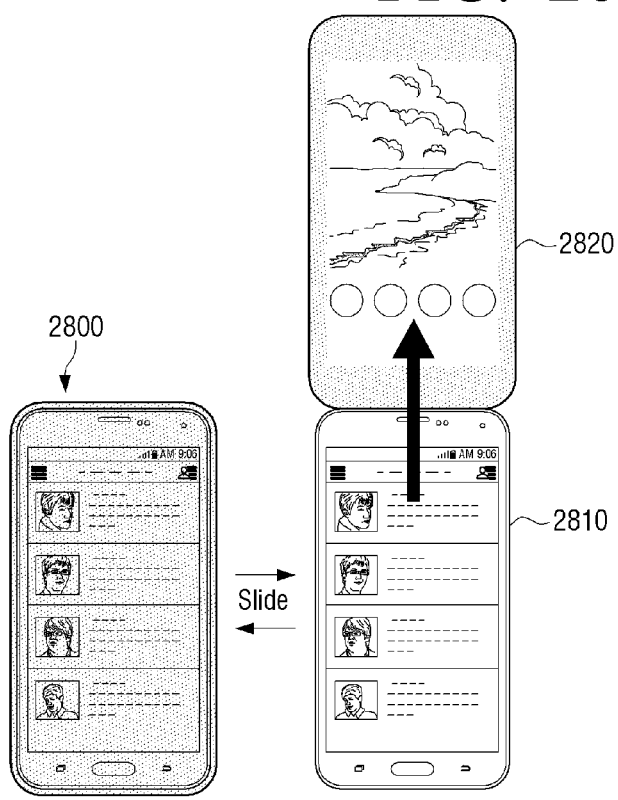
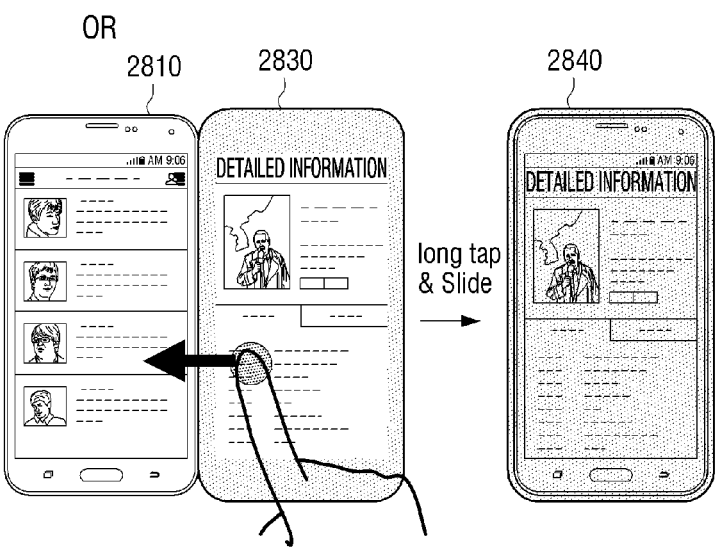

FIG. 48
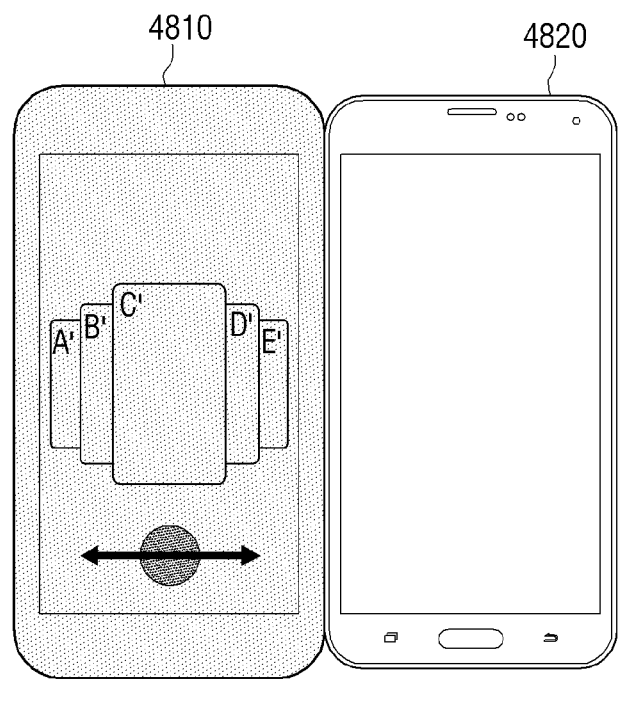
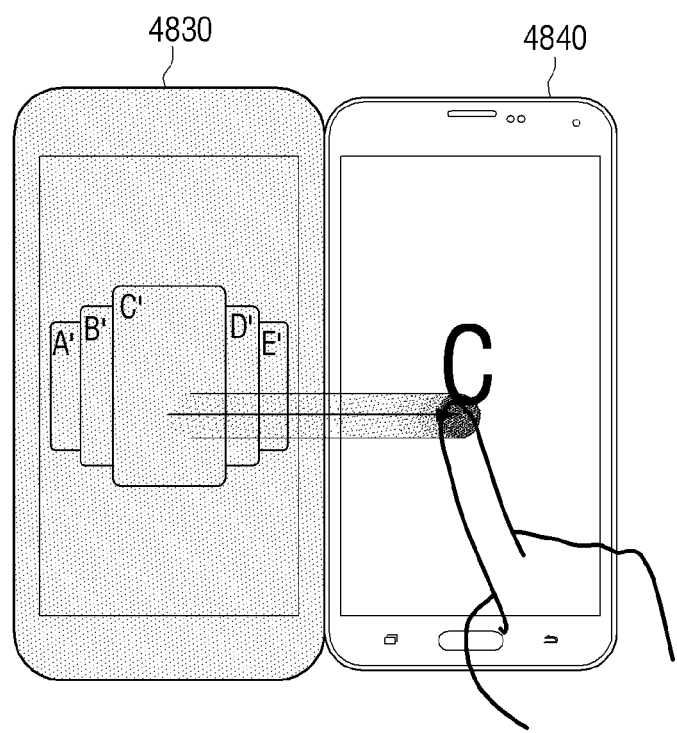

DISPLAY APPARATUS AND CONTROLLING METHOD THEREOF

CROSS-REFERENCE TO RELATED APPLICATION(S)

This application claims the benefit under 35 U.S.C. § 119(e) of a U.S. Provisional application filed on Oct. 15, 2014 in U.S. Patent and Trademark Office and assigned Ser. No. 62/064,149, and under 35 U.S.C. § 119(a) of a Korean patent application filed on May 26, 2015 in the Korean Intellectual Property Office and assigned Serial No. 10-2015-0072967, the entire disclosure of each of which is hereby incorporated by reference.

TECHNICAL FIELD

The present disclosure relates to a display apparatus and a controlling method thereof. More particularly, the present disclosure relates to a display apparatus and a controlling method thereof capable of displaying various user interface (UI) elements using both a general display and a transparent display.

BACKGROUND

With the development of electronic technologies, various types of display apparatuses have been used in various applications. In particular, studies on a next generation display apparatus like a transparent display apparatus have been actively conducted in recent years.

A transparent display apparatus has a transparent nature to project a background behind the display apparatus. Typically, a display panel has been manufactured using opaque semiconductor compounds such as silicon (Si) and gallium arsenide (GaAs). However, various applications which may not be handled by the typical display panel have been developed. To keep pace therewith, efforts to develop a new type of electronic device have been conducted. One result of these efforts is the transparent display apparatus.

The transparent display apparatus includes a transparent oxide semiconductor film and thus has a transparent nature. Upon using the transparent display apparatus, a user may watch information through a screen of the transparent display apparatus while watching backgrounds positioned behind the transparent display apparatus. Therefore, the transparent display apparatus may address spatial and temporal restrictions of the typical display apparatuses and therefore may be conveniently used for various purposes under various environments.

However, the traditional user is used to the typical display apparatus and therefore an apparatus having both a transparent display and a typical display has been requested and various interaction methods for the apparatus have been requested.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for displaying various user interface (UI) elements using both a general display and a transparent display.

Another aspect of the present disclosure is to provide an image processing apparatus and an image processing method capable of performing optimum image processing to fit a producer's intention of image contents by using metadata which includes flag information indicating whether to perform the image processing and image processing information.

In accordance with an aspect of the present disclosure, a display apparatus is provided. The display apparatus includes a first touch screen, a second touch screen overlaid with or unfolded from the first touch screen and configured to project a screen on the first touch screen when the second touch screen overlays the first touch screen, a sensing unit configured to sense a disposition form of the first touch screen and the second touch screen, and a control unit configured to display a user interface (UI) element corresponding to a user touch on at least one of the first touch screen and the second touch screen depending on the disposition form of the sensed two touch screens.

The control unit may be further configured to display the UI element corresponding to the user touch received from the second touch screen on the first touch screen in a state in which the second touch screen overlays the first touch screen.

The control unit may be further configured to display a new UI element on the second touch screen when the second touch screen is unfolded, in a state in which the user touch on the second touch screen is sensed.

The new UI element displayed on the second touch screen may correspond to the UI element displayed on the first touch screen projected to a user touched area on the second touch screen.

The UI element displayed on the first touch screen may be at least one of a menu, a thumbnail, and a contacts list of an application which is being driven and the UI element displayed on the second touch screen may be at least one of a lower menu, an image, and list information.

The new UI element displayed on the second touch screen may be notice information corresponding to a notification displayed on the first touch screen.

The control unit may extend the UI element displayed on the first touch screen to be displayed on the first touch screen and the second touch screen, when the second touch screen is unfolded, in a state in which the user touch on the second touch screen is not sensed.

The second touch screen may be slid on the first touch screen.

The second touch screen may be slid in plural directions in a state in which the second touch screen overlays the first touch screen and the control unit may display different UI elements on the second touch screen depending on the sliding direction.

The control unit may perform an event corresponding to the UI element displayed on the first touch screen when the disposition form of the touch screen is continuously changed within a predetermined time.

The event may be a bookmark or a capture of a webpage displayed on the first touch screen.

The control unit may display a new UI element by changing a display size of the UI element depending on how much the first touch screen and the second touch screen overlay each other.

The control unit may display the UI element displayed on the second touch screen on the first touch screen when the second touch screen overlays the first touch screen with the user touch on the second touch screen and display the UI element displayed on the first touch screen on the first touch screen when the second touch screen overlays the first touch screen without the user touch on the second touch screen.

The control unit may change the UI element displayed on the second touch screen to a new UI element corresponding to the UI element displayed on the first touch screen and display the new UI element, in a state in which the UI element displayed on the first touch screen is kept, when the second touch screen overlays the first touch screen without the user touch of the second touch screen.

In accordance with another aspect of the present disclosure, a controlling method of a display apparatus having a first touch screen and a transparent second touch screen is provided. The controlling method includes displaying a screen on the first touch screen, sensing a disposition form of the first touch screen and the second touch screen, and displaying a UI element corresponding to a user touch on at least one of the first touch screen and the second touch screen depending on the disposition form of the sensed two touch screens.

In the displaying of the UI element, the UI element corresponding to the user touch received from the second touch screen may be displayed on the first touch screen when the second touch screen overlays the first touch screen.

In the displaying of the UI element, a new UI element may be displayed on the second touch screen when the second touch screen is unfolded, in a state in which the user touch on the second touch screen is sensed.

The new UI element displayed on the second touch screen may correspond to the UI element displayed on the first touch screen projected to a user touched area for the second touch screen.

In the displaying of the UI element, the UI element displayed on the first touch screen may extend to be displayed on the first touch screen and the second touch screen, when the second touch screen is unfolded, in a state in which the user touch on the second touch screen is not sensed.

In accordance with another aspect of the present disclosure, in a computer readable recording medium including a program for executing a controlling method of a display apparatus having a first touch screen and a transparent second touch screen, the controlling method of a display apparatus is provided. The controlling method includes displaying a screen on the first touch screen, sensing a disposition form of the first touch screen and the second touch screen, and displaying a UI element corresponding to a user touch on at least one of the first touch screen and the second touch screen depending on the disposition form of the sensed two touch screens.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram for describing an example of various interactions depending on a disposition form of a first touch screen and a second touch screen according to an embodiment of the present disclosure;

FIGS. 9A, 9B, 10A, 10B, 10C, 11A, 11B, 12, and 13 are diagrams for describing various examples of a first interaction in a state in which a first touch screen and a second touch screen overlay each other according to various embodiments of the present disclosure;

FIGS. 27, 28, 29, 30, 31A, and 31B are diagrams for describing examples of performing different interactions depending on a moving direction of a second touch screen in a state in which a first touch screen and the second touch screen overlay each other according to various embodiments of the present disclosure;

FIGS. 47 and 48 are diagrams for describing a bookmarking interaction according to various embodiments of the present disclosure.

Throughout the drawings, it should be noted that like reference numbers are used to depict the same or similar elements, features, and structures

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'first', 'second', and the like, may be used to describe various components, but the components are not to be construed as being limited by the terms. The terms are used to distinguish one component from another component.

Terms used in the present specification are used only in order to describe various embodiments rather than limiting the scope of the present disclosure. It will be further understood that the terms "comprises" or "comprised of" used in this specification, specify the presence of features, numerals, steps, operations, components, parts mentioned in this specification, or a combination thereof, but do not preclude the presence or addition of one or more other features, numerals, steps, operations, components, parts, or a combination thereof.

In the various embodiments, a 'module' or a 'unit' may perform at least one function or operation, and be implemented by hardware or software or be implemented by a combination of hardware and software. Further, a plurality of 'modules' or a plurality of 'units' are integrated into at least one module except for the 'module' or 'unit' which needs to be implemented by specific hardware and thus may be implemented by at least one processor (not illustrated).

Hereinafter, various embodiments of the present disclosure will be described with reference to the accompanying drawings.

Figure 1:
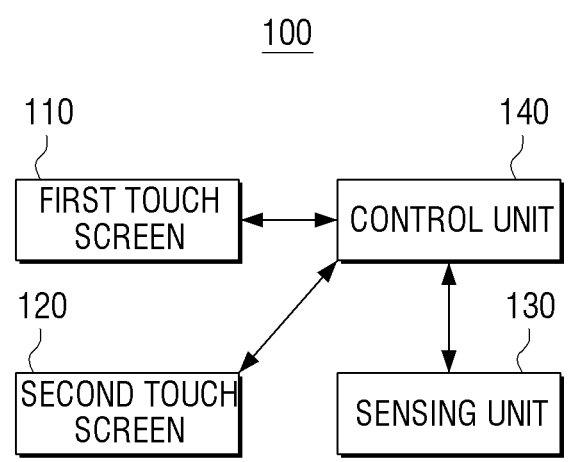
FIG. 1 is a block diagram schematically illustrating a configuration of a display apparatus according to an embodiment of the present disclosure.

FIG. 1 is a block diagram schematically illustrating a configuration of a display apparatus according to an embodiment of the present disclosure. A display apparatus 100 of FIG. 1 may be implemented as various types of apparatuses such as television (TV), a personal computer (PC), a laptop PC, a cellular phone, a tablet PC, a personal digital assistant (PDA), a Moving Picture Experts Group phase 1 or phase 2 (MPEG-1 or MPEG-2) audio layer-3 (MP3) player, a kiosk, a digital photo frame, and a table display apparatus. When the display apparatus 100 is implemented as portable apparatuses such as the cellular phone, the tablet PC, the PDA, the MP3 player, and the laptop PC, they may also be called a mobile device but will be commonly called a display apparatus in the present specification.

Referring to FIG. 1, the display apparatus 100 may include a first touch screen 110, a second touch screen 120, a sensing unit 130, and a control unit 140.

The first touch screen 110 may display an image and sense a user touch. The first touch screen 110 may display an image and sense a user operation. The first touch screen 110 may be implemented as a combination of a display apparatus which may display an image and a touch panel which may sense a user operation on the display apparatus. Meanwhile, although it is described above that the touch screen senses the user touch, the touch screen may not only sense the user touch but may also sense a touch by touch objects (for example, a stylus pen, etc.) upon implementation. For example, the touch screen may be a resistive touch screen or a capacitive touch screen.

The second touch screen 120 may display an image and sense a user touch. Further, the second touch screen 120 may display a user interface (UI) element in a state in which things positioned behind the display apparatus 100 are transparently projected. Further, the second touch screen 120 may overlay the first touch screen 110 or may be unfolded from the first touch screen 110. Therefore, if the second touch screen 120 overlays the first touch screen 110, the second touch screen 120 may display another UI element in a state in which it transparently projects the UI elements displayed on the first touch screen 110.

Further, if the second touch screen 120 is unfolded from the first touch screen 110, the second touch screen 120 may display the UI elements in the state in which things positioned behind the display apparatus 100 are transparently projected. Herein, the UI elements may include an image, a text, an application execution screen, a web browser screen, etc.

The second touch screen 120 may be implemented as a transparent touch screen which may display an image and sense a user operation and may also be implemented as a combination of a transparent display which may display an image and a transparent touch panel which may sense the user operation on the transparent display.

The sensing unit 130 senses a disposition form of the first touch screen 110 and the second touch screen 120. In more detail, the sensing unit 130 may sense whether the first touch screen 110 and the second touch screen 120 overlay each other or are unfolded from each other.

Further, if the first touch screen 110 and the second touch screen 120 do not overlay each other, the sensing unit 130 may sense how much the first touch screen 110 and the second touch screen 120 are unfolded from each other and if the two touch screens move in a sliding scheme, and/or may sense how much the first touch screen 110 and the second touch screen 120 overlay each other. The sensing unit 130 may include various elements and may use hall sensors and electromagnets (or magnets) disposed in the first touch screen 110 and the second touch screen 120, respectively, to determine whether the two touch screens contact each other. For example, when the second touch screen 120 is movable on the first touch screen 110 by the sliding scheme, the sensing unit 130 may also use the plurality of hall sensors disposed at a predetermined interval in a sliding direction to sense how much the second touch screen 120 overlays the first touch screen 110.

Further, when the second touch screen 120 and the first touch screen 110 overlay each other or are unfolded from each other by a hinge, the sensing unit 130 may also use a sensor sensing an angle of the hinge to sense an angle between the two touch screens.

The control unit 140 controls each component in the display apparatus 100. In more detail, the control unit 140 may display a UI element corresponding to the user touch on the first touch screen 110 and the second touch screen 120 on at least one of the first touch screen 110 and the second touch screen 120. In this case, the control unit 140 may determine the touch screen on which the UI elements are displayed depending on the disposition form of the two touch screens and display the corresponding UI element on the determined touch screen.

For example, if the first touch screen 110 and the second touch screen 120 overlay each other, the control unit 140 may change the UI element displayed on the first touch screen 110 depending on a touch gesture sensed by the second touch screen 120.

Further, if the first touch screen 100 and the second touch screen 120 are unfolded from each other, the control unit 140 may display different contents on the first touch screen 110 and the second touch screen 120, respectively, or may separately display the same contents. A kind, a display method, a layout, etc., of the contents displayed on the first touch screen 110 and the second touch screen 120 may be variously changed depending on the various embodiments of the present disclosure. This will be described below in more detail.

As described above, the display apparatus 100 according to an embodiment of the present disclosure may use the two touch screens to provide various types of information to a user. Further, the disposition form of the two touch screens and the movement form of the two touch screens may also be used as a gesture and therefore various interactions may be possible. Therefore, the user may experience various user environments.

Meanwhile, although it is described above that the sensing unit 130 senses only the disposition form of the two touch screens, the sensing unit 130 may also sense the touch gesture of the user. In this case, the first and second touch screens, respectively, may be called first and second display units.

Further, although it is described above that the display apparatus 100 includes the two touch screens, at least three touch screens may be used upon implementation. For example, when the display apparatus includes three touch screens, only one of the three touch screens may be a transparent touch screen and two of the three touch screen may be transparent touch screens.

FIGS. 2A to 2C, 3A, and 3B, 4A to 4C, and 5A to 5C are diagrams illustrating a shape of a display apparatus according to an embodiment of the present disclosure.

Figure 2A:
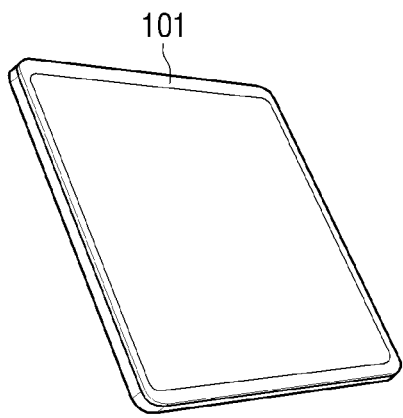
FIGS. 2A, 2B, 2C, 3A, 3B, 4A, 4B, 4C, 5A, 5B, and 5C are diagrams illustrating a shape of a display apparatus according to various embodiments of the present disclosure.
Figure 2B:
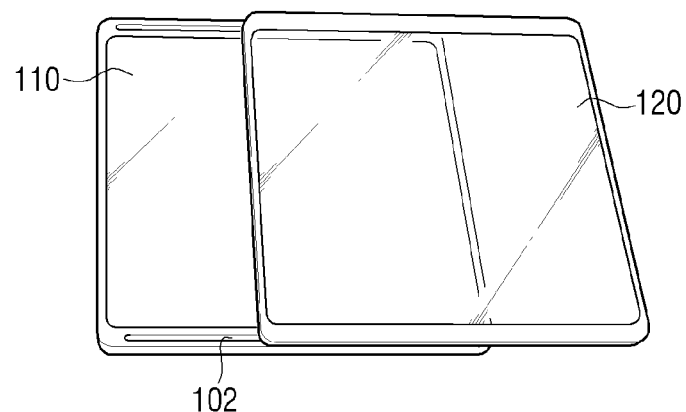
Figure 2C:
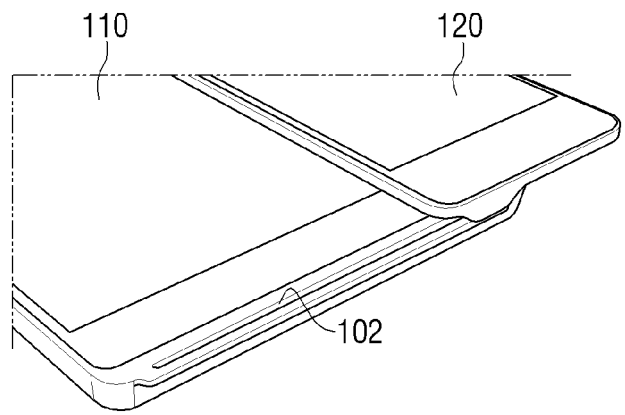

In more detail, FIGS. 2A to 2C are diagrams illustrating a shape of a display apparatus when a sliding structure is disposed on a body part 101. That is, FIG. 2A is a diagram illustrating a shape of a display apparatus in a state in which a first touch screen and a second touch screen overlay each other, FIG. 2B is a diagram illustrating a shape of a display apparatus in a state in which a second touch screen is slid, and FIG. 2C is an enlarged view of the sliding structure part.

Referring to FIGS. 2A to 2C, a body part 101 is provided with the first touch screen 110. Further, upper and lower areas in which the first touch screen 110 is disposed are provided with a sliding structure 102. Further, the second touch screen 120 is physically connected to the body part 101 through the sliding structure 102. Here, the sliding structure may be a rail structure and may be a biaxial sliding hinge.

Therefore, the second touch screen 120 may overlay the first touch screen 110 or may be unfolded from the first touch screen 110, by the sliding structure 102. Although the example illustrated describes only the case in which the second touch screen 120 is unfolded by being slid to the right of the first touch screen 110, the second touch screen 120 may be unfolded by being slid to the left of the first touch screen 110 upon implementation.

Meanwhile, the above-mentioned sliding structure 102 may include a plurality of electrical contacts and the body part 101 may provide power and an image signal to the second touch screen 120 through the corresponding contact or may also receive the touch signal sensed by the second touch screen 120.

Figures 3A, 3B:
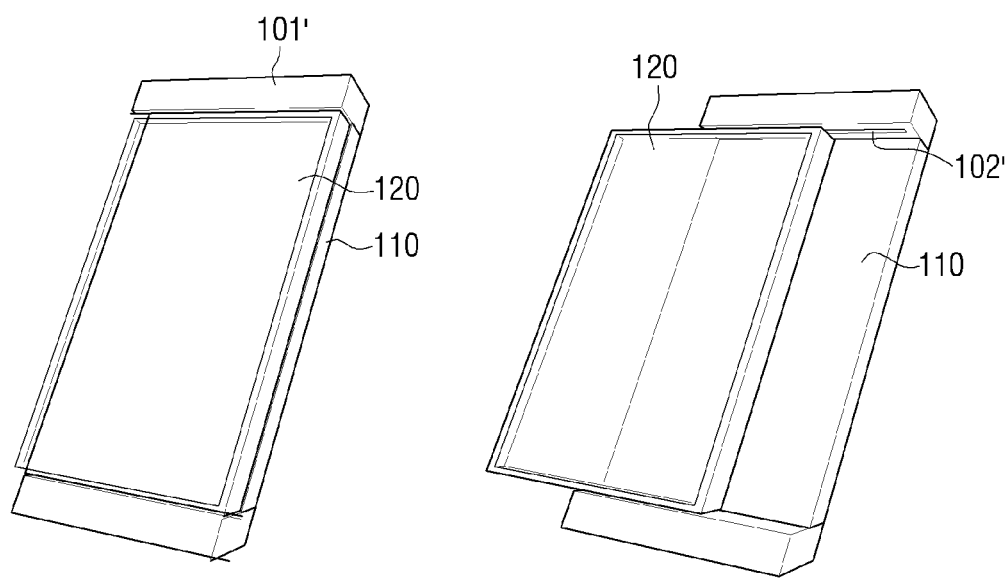

FIGS. 3A and 3B are diagrams illustrating a shape of a display apparatus when the sliding structure is disposed in a body part according to an embodiment of the present disclosure. In more detail, FIG. 3A is a diagram illustrating a shape of a display apparatus in the state in which the first touch screen 110 and the second touch screen 120 overlay each other and FIG. 3B is a diagram illustrating the shape of the display apparatus in the state in which the second touch screen 120 is slid.

Referring to FIGS. 3A and 3B, a body part 101' has protruding areas provided at upper and lower portions thereof and the first touch screen 110 is disposed between the two protruding areas. Further, sides of the protruding areas are provided with sliding structures 102' and the second touch screen 120 is physically connected to the body part 101 through the sliding structure 102'.

Therefore, the second touch screen 120 may overlay the first touch screen 110 or may be unfolded from the first touch screen 110, by the sliding structure 102'. Although the example illustrated describes only the case in which the second touch screen 120 is unfolded by being slid to the left of the first touch screen 110, the second touch screen 120 may also be unfolded by being slid to the right of the first touch screen 110 upon implementation.

Meanwhile, the above-mentioned sliding structure 102' may include a plurality of electrical contacts and the body part 101' may provide power and an image signal to the second touch screen 120 through the corresponding contact or may receive the touch signal sensed by the second touch screen 120.

Figure 4A:
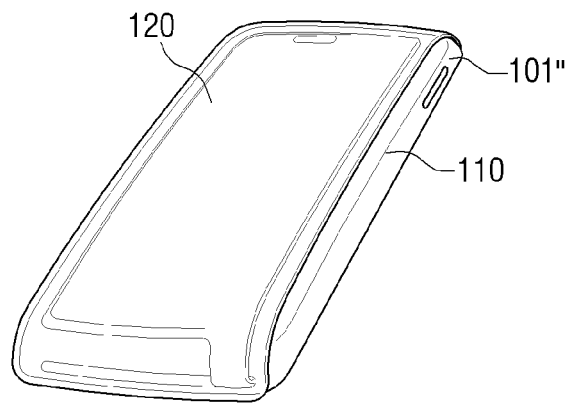
Figure 4B:
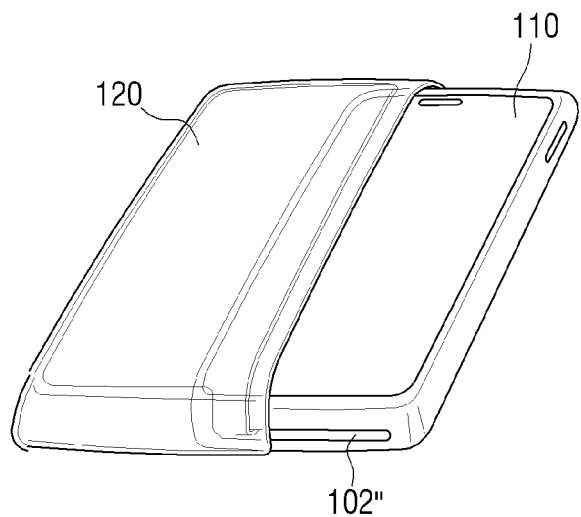
Figure 4C:
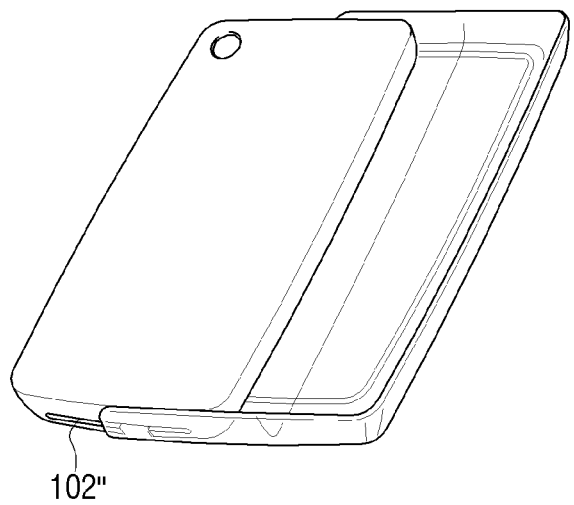

FIGS. 4A to 4C are diagrams illustrating a shape of a display apparatus when a sliding structure is disposed on a side of a body part according to an embodiment of the present disclosure. In more detail, FIG. 4A is a diagram illustrating the shape of the display apparatus in the state in which the first touch screen 110 and the second touch screen 120 overlay each other, FIG. 4B is a diagram illustrating the shape of the display apparatus in the state in which the second touch screen 120 is slid, and FIG. 4C is a diagram illustrating the drawing of FIG. 4B from the back.

Referring to FIGS. 4A to 4C, a body part 101" is provided with the first touch screen 110. Further, the second touch screen 120 has a form to cover an upper portion of the body part 101" and is physically connected to the body part 101" through the sliding structure 102" disposed on a side of the body part 101".

Therefore, the second touch screen 120 may overlay the first touch screen 110 or may be unfolded from the first touch screen 110, by the sliding structure 102". Although the example illustrated describes only the case in which the second touch screen 120 is unfolded by being slid to the left of the first touch screen 110, the second touch screen 120 may be unfolded by being slid to the right of the first touch screen 110 upon implementation.

Meanwhile, the above-mentioned sliding structure 102" may include a plurality of electrical contacts and the body part 101 may provide power and an image signal to the second touch screen 120 through the corresponding contact or may also receive the touch signal sensed by the second touch screen 120.

Although it is described above that the second touch screen 120 is slid on the upper portion of the first touch screen 110 and thus the two touch screens overlay each other or are unfolded from each other, the second touch screen 120 may rotate around one shaft so that the two touch screens may overlay each other or may be unfolded from each other. This example will be described below with reference to FIGS. 5A to 5C.

Figure 5A:
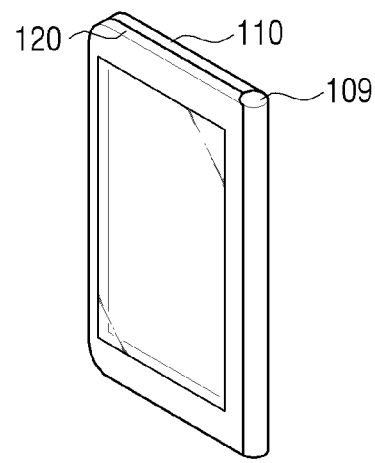
Figure 5B:
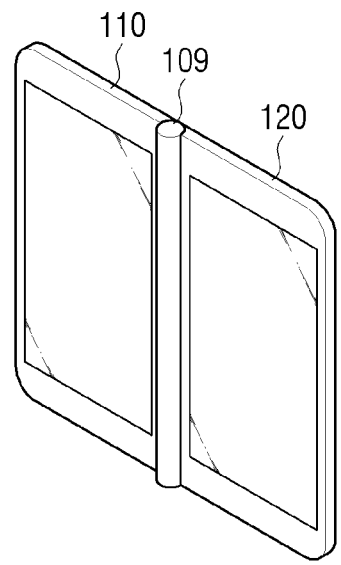
Figure 5C:
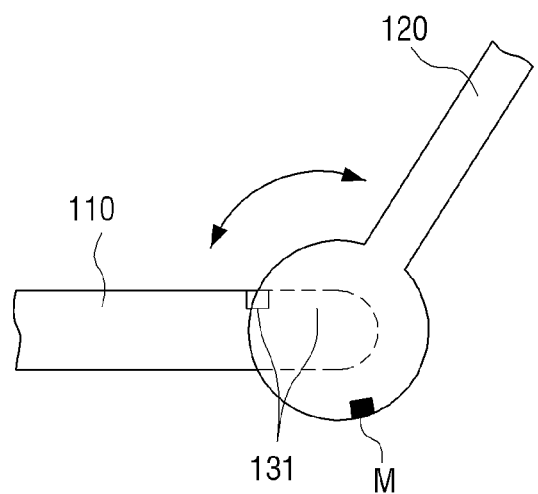

FIGS. 5A to 5C are diagrams illustrating a form of a display apparatus in which one side of a second touch screen is connected to a hinge structure according to an embodiment of the present disclosure. In more detail, FIG. 5A is a diagram illustrating a shape of a display apparatus in a state in which a first touch screen and a second touch screen overlay each other, FIG. 5B is a diagram illustrating a shape of a display apparatus in a state in which a second touch screen is slid, and FIG. 5C is a diagram illustrating a shape of a hinge.

Referring to FIGS. 5A to 5C, a hinge 109 may be integrally formed with the body part 101 and may rotate up to 360° around the rotating shaft. Similarly, the second touch screen 120 may rotate by a predetermined angle based on the first touch screen.

Therefore, the second touch screen 120 rotatably moves around a point where the hinge 109 is disposed and may overlay the first touch screen 110 or may be unfolded from the first touch screen 110 by the rotation.

Meanwhile, as illustrated, a magnet M is disposed in one area of the hinge 109 and a magnetic force sensing sensor 131 is disposed at one side of the body part 101. The magnetic force sensing sensor 131 may be implemented as several sensors having a predetermined interval, upon implementation. Here, the sensor may be a hall sensor or a rotating sensor. Therefore, the magnetic force sensing sensor 131 may sense the magnetic force of the magnet at the hinge while the hinge rotates to detect a rotating angle or a rotating direction of the hinge.

Although the example illustrated describes only the case in which the hinge is disposed at the right of the body part and thus the second touch screen 120 rotates counterclockwise, the hinge may also be disposed at the left of the body part and thus the second touch screen 120 may rotate clockwise upon implementation.

Meanwhile, unlike the foregoing embodiments of the present disclosure, as the second touch screen 120 is overlaid or unfolded, the surfaces of the second touch screen 120 seen by the user are different. That is, an upper surface of the second touch screen 120 is seen by the user in the overlaid state but a lower surface of the second touch screen 120 may be seen by the user, if unfolded. Therefore, the display apparatus 100 according to an embodiment of the present disclosure as illustrated in FIGS. 5A to 5C may change the display form of the UI elements displayed on the second touch screen 120 depending on the disposition form of the touch screen.

Meanwhile, although the example illustrated describes that the hinge 109 is integrally formed with the body part, the hinge 109 may be formed to be differentiated from the body part and the hinge 109 may also be formed to be integrally formed with the second touch screen upon implementation.

Further, although the example illustrated describes a form in which the first touch screen 110 is connected to the second touch screen 120 by one hinge 109, the first touch screen 110 may be connected to the second touch screen 120 by a dual hinge upon implementation.

Figure 6:
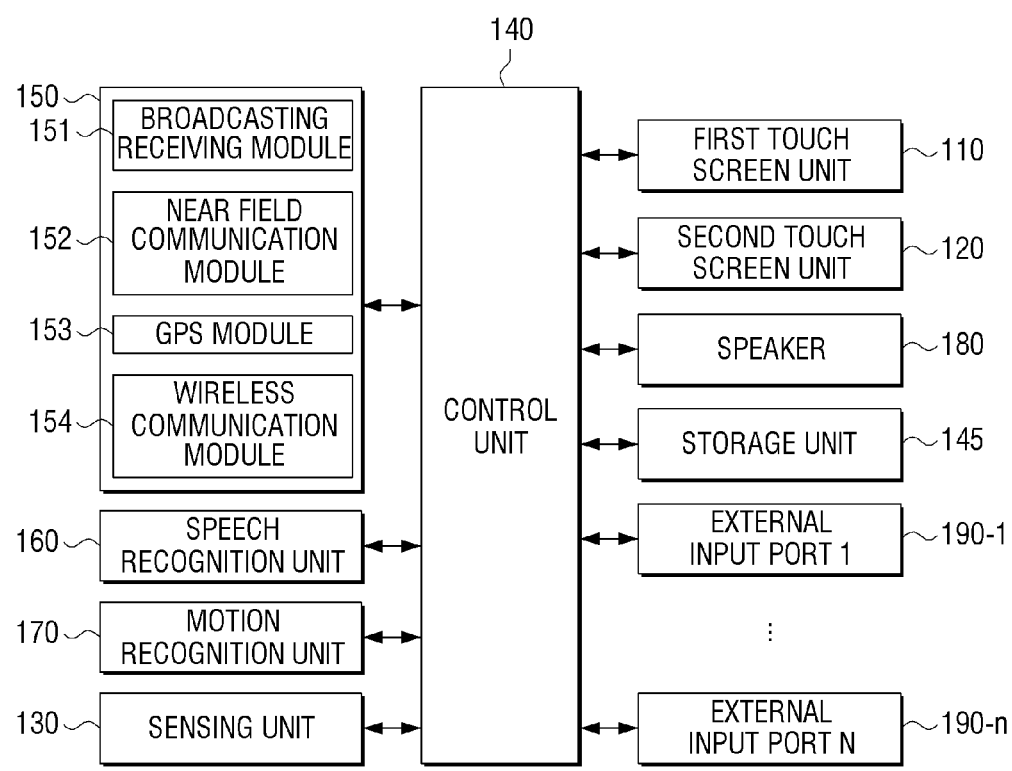
FIG. 6 is a block diagram illustrating a configuration of a display apparatus according to an embodiment of the present disclosure.

FIG. 6 is a block diagram illustrating a configuration of a display apparatus according to an embodiment of the present disclosure. In more detail, FIG. 6 is a block diagram illustrating a display apparatus implemented as a portable phone.

Referring to FIG. 6, the display apparatus may include the first touch screen 110, the second touch screen 120, the sensing unit 130, the control unit 140, a storage unit 145, a communication interface unit 150, a speech recognition unit 160, a motion recognition unit 170, a speaker 180, and external input ports 190-1 to 190-n.

The first touch screen 110 may be implemented such that a touch panel unit is disposed on various forms of displays such as a liquid crystal display (LCD), an organic light emitting diode (OLED) display, a plasma display panel (PDP), and the like.

In this case, the touch panel unit may include at least one of a touch panel and a pen recognition panel. The touch panel may sense a gesture input of a user' finger and may output a touch event value corresponding to the sensed touch signal. The touch panel may be completely mounted under all areas of the first touch screen 110 or may be mounted only under some area of the first touch screen 110. As a type to allow the touch panel to sense the gesture input of the user's finger, there may be a capacitive type and a resistive type. The capacitive type uses a scheme of calculating touch coordinates by sensing micro electricity generated by a user's body. The resistive type includes two electrode plates embedded in the touch panel and uses a scheme of calculating touch coordinates by sensing a flow of current due to a contact between the upper and lower plates at a touched point.

The pen recognition panel may sense a pen gesture input of a user depending on an operation of a user's touch pen (for example, a stylus pen, a digitizer pen, etc.) and output a pen proximity event value or a pen touch event value. The pen recognition panel may be mounted under at least one of the first touch screen 110 and the second touch screen 120.

The pen recognition panel may be implemented by, for example, an electro magnetic resonance (EMR) scheme and may sense a touch or a proximity input depending on a change in strength of electromagnetic field due to the proximity or touch of the pen. In more detail, the pen recognition panel may be configured to include an electromagnetic induction coil sensor (not illustrated) having a grid structure and an electronic signal processing unit (not illustrated) sequentially providing an alternating signal having a predetermined frequency to each loop coil of the electromagnetic induction coil sensor.

If a pen having a resonance circuit embedded therein is present around the loop coil of the pen recognition panel, a magnetic field transmitted from the corresponding loop coil generates a current based on the mutual electromagnetic induction to the resonance circuit in the pen. The induction magnetic field is generated from the coil configuring the resonance circuit within the pen based on the current and the pen recognition panel may detect the foregoing induction magnetic field from the loop coil in the signal receiving state to sense an approach position or a touched position of the pen.

The second touch screen 110 may be disposed on the transparent display unit. The transparent display unit may be implemented in various forms such as a transparent LCD type, a transparent thin-film electroluminescent panel (TFEL) type, a transparent OLED type, and a projection type.

The transparent LCD type means a transparent display apparatus in which a backlight unit is removed from an LCD apparatus currently used and a pair of polarizing plates, an optical film, a transparent thin film transistor, a transparent electrode, and the like are used. The transparent LCD apparatus has the reduced transparency due to the polarizing plate, the optical film, etc., and uses ambient light instead of the backlight unit, such that it may have reduced light efficiency but may implement a large area transparent display.

The transparent TFEL type means an apparatus using an alternating type inorganic thin film EL display (AC-TFEL) which is configured of a transparent electrode, an inorganic phosphor, and an insulating layer. The AC-TFEL is a display which passes accelerated electrons through an inorganic phosphor to excite the phosphor to emit light. When the transparent display unit 110 is implemented in the transparent TFEL type, the control unit 140 controls electrons to be projected to a proper position, thereby determining an information display position. The inorganic phosphor and the insulating layer have transparent characteristics, thereby implementing a very transparent display.

In addition, the transparent OLED type means a transparent display apparatus using a self-emission OLED. Since the organic light emitting layer is transparent, if both electrodes are used as a transparent electrode, the transparent display unit may be implemented. The OLED emits light by injecting electrons and holes into both sides of the organic light emitting layers and combining these electrons and holes within the organic light emitting layer. The transparent OLED apparatus uses the principle to inject electrons and holes into a desired position, thereby displaying information.

The sensing unit 130 may sense the disposition form of the first touch screen 110 and the second touch screen 120. In more detail, the sensing unit 130 may sense whether the first touch screen 110 and the second touch screen 120 overlay each other or are unfolded from each other.

Further, if the first touch screen 110 and the second touch screen 120 do not overlay each other, the sensing unit 130 may sense how much the first touch screen 110 and the second touch screen 120 are unfolded from each other or if the two touch screens move by the sliding scheme, and may sense how much the first touch screen 110 and the second touch screen 120 overlay each other. The sensing unit 130 may include various elements and may use hall sensors and electromagnets (or magnets) disposed in the first touch screen 110 and the second touch screen 120, respectively, to determine whether the two touch screens contact each other. For example, when the second touch screen 120 is movable on the first touch screen 110 by the sliding scheme, the sensing unit 130 may also use the plurality of hall sensors disposed at a predetermined interval in a sliding direction to sense how much the second touch screen 120 overlays the first touch screen 110.

Further, when the second touch screen 120 and the first touch screen 110 overlay each other or are unfolded from each other by a hinge, the sensing unit 130 may also use a sensor sensing the angle of the hinge to sense an angle between the two touch screens.

Further, the sensing unit 130 may sense the moving state and the touch state of the whole display apparatus 100. The sensing unit 130 may include various types of sensors such as a touch sensor, a geomagnetic sensor, an acceleration sensor, a pressure sensor, a proximity sensor, and a grip sensor.

Here, the touch sensor may be implemented as the capacitive type or the resistive type. The capacitive type uses the scheme of calculating touch coordinates by sensing micro electricity excited to the user's body when a portion of the user's body touches the surface of the display unit, using the dielectric substance coated on the surface of the display unit. The resistive type includes the two electrode plates and uses the scheme of calculating touch coordinates by sensing a flow of current due to a contact between the upper and lower plates at a touched point when the user touches the screen. As described above, the touch sensor may be implemented in various forms.

The geomagnetic sensor is a sensor for sensing the rotating state and the moving direction of the display apparatus 100 and the acceleration sensor is a sensor for sensing how much the display apparatus 100 is inclined. As described above, the geomagnetic sensor and the acceleration sensor may be used for the purpose of detecting the sliding direction of the second touch screen. Unlike this, however, the geomagnetic sensor and the acceleration sensor may also be used for the purpose of detecting the rotating state, the slope state, etc., of the display apparatus.

The pressure sensor senses an amount of pressure applied to the touch screens 110 and 120 when the user performs the touch operation and provides the sensed amount of pressure to the control unit 140. The pressure sensor may include piezo films which are embedded in the touch screens 110 and 120 to output an electric signal corresponding to the amount of pressure. Meanwhile, when the touch sensor is implemented as the resistive touch sensor, the resistive touch sensor may also serve as the pressure sensor.

The proximity sensor is a sensor for sensing an approaching motion without directly contacting the surface of the display. The proximity sensor may be implemented as various forms of sensors, such as a high frequency oscillation type forming a high frequency magnetic field to sense a current induced by magnetic field properties changed at the time of an approach of an object, a magnetic type using a magnet, a capacitive type sensing capacitance changed due to an approach of an object.

Separately from the pressure sensor, the grip sensor is a sensor disposed at an edge or a handle of the display apparatus 100 to sense a grip of a user. The grip sensor may be implemented as the pressure sensor or the touch sensor. Upon implementation, the sensing information of the grip sensor may be combined with the disposition form information of the touch screen to be used to identify or verify whether the touch screen moves by the touch or the touch screen moves without the touch.

The control unit 140 may use programs and data stored in the storage unit 145 to display UI elements on at least one of the first touch screen 110 and the second touch screen 120.

Further, the control unit 140 may perform a control operation corresponding to the corresponding event when an event is generated.

The control unit 140 includes a random access memory (RAM) (not illustrated), a read only memory (ROM) (not illustrated), a central processing unit (CPU) (not illustrated), a graphics processing unit (GPU) (not illustrated), and a bus (not illustrated). The RAM, the ROM, the CPU, the GPU, etc., may be connected to one another through a bus.

The CPU accesses the storage unit 145 to perform booting using an operating system (O/S) stored in the storage unit 145. Further, the CPU executes various operations using various programs, contents, data, and the like which are stored in the storage unit 145.

The ROM stores a set of commands for system booting. When a turn on command is input to supply power, the CPU copies the O/S stored in the storage unit 145 to the RAM according to the command stored in the ROM and executes the O/S to boot the system. When the booting is completed, the CPU copies various programs stored in the storage unit 145 to the RAM and executes the programs copied to the RAM to perform various operations. When the booting of the display apparatus 100 is completed, the GPU displays a UI screen in a display area. In more detail, the GPU may use an operator (not illustrated) and a renderer (not illustrated) to generate a screen including various objects such as an icon, an image, and a text. The operator operates attribute values, such as coordinate values, forms, sizes, and colors where each object will be displayed according to a layout of the screen. The renderer generates a screen of various layouts including an object based on attribute values which are operated by the operator. The screen generated by the renderer may be provided to the first touch screen 110 or the second touch screen 120 to be displayed in the display area of the first touch screen 110 or the second touch screen 120.

The storage unit 145 may store various programs or data associated with the operation of the display apparatus 100, setting information set by a user, system operating software, various application programs, information on an operation corresponding to a user operation content, etc.

The control unit 140 analyzes various sensing signals sensed by the sensing unit 130 to understand a user's intention and performs an operation meeting the intention. An example of an operation performed by the control unit 140 may process data acquired by communication with external devices or data stored in the storage unit 145 to perform an operation of outputting the first touch screen 110, the second touch screen 120, the speaker 180, etc. In this case, the control unit 140 may use the communication interface unit 150 to perform communication with external devices.

The communication interface unit 150 is configured to perform the communication with various types of external devices according to various types of communication schemes. The communication interface unit 150 may include various communication modules such as a broadcasting receiving module 151, a near field communication (NFC) module 152, a global positioning system (GPS) module 153, a wireless communication module 154, etc.

Here, the broadcasting receiving module 151 may include a terrestrial broadcasting receiving module (not illustrated) which includes an antenna for receiving a terrestrial broadcasting signal, a demodulator, an equalizer, etc., a digital multimedia broadcasting (DMB) module for receiving and processing a DMB broadcasting signal, etc. The NFC module 152 is a module for performing communication with external devices positioned in a short range, depending on NFC schemes such as NFC, Bluetooth, and ZigBee.

The GPS module 153 is a module for receiving a GPS signal from a GPS satellite to detect a current position of the display apparatus 100. The wireless communication module 154 is a module which is connected to an external network according to a wireless communication protocol such as Wi-Fi and institute of electrical and electronics engineers (IEEE) to perform communications. In addition, the wireless communication module 154 may further include a mobile communication module which is connected to a mobile communication network according to various mobile communication standards such as 3rd generation (3G), 3rd generation partnership project (3GPP), and long term evolution (LTE) to perform communications.

The control unit 140 may selectively enable components required to perform the user intended operations among each component of the above-mentioned communication interface unit 150 to perform the operation.

The control unit 140 may recognize a speech input or a motion input in addition to a touch operation and a moving operation of the second touch screen to perform the operation corresponding to the input. In this case, the control unit 140 may enable a speech recognition unit 160 or a motion recognition unit 170.

The speech recognition unit 160 uses a speech acquisition means such as a microphone (not illustrated) to collect a user's speech or an external sound and then transfers the collected speech or sound to the control unit 140. In the case in which the control unit 140 is operated in a speech control mode, when the user's speech coincides with a preset speech command, a task corresponding to the user's speech may be performed. As the task which may be controlled using a speech, there may be various tasks such as screen size control, a volume control, channel selection, channel zapping, display attribute control, playing, temporary stop, rewinding, fast forward winding, application execution, menu selection, and device turn on/off.

The motion recognition unit 170 uses an image pickup means (not illustrated) such as a camera to acquire a user's image and then provides the acquired user's image to the control unit 140. When being operated in a motion control mode, if the control unit 140 analyzes a user's image to determine that the user takes a motion gesture corresponding to a preset motion command, the control unit 140 performs an operation corresponding to the motion gesture. For example, various tasks such as the screen size control, the channel zapping, the device turn on/off, the temporary stop, the playing, the stop, the rewinding, the fast forward winding, and mute may be controlled by a motion. The foregoing examples such as a task controllable with a speech and a task controllable with a motion are only an example and therefore the present disclosure is not limited thereto.

In addition, external input ports 1, 2, to n 190-1 to 190-*n* may be each connected to various types of external devices to receive various data, programs, control commands, etc. In more detail, the external input ports 1, 2, to n 190-1 to 190-*n* may include a universal serial bus (USB) port, a headset port, a mouse port, a local area network (LAN) port, etc.

In addition, although not illustrated in FIG. 6, according to an embodiment of the present disclosure, the display apparatus 100 may further include an USB port to which an USB connector may be connected, various external input ports connected to various external terminals such as a headset, a mouse, and an LAN, a DMB chip receiving and processing a DMB signal, various sensors, etc.

Meanwhile, as described above, the storage unit 145 may store various programs.

Figure 7:
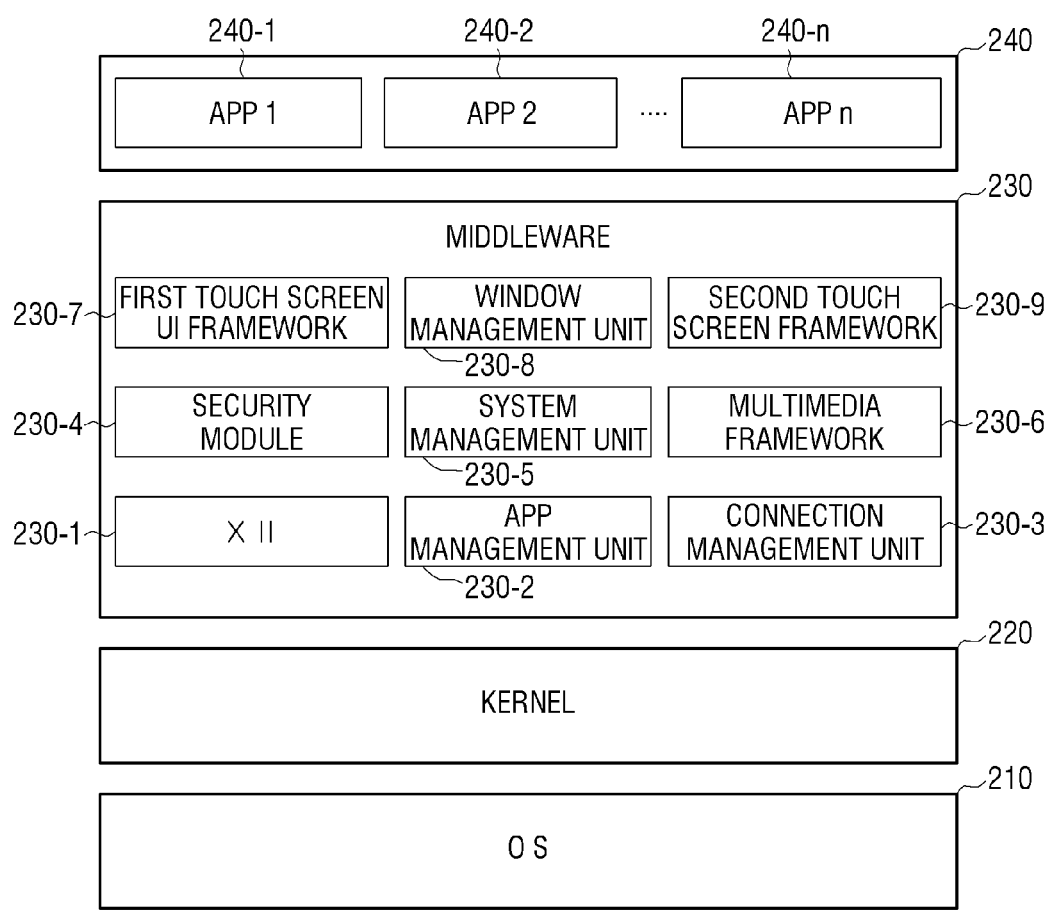
FIG. 7 is a diagram for describing a software configuration of a display apparatus according to an embodiment of the present disclosure.

FIG. 7 is a diagram for describing a software configuration of a display apparatus according to an embodiment of the present disclosure.

Referring to FIG. 7, the storage unit 145 may store software such as an OS 210, a kernel 220, a middleware 230, and an application 240.

The OS 210 serves to control and manage the general operations of hardware. That is, the OS 210 is a layer serving to perform basic functions such as hardware management, memory, and security.

The kernel 220 serves as a path through which various signals in addition to touch signals, etc., sensed by the first touch screen 110 or the second touch screen 120 are transferred to the middleware 230.

The middleware 230 includes various software modules for controlling the operation of the display apparatus 100. As illustrated in FIG. 7, the middleware 230 includes an X11 module 230-1, an application (APP) manager 230-2, a connection manager 230-3, a security module 230-4, a system manager 230-5, a multimedia framework 230-6, a first touch screen UI framework 230-7, a window manager 230-8, and a second touch screen UI framework 230-9.

The X11 module 230-1 is a module for receiving various event signals from various kinds of hardware included in the display apparatus 100. Here, the event may be variously set such as an event in which the user gesture is sensed, an event in which a system alarm is generated, and an event in which a specific program is executed or ends.

The APP manager 230-2 is a module for managing an execution state of various applications 240 installed in the storage unit 145. The APP manager 230-2 calls an application corresponding to the corresponding event and executes the application when the X11 module 230-1 senses an application execution event.

The connection manager 230-3 is a module for supporting a wired or wireless network connection. The connection manager 230-3 may include various detailed modules such as a DNET module and an UPnP module.

The security module 230-4 is a module for supporting certification of hardware, request permission, secure storage, and the like.

The system manager 230-5 monitors a state of each component within the display apparatus 100 and provides the monitored results to other modules. For example, when a remaining capacity of a battery is low or an error occurs, if a communication connection state is broken, etc., the system manager 230-5 may provide the monitored results to the first touch screen UI framework 230-7 or the second touch screen UI framework 230-9 to output a notice message or a notice sound.

The multimedia framework 230-6 is a module for playing multimedia contents which are stored in the display apparatus 100 or provided from external sources. The multimedia framework 230-6 may include a player module, a camcorder module, a sound processing module, and the like. Therefore, the multimedia framework 230-6 may perform an operation of playing various multimedia contents to generate and play a screen and a sound.

The first touch screen UI framework 230-7 is a module for providing various UIs to be displayed on the first touch screen 110 and the second touch screen UI framework 230-9 is a module for providing various UIs to be displayed on the second touch screen 120. The first touch screen UI framework 230-7 and the second touch screen UI framework 230-9 may include an image compositor module for configuring various objects, a coordinate compositor module for calculating coordinates at which an object is displayed, a rendering module for rendering the configured object to the calculated coordinates, a 2 dimensional (2D)/3 dimensional (3D) UI toolkit for providing a tool for configuring a 2D or 3D type of UI, etc.

The window manager 230-8 may sense a touch event using a user's body or a pen or other input events. When the events are sensed, the window manager 230-8 transfers event signals to the first touch screen UI framework 230-7 or the second touch screen UI framework 230-9 to perform the operations corresponding to the events.

In addition, when the user touches and drags the screen, various program modules such as a writing module for drawing a line along a drag trace, a position calculation module for calculating a user position based on an ultrasonic sensor value sensed by the sensing unit 130, and a line-of-sight calculation module for calculating a line-of-sight direction of a user in the user's image captured by an image pickup unit (not illustrated) may also be stored.

The application module 240 includes applications 240-1, 240-2 and 240-n supporting various functions. For example, the application module 240 may include program modules for providing various services such as a navigation program module, a game module, an e-book module, a calendar module, and an alarm management module. The applications may be installed as a default and may be arbitrarily installed by a user in use. When the object is selected, the CPU may execute an application corresponding to the selected object using the application module 240.

The software structure illustrated in FIG. 7 is only an example, and the present disclosure is not necessarily limited thereto. Therefore, if necessary, some of the software structure may be omitted, changed, or added. For example, the storage unit 145 may additionally store various programs such as a sensing module analyzing signals sensed by various sensors, a messaging module such as a messenger program, a short message service (SMS) & multimedia message service (MMS) program, an e-mail program, a call information aggregator program module, a voice over Internet protocol (VoIP) module, a web browser module, etc.

As described above, the display apparatus 100 may be implemented as various types of apparatuses such as a cellular phone, a tablet PC, a laptop PC, a PDA, an MP3 player, a digital photo frame, TV, a PC, and a kiosk. Therefore, the configuration illustrated in FIGS. 6 and 7 may be variously changed depending on a kind of the display apparatus 100.

As described above, the display apparatus 100 may be implemented as various forms and configurations. The control unit 140 of the display apparatus 100 may support various user interactions according to an embodiment of the present disclosure.

Hereinafter, a user interaction method according to various embodiments of the present disclosure will be described in more detail.

FIG. 8 is a diagram for describing an example of various interactions depending on a disposition form a the first touch screen and a second touch screen according to an embodiment of the present disclosure.

Referring to FIG. 8, the disposition form of the first touch screen 110 and the second touch screen 120 may be largely divided into three. In more detail, the disposition form includes a first disposition form in which the second touch screen 120 is disposed on the first touch screen 110, a second disposition form in which the second touch screen 120 and the first touch screen 110 partially overlay each other, and a third disposition form in which the first touch screen 110 and the second touch screen 120 are unfolded from each other without overlaying each other.

Hereinafter, an interaction which may be made in the first disposition form will be described.

When the first touch screen 110 and the second touch screen 120 overlay each other, a touch on the first touch screen may not be made. Therefore, the user may perform the touch interaction for the second touch screen 120. Hereinafter, the interaction is called a first interaction scheme. An operation of the first interaction will be described below with reference to FIGS. 9A and 9B, 10A to 10C, 11A and 11B, 12, and 13.

Further, the second touch screen 120 may be slid on the first touch screen 110. In the present embodiment, the sliding of the second touch screen 120 is used as the interaction.

The sliding may be divided depending on whether the user touches the second touch screen. That is, the user may touch or grab an area other than the second touch screen area to slide the second touch screen and touch the second touch screen to slide the second touch screen. Hereinafter, the touch and sliding interaction scheme is called a second interaction scheme. Further, the second interaction scheme will be described below with reference to FIGS. 14, 15, 16, 17, 18, 19, 20, 21, 22, and 23.

A sliding scheme without touching the second touch screen is called a third interaction scheme below. The third interaction scheme will be described in more detail with reference to FIGS. 24 and 25.

Further, the user may slightly or partially slide the second touch screen and then slide the second touch screen to be overlaid again. Hereinafter, the interaction is called a fourth interaction scheme.

An interaction which may be made in the second disposition form will be described.

In some cases, the user may use the first touch screen 110 and the second touch screen 120 which partially overlay each other. In this case, the user may implement the first interaction to the fourth interaction in the second disposition form. An interaction in the disposition form will be described below with reference to FIG. 43.

Meanwhile, the fourth interaction may be divided into two in the state in which the first touch screen and the second touch screen partially overlay each other. That is, these are the movement in the unfolded direction after the movement in the overlaid direction and the movement in the overlaid direction after the movement in the unfolded direction. Upon implementation, the two interactions may be handled as one and may also be separately used.

Hereinafter, the interaction which may be made in the third disposition form will be described.

The user may touch both of the first touch screen 110 and the second touch screen 120 in the state in which the first touch screen 110 and the second touch screen 120 are unfolded from each other. In this state, the user may perform the touch gestures for each of the first touch screen 110 and the second touch screen 120 and a touch gesture crossing the two touch screens. This example will be described below with reference to FIG. 39.

Further, the second touch screen 120 may be slid on the first touch screen 110 and therefore the user may touch the unfolded second touch screen 120 so that the second touch screen 120 may overlay the first touch screen 110 or may use an area other than the second touch screen 120 so that the second touch screen 120 may overlay the first touch screen 110. The scheme of using the interaction will be described below with reference to FIGS. 40 to 42.

FIGS. 9A and 9B, 10A to 10C, 11A and 11B, 12, and 13 are diagrams for describing various examples of a first interaction in a state in which a first touch screen and a second touch screen overlay each other according to an embodiment of the present disclosure.

Figures 9A, 9B:
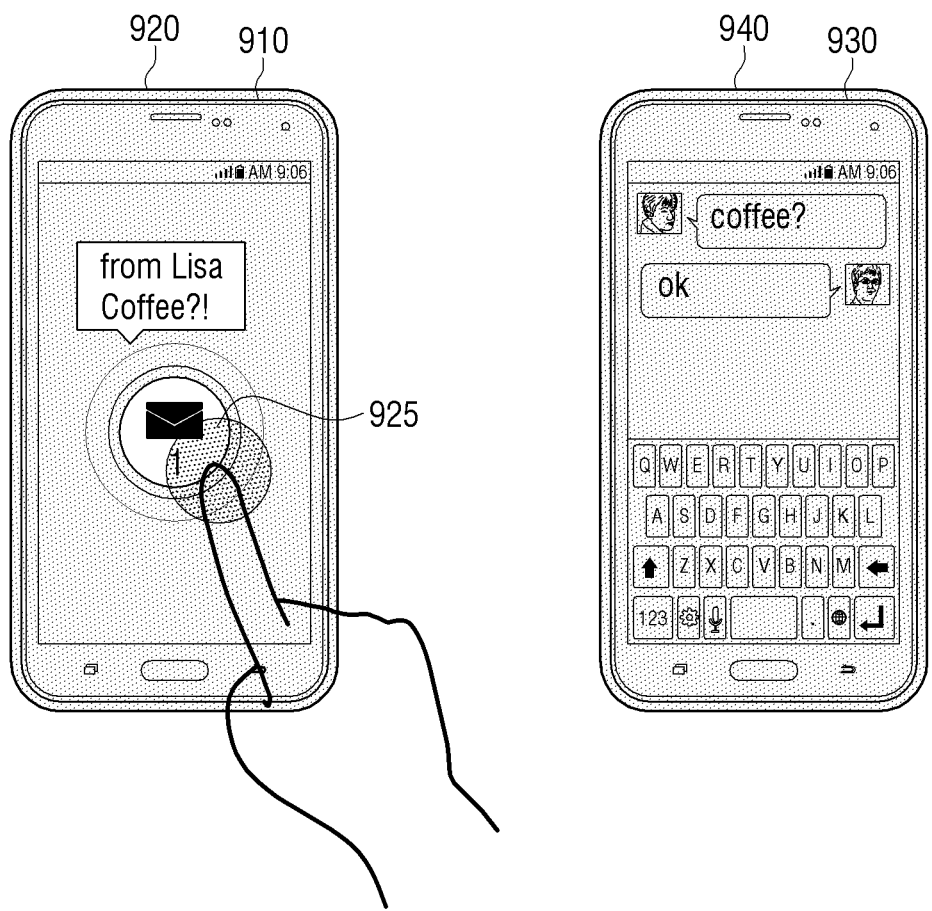

In more detail, FIGS. 9A and 9B are diagrams for describing an operation when an alarm event is generated in a first disposition form according to an embodiment of the present disclosure.

Referring to FIG. 9A, a second touch screen 920 is disposed in a state in which the second touch screen 920 is overlaid on a first touch screen 910. In this disposition state, when an event in which texts, etc., are received is generated, an alarm message corresponding to the corresponding event may be displayed on the second touch screen 920.

In this case, although separate information is not displayed on the first touch screen 910, if the user performs an operation of the display apparatus 100 before the event is generated, the UI element corresponding to the operation may be displayed on the first touch screen 910. That is, the alarm message may be displayed on the second touch screen 920 in the state in which the UI element corresponding to the existing operation is displayed on the first touch screen 910.

In this case, if the user touches an alarm message 925 on the second touch screen 920, a UI element displaying the alarm message may disappear from the second touch screen 940 and the UI element (in the illustrated example, UI screen of an application processing a text message) corresponding to the corresponding alarm message may be displayed on the first touch screen 930.

Meanwhile, although the present embodiment describes that the alarm message 925 is displayed on the second touch screen 920, upon implementation, the alarm message 925 may also be displayed on the first touch screen 910.

Figures 10A, 10B, 10C:
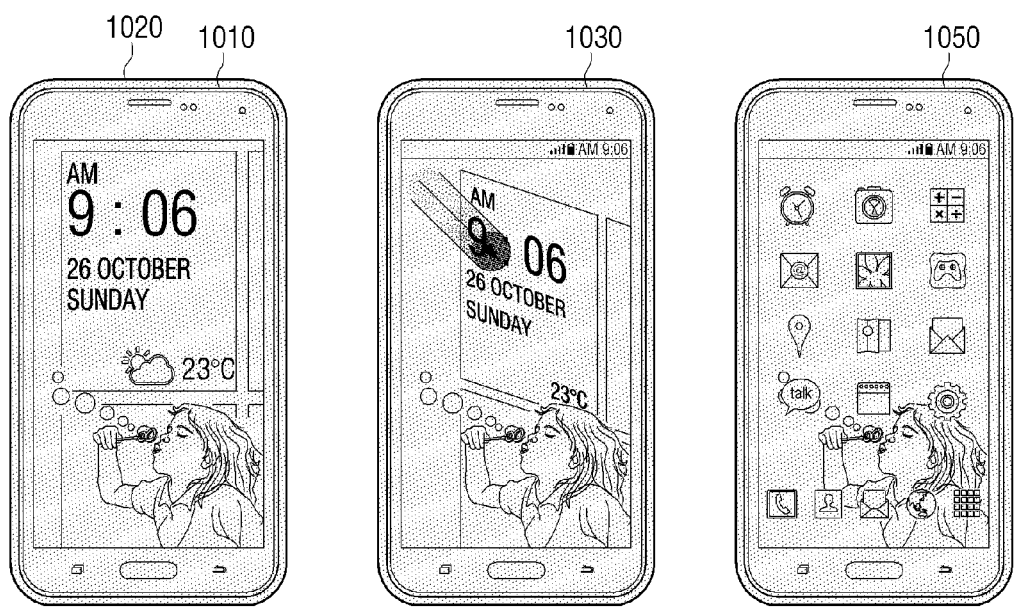

FIGS. 10A to 10C are diagrams for describing an operation when a touch gesture is sensed in an unlock state according to an embodiment of the present disclosure.

Referring to FIG. 10A, a second touch screen 1020 is disposed in a state in which it is overlaid with a first touch screen 1010. Further, since the display apparatus is now in the unlock state, the UI element (unlock background) corresponding to the unlock state may be displayed on the first touch screen 1010. In this case, the second touch screen 1020 does not display a separate UI element.

In this case, for the user to release the unlock, when the touch gesture is input on the second touch screen 1020, as illustrated in FIG. 10B, an image on a first touch screen 1030 is changed and as illustrated in FIG. 10C, a first touch screen 1050 may finally display a home screen. Here, the home screen is a background screen previously selected by a user among a plurality of background screens registered in the display apparatus 100. Also, an icon which may select and drive applications may be disposed on the background screen and a widget on which information provided from a specific application is displayed may also be disposed thereon.

FIGS. 11A and 11B are diagrams for describing a filtering operation according to an embodiment of the present disclosure.

Referring to FIG. 11A, the user drives a map application and a first touch screen 1110, overlaid with a second touch screen 1120, may display a map screen. In this case, the user may input specific filtering information on the map screen. For example, as illustrated, if information on surrounding gourmet restaurants is requested, as illustrated in FIG. 11B, positions of the gourmet restaurants on the map may be displayed on the second touch screen 1040. In more detail, the first touch screen 1030 may continuously display the same map screen and the filtering information according to the user request may be displayed on the second touch screen 1040.

Figure 12:
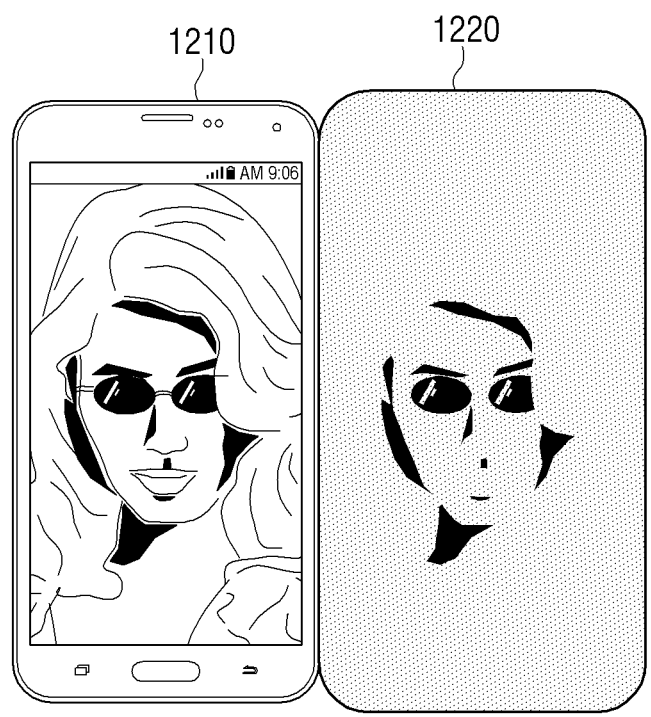

FIG. 12 is a diagram for describing a color filtering operation according to an embodiment of the present disclosure.

Referring to FIG. 12, a first touch screen 1210 may display a specific image. In this case, the user may select a specific area of the corresponding specific image. In this case, a second touch screen 1220 may display a layout corresponding to a color portion corresponding to the corresponding area. For example, if the user selects a red area, the second touch screen may display layout information corresponding to a red color of the corresponding image.

Figure 13:
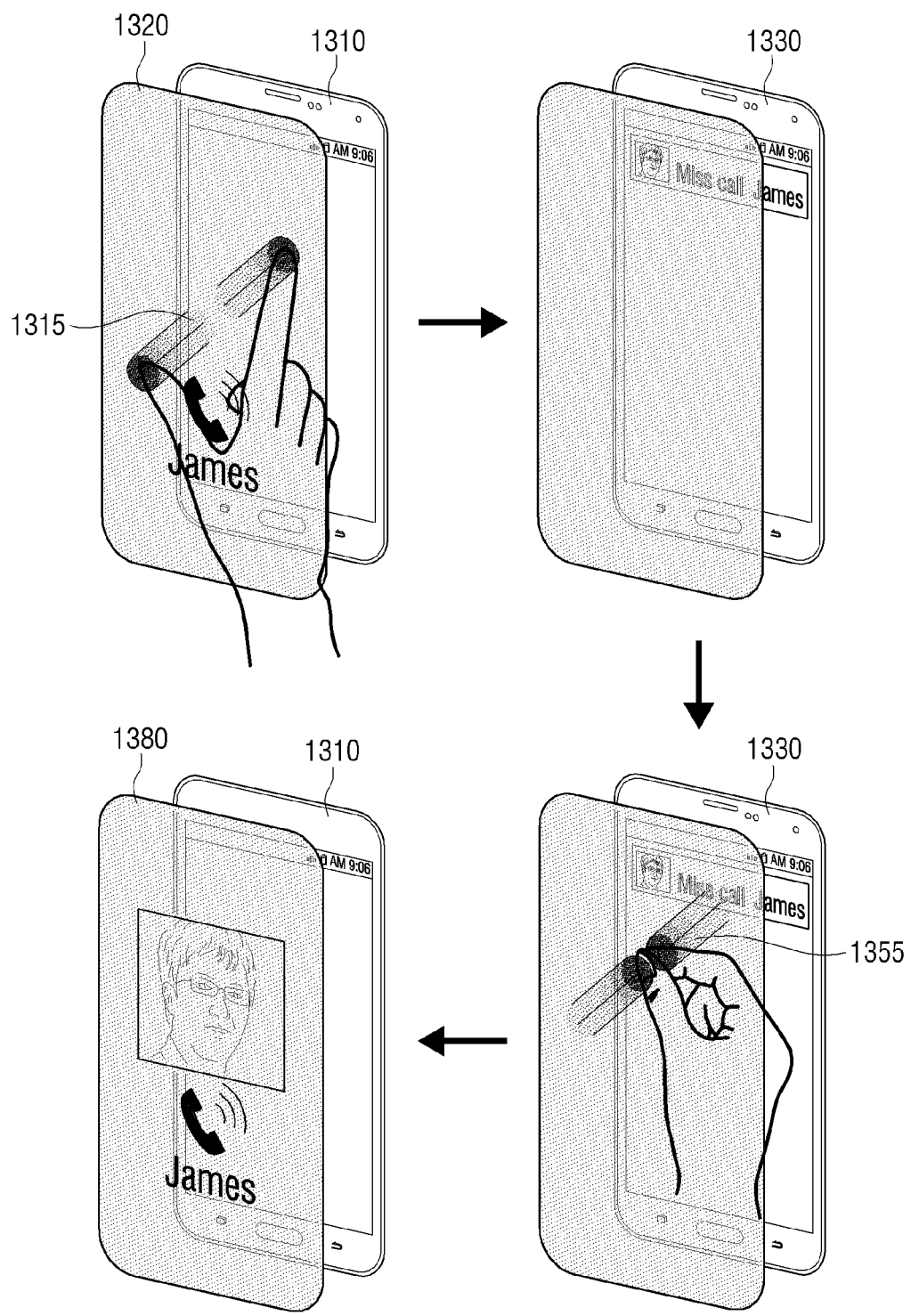

FIG. 13 is a diagram for describing an interaction associated with call reception according to an embodiment of the present disclosure.

Referring to FIG. 13, a second touch screen 1320 is disposed to be overlaid on a first touch screen 1310. In this disposition state, if an event such as call reception is generated, an alarm message corresponding to the corresponding event may be displayed on the second touch screen 1320. In this case, if the user is in a situation in which he/she may not receive a call and thus a touch gesture 1315 (for example, a pinch out gesture representing that two touched areas are far away from each other) representing a reception rejection is sensed, the control unit 140 may stop a display of an alarm message representing that a telephone is ringing and may display a message informing that there is a missed call on the first touch screen 1330.

In this situation, if a touch gesture 1355 (for example, a pinch-in gesture representing that two touched areas approach each other) representing a call connection is sensed by a user, the control unit 140 may perform an action of making a call on the phone number corresponding to a missed call and display the UI element associated with a telephone call on a second touch screen 1380.

Figure 14:
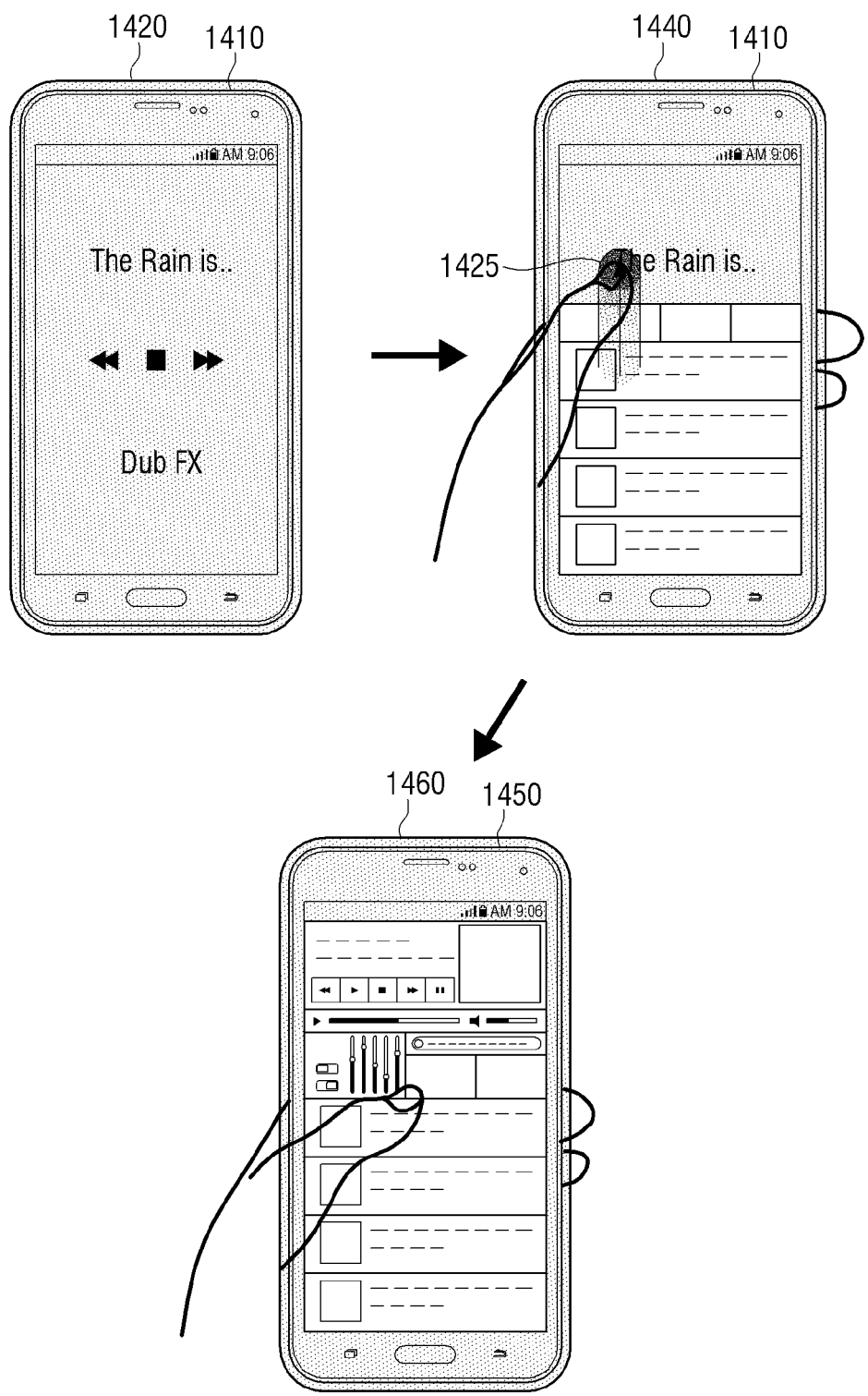
FIG. 14 is a diagram for describing an interaction associated with a music playing control according to an embodiment of the present disclosure.

FIG. 14 is a diagram for describing an interaction associated with a music playing control according to an embodiment of the present disclosure.

Referring to FIG. 14, a UI element associated with a music playing control may be displayed on a first touch screen 1410. In this case, a separate UI element is not displayed on a second touch screen 1420.

In this state, if the user inputs a touch gesture 1425 representing a scroll in a preset direction on a second touch screen 1440, the control unit 140 may display a playing list on the second touch screen 1440 so that the playing list corresponds to the scrolled degree of the user.

Meanwhile, when the scroll of the user reaches a maximum value, the control unit 140 may display the playing list in the whole area of the second touch screen 1440 or display the playing list in some of the area and equalizer setting in the remaining area. In this case, a first touch screen 1450 may continuously display the same UI element as before. However, due to a screen of a second touch screen 1460 disposed ahead, the UI element displayed on the first touch screen 1450 may be restrictively seen or may not be seen by the user.

Figure 15:
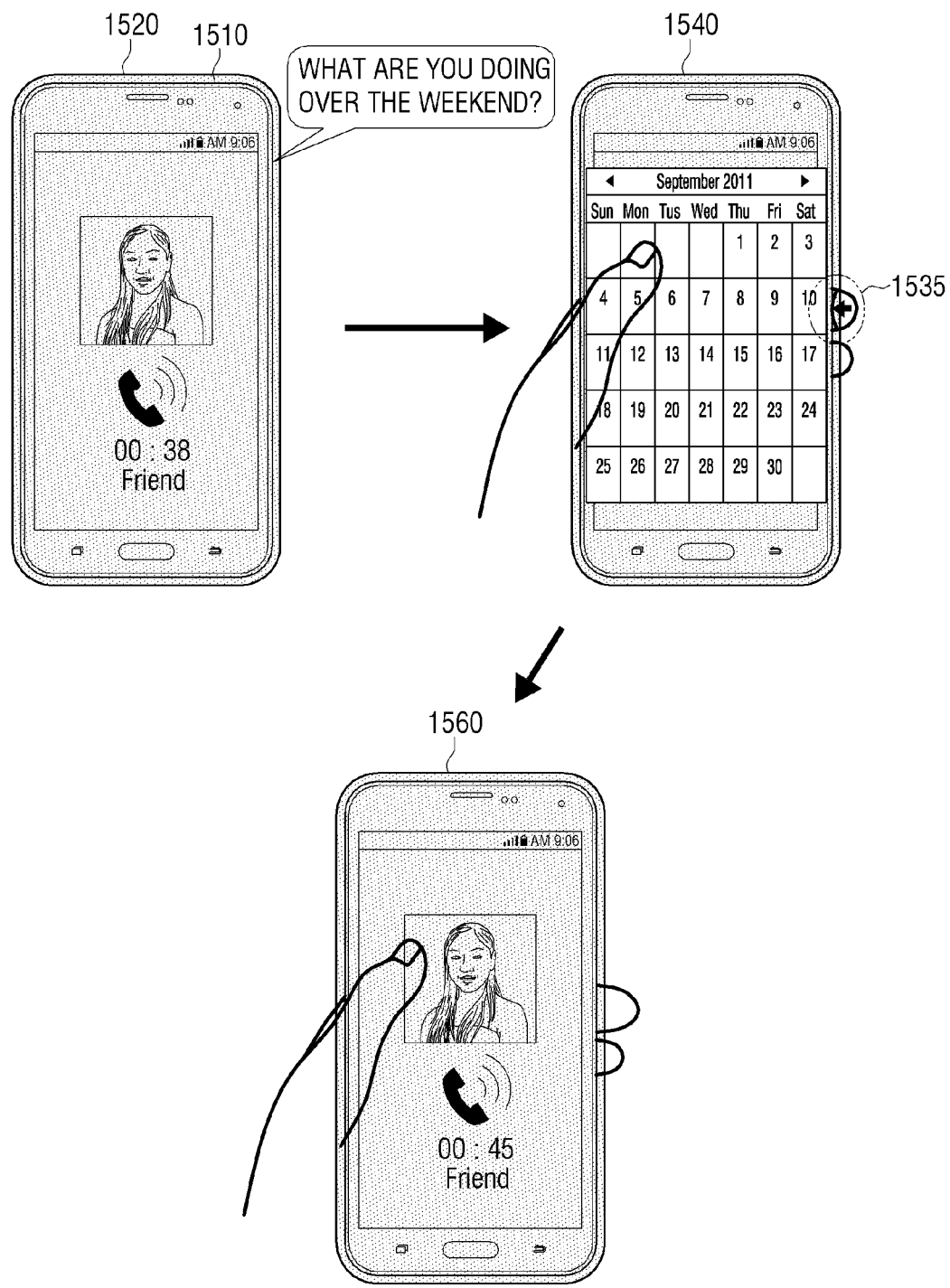
FIG. 15 is a diagram for describing an example of a second touch screen used as a hot key according to an embodiment of the present disclosure.

FIG. 15 is a diagram for describing an example of a second touch screen used as a hot key according to an embodiment of the present disclosure.

Referring to FIG. 15, the user uses the display apparatus 100 to communicate with others on the phone and a UI element associated with the corresponding telephone call function may be displayed on a first touch screen 1510.

If the user wants to check his/her schedule during the phone call, he/she may touch (or long touch) a preset area 1535 of a second touch screen 1520. In this case, the control unit 140 may display a screen of a pre-registered application (schedule application) on a second touch screen 1540 and when the corresponding user touch gesture stops, may stop a display operation of the second touch screen 1560. Here, the long touch means that a specific area is continuously touched for a preset time (for example, 2 seconds or more).

Meanwhile, although the example illustrated describes that a schedule application is displayed on the second touch screen, upon implementation, applications in addition to the schedule application may be registered and other applications may be driven according to a kind of driven applications. For example, when a hot key is input during the telephone call, the screen of the schedule application may be displayed and when a hot key is input during photographing, a screen of a social networking site (SNS) application may be displayed.

Further, upon implementation, different hot keys may also be registered in a plurality of areas. For example, if a right side of the second touch screen receives a long touch, a first application may be driven and displayed and if a left side of the second touch screen receives a long touch, a second application may be driven and displayed.

FIGS. 16 to 23 are diagrams for describing various examples of a second interaction in the state in which the first touch screen and the second touch screen overlay each other according to an embodiment of the present disclosure.

Figure 16:
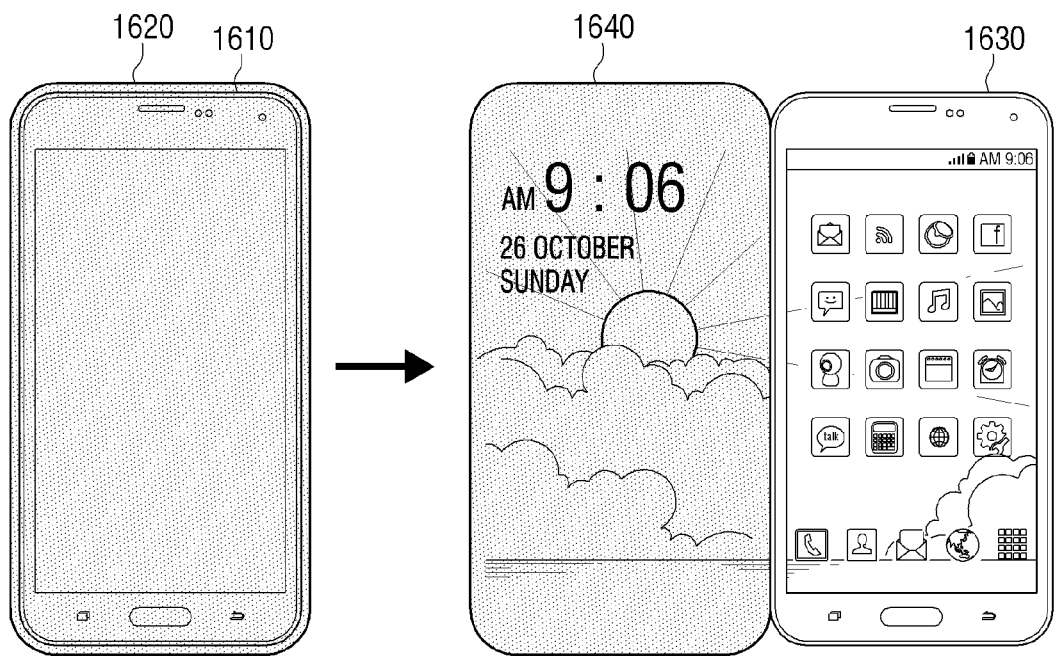
FIGS. 16, 17, 18, 19, 20, 21, 22, and 23 are diagrams for describing various examples of a second interaction in a state in which a first touch screen and a second touch screen overlay each other according to various embodiments of the present disclosure.

In more detail, FIG. 16 is a diagram for describing a second interaction when there is no notice.

Referring to FIG. 16, a second touch screen 1620 is disposed to be overlaid with a first touch screen 1610. In this disposition state, the user may perform sliding to unfold the second touch screen 1620 while touching some area of the second touch screen 1620.

In this case, a home screen may be displayed on the first touch screen 1630 and a second touch screen 1640, respectively.

Meanwhile, although the example illustrated describes that the display forms on the first touch screen 1630 and the second touch screen 1640 are different from each other, if the display apparatus 100 has a plurality of screen pages, a representative screen page (for example, a home screen) is displayed on the first touch screen 1630 and other screen pages adjacent to the representative screen page may be displayed on the second touch screen 1640.

Figure 17:
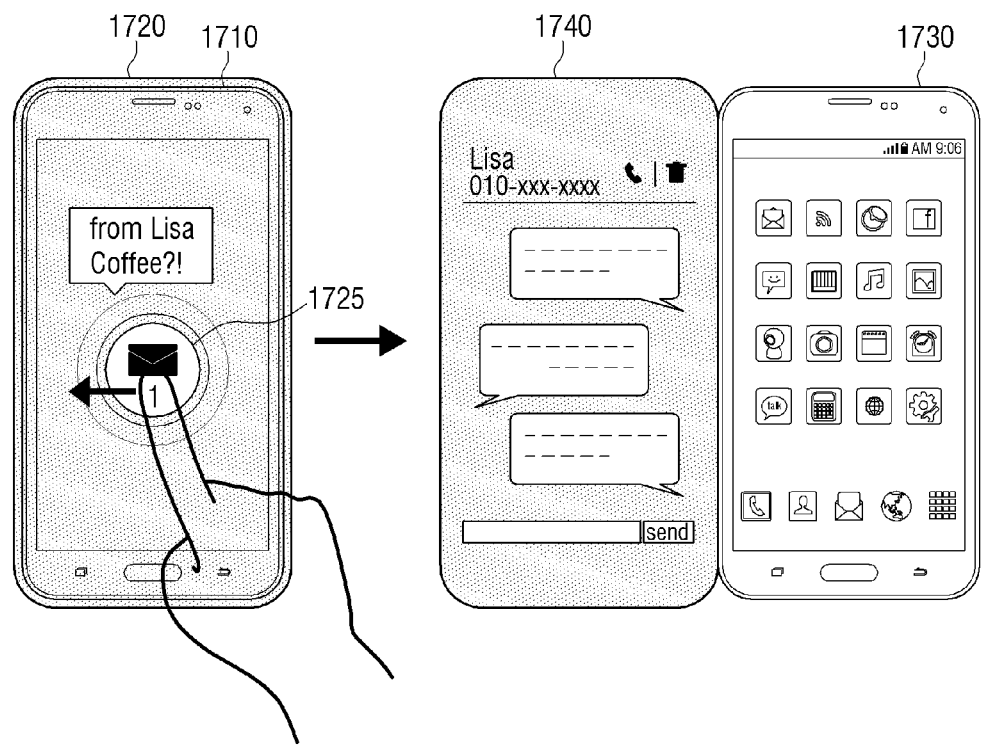

FIG. 17 is a diagram for describing a second interaction when there is a notice according to an embodiment of the present disclosure.

Referring to FIG. 17, a second touch screen 1720 is disposed to be overlaid on a first touch screen 1710. In this disposition state, if an event in which texts, etc., are received is generated, an alarm message 1725 corresponding to the event may be displayed on the second touch screen 1720.

In this case, when the user performs a movement (that is, sliding) to unfold the second touch screen 1720 from the first touch screen while touching the alarm message 1725 displayed on the second touch screen 1720, the control unit 140 may display the home screen on the first touch screen 1730 and display a UI of an application corresponding to the alarm message on the second touch screen 1740. For example, a UI screen of an application associated with transmission and reception of texts may be displayed on the second touch screen.

Figure 18:
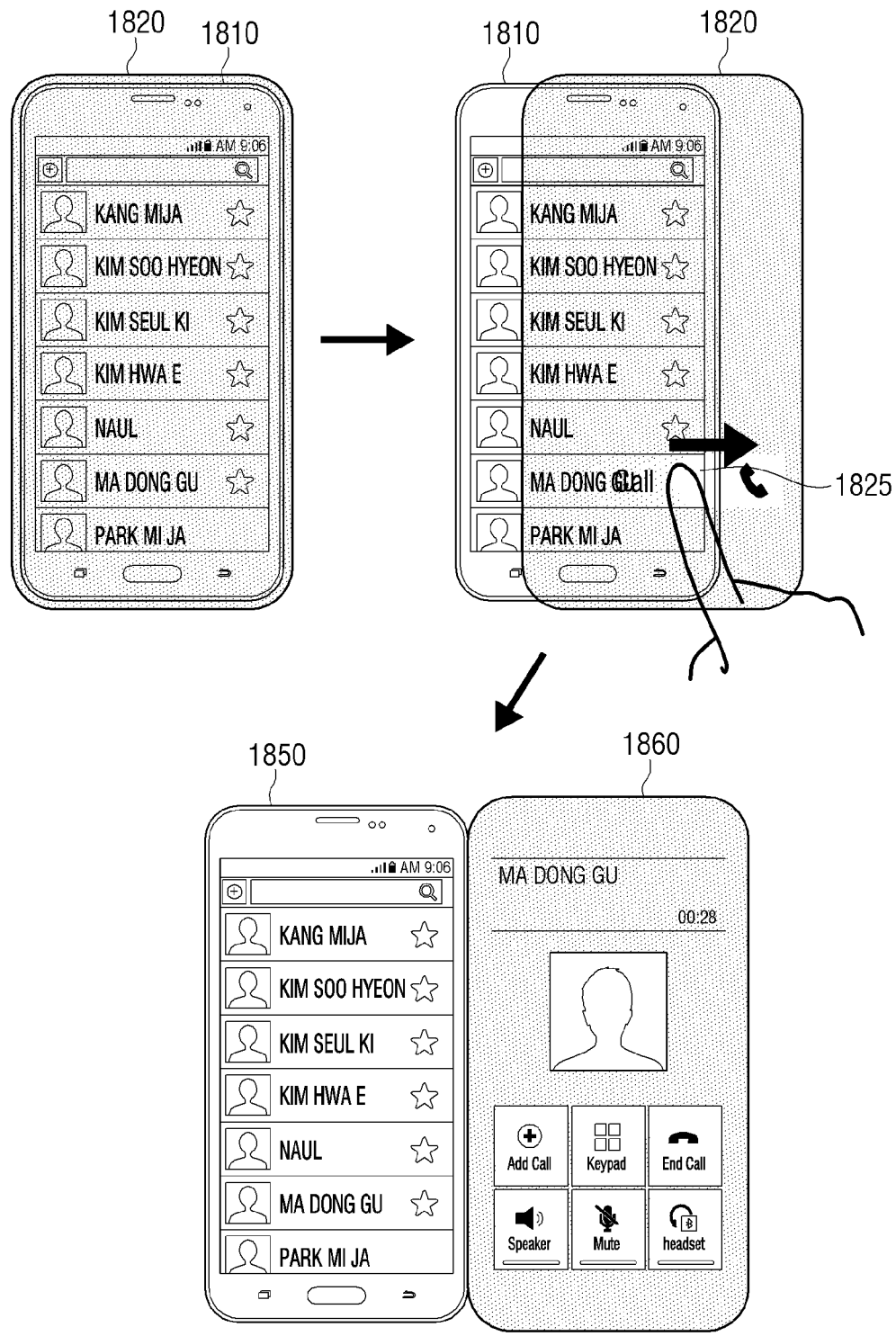

FIG. 18 is a diagram for describing an interaction to make a call according to an embodiment of the present disclosure.

Referring to FIG. 18, a second touch screen 1820 is disposed to be overlaid with a first touch screen 1810. In this case, the second touch screen 1820 does not display a separate UI element and the first touch screen 1810 may display a pre-stored contacts list.

In this case, the user may perform a movement (for example, a sliding) to unfold the second touch screen 1820 from the first touch screen 1810 while touching a predetermined area 1825 of the second touch screen 1820. In this case, the control unit 140 may perform an event corresponding to the UI element (name of a specific user) of the first touch screen 1810 projected on the touched area 1825 on the second touch screen 1820. For example, the control unit 140 may perform an action to make a call to a contact number projected on the area touched by the user.

Further, a first touch screen 1850 may display the same UI element as before and a second touch screen 1860 may display a UI element corresponding to a newly performed action while the control unit 140 performs an action to make a call to the foregoing contact number. For example, as illustrated in FIG. 18, a UI element associated with a telephone call may be displayed.

Meanwhile, the interaction may be applied even to various applications in addition to a telephone call application.

Figure 19:
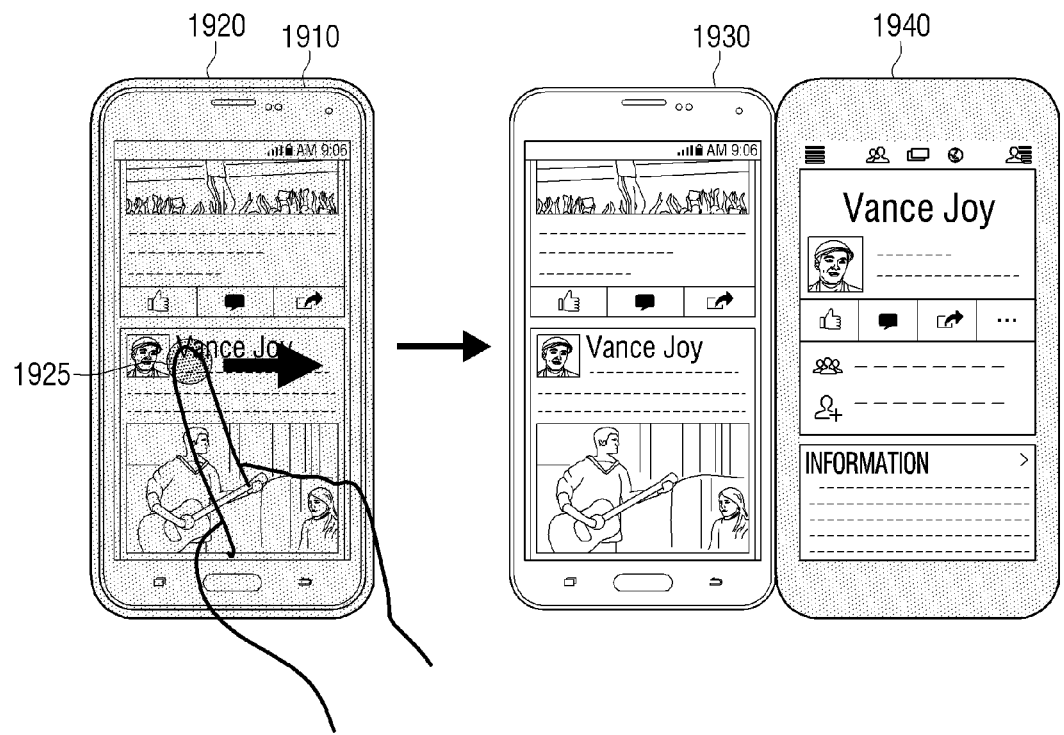

FIG. 19 is a diagram for describing an interaction in an SNS application according to an embodiment of the present disclosure.

Referring to FIG. 19, a second touch screen 1920 is disposed to be overlaid with a first touch screen 1910. In this case, the second touch screen 1920 does not display a separate UI element and the first touch screen 1910 may display a UI element associated with an SNS application.

In this case, the user may perform a movement (for example, a sliding) to unfold the second touch screen 1920 from the first touch screen 1910 while touching an area 1925 (for example, SNS address area of a specific user) of the second touch screen 1920. In this case, the control unit 140 may perform an event (e.g., access the corresponding SNS address) corresponding to the UI element (SNS address) of the first touch screen 1910 projected on the touched area on the second touch screen 1920. For example, the control unit 140 may perform an action to access the SNS address projected on the area touched by the user.

Therefore, the first touch screen 1930 may display the same UI element as before and the second touch screen 1940 may display a page of the accessed SNS address.

Figure 20:
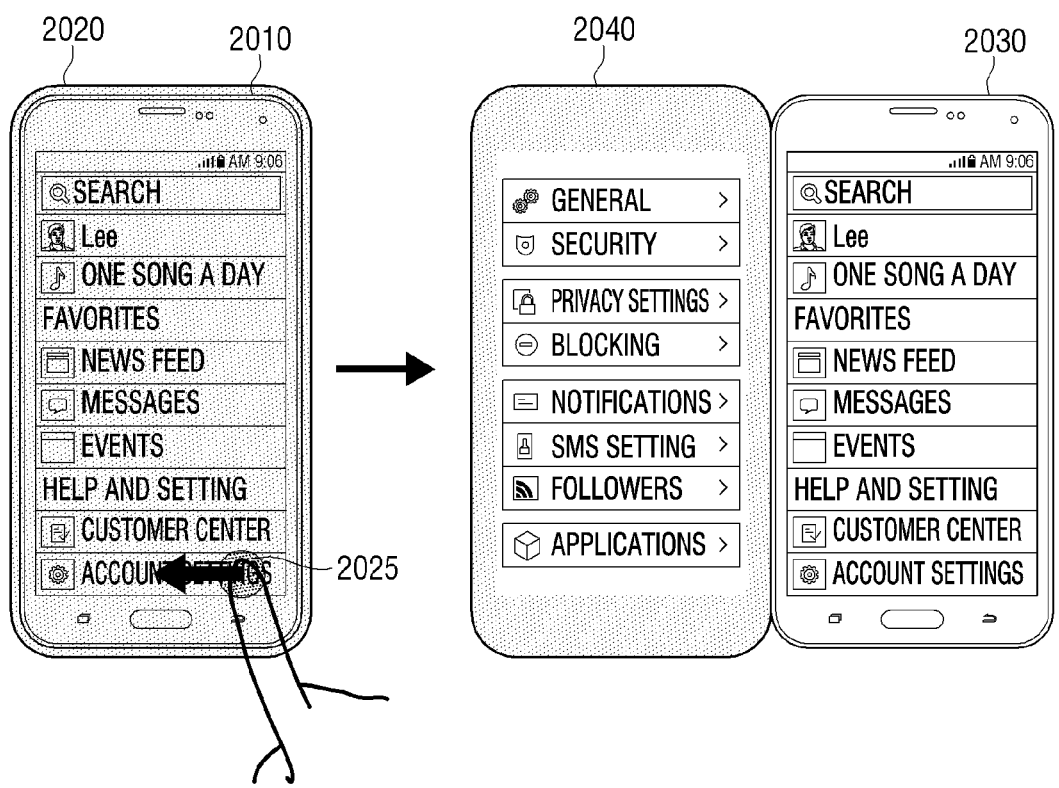

FIG. 20 is a diagram for describing a menu extension interaction of application according to an embodiment of the present disclosure.

Referring to FIG. 20, a second touch screen 2020 is disposed to be overlaid with a first touch screen 2010. In this case, the second touch screen 2020 does not display a separate UI element and the first touch screen 2010 may display a menu screen of specific application as a UI element.

In this case, the user may perform a movement (for example, a sliding) to unfold the second touch screen 2020 from the first touch screen 2010 while touching some area 2025 (for example, specific menu) of the second touch screen 2020. In this case, the control unit 140 may perform an event (display a lower menu) corresponding to the UI element (specific menu) of the first touch screen 2010 projected on the touched area on the second touch screen 2010.

For example, the control unit 140 may display the same UI element as before on a first touch screen 2030 and display lower menus of a menu selected by a user on a second touch screen 2040 as a UI element.

Figure 21:
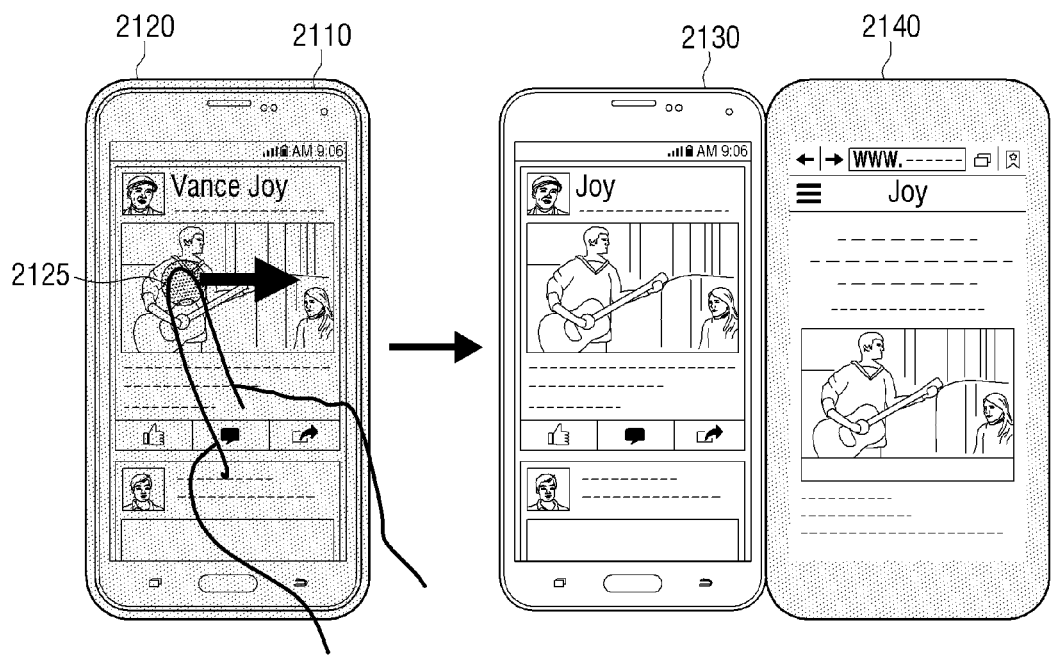

FIG. 21 is a diagram for describing a web browsing interaction according to an embodiment of the present disclosure.

Referring to FIG. 21, a second touch screen 2120 is disposed to be overlaid with a first touch screen 2110. In this case, the second touch screen 2120 does not display a separate UI element and the first touch screen 2110 may display a specific web page as the UI element.

In this case, the user may perform a movement (for example, a sliding) to unfold the second touch screen 2120 from the first touch screen 2110 while touching some area 2125 (for example, specific article) of the second touch screen 2120. In this case, the control unit 140 may perform an event (display a new web page) corresponding to the UI element (specific article) of the first touch screen 2110 projected on the touched area on the second touch screen 2120.

For example, the control unit 140 may display the same UI element as before on a first touch screen 2130 and display a web page corresponding to an article address selected by a user on a second touch screen 2140 as a UI element.

Figure 22:
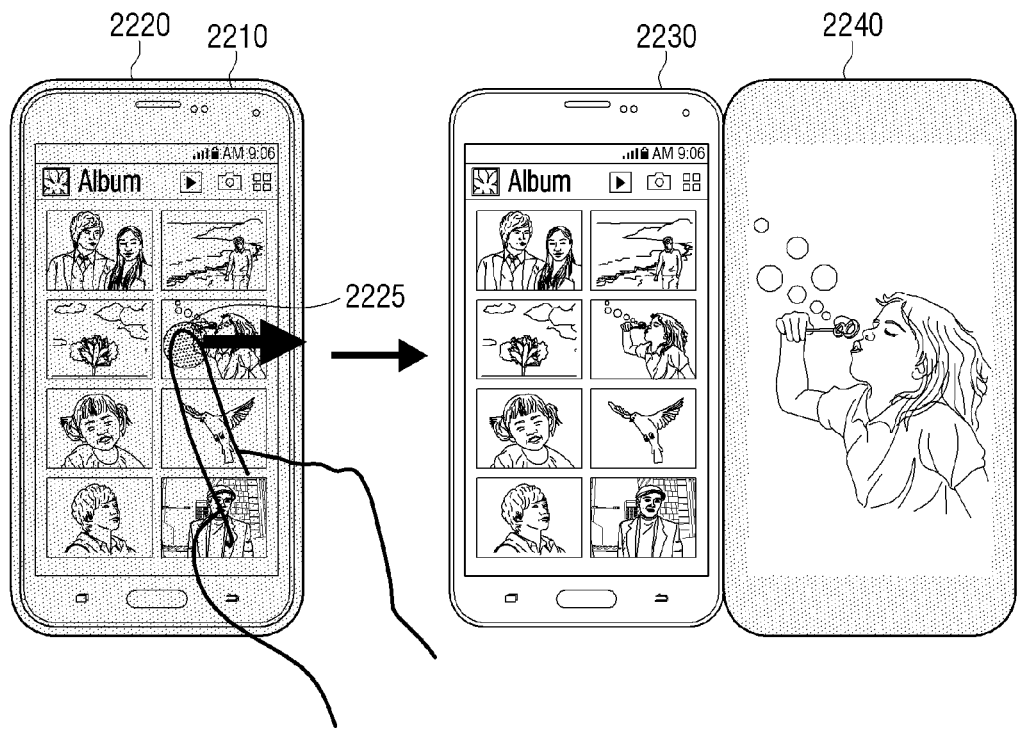

FIG. 22 is a diagram for describing an interaction in a photograph application according to an embodiment of the present disclosure.

Referring to FIG. 22, a second touch screen 2220 is disposed to be overlaid with a first touch screen 2210. In this case, the second touch screen 2220 does not display a separate UI element and the first touch screen 2210 may display thumbnails of a pre-stored image supported in a photograph application as a UI element.

In this case, the user may perform a movement (for example, a sliding) to unfold the second touch screen 2220 from the first touch screen 2210 while touching some area 2225 (for example, specific thumbnail) of the second touch screen 2220. In this case, the control unit 140 may perform an event (display of an image corresponding to the corresponding thumbnail) corresponding to the UI element (specific thumbnail) of the first touch screen 2210 projected on the touched area on the second touch screen 2220.

For example, the control unit 140 may display the same thumbnails as before on a first touch screen 2230 and display lower menus of a menu selected by a user on a second touch screen 2340 as a UI element.

Figure 23:
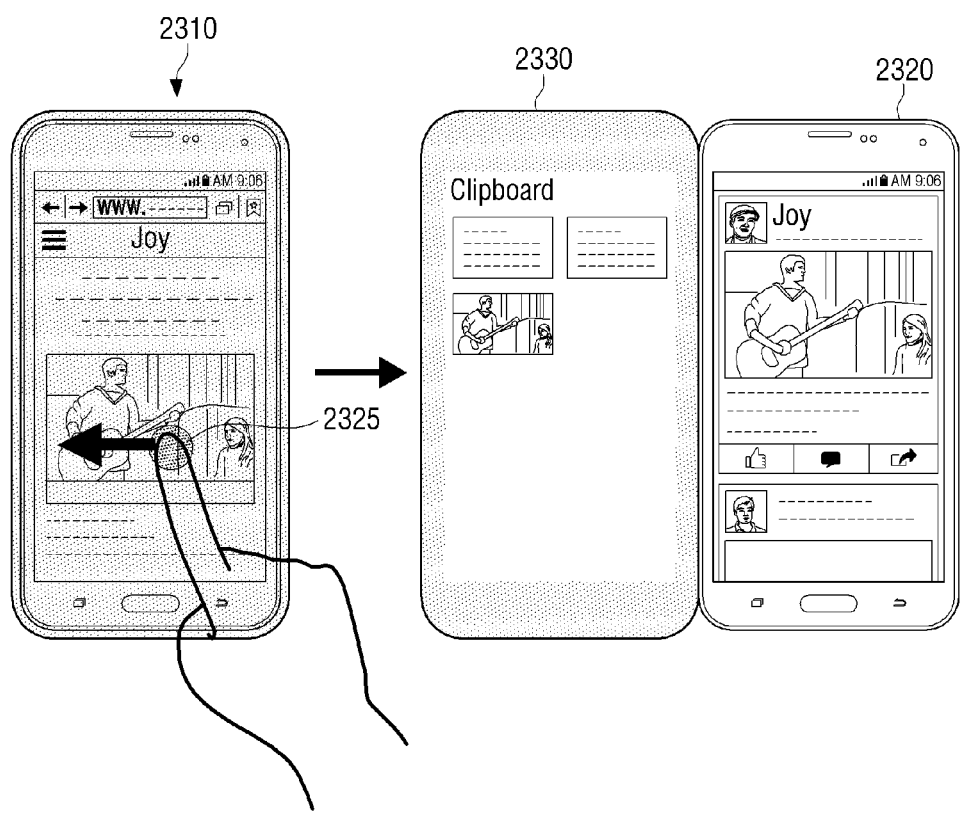

FIG. 23 is a diagram for describing a clipboard interaction according to an embodiment of the present disclosure.

Referring to FIG. 23, a second touch screen is disposed to be overlaid with a first touch screen as shown at 2310. In this case, the second touch screen does not display a separate UI element and the first touch screen may display a specific web page as a UI element.

In this case, the user may perform a movement (for example, a sliding) to unfold the second touch screen from the first touch screen while keeping a touch after touching some area 2325 (for example, specific image) of the second touch screen over a preset time. In this case, the control unit 140 may perform an event (image scrap) corresponding to the UI element (specific image) of the first touch screen projected on the touched area on the second touch screen.

For example, the control unit 140 may display the same web page as before on a first touch screen 2320 and may display a clip board on a second touch screen 2330.

Figure 24:
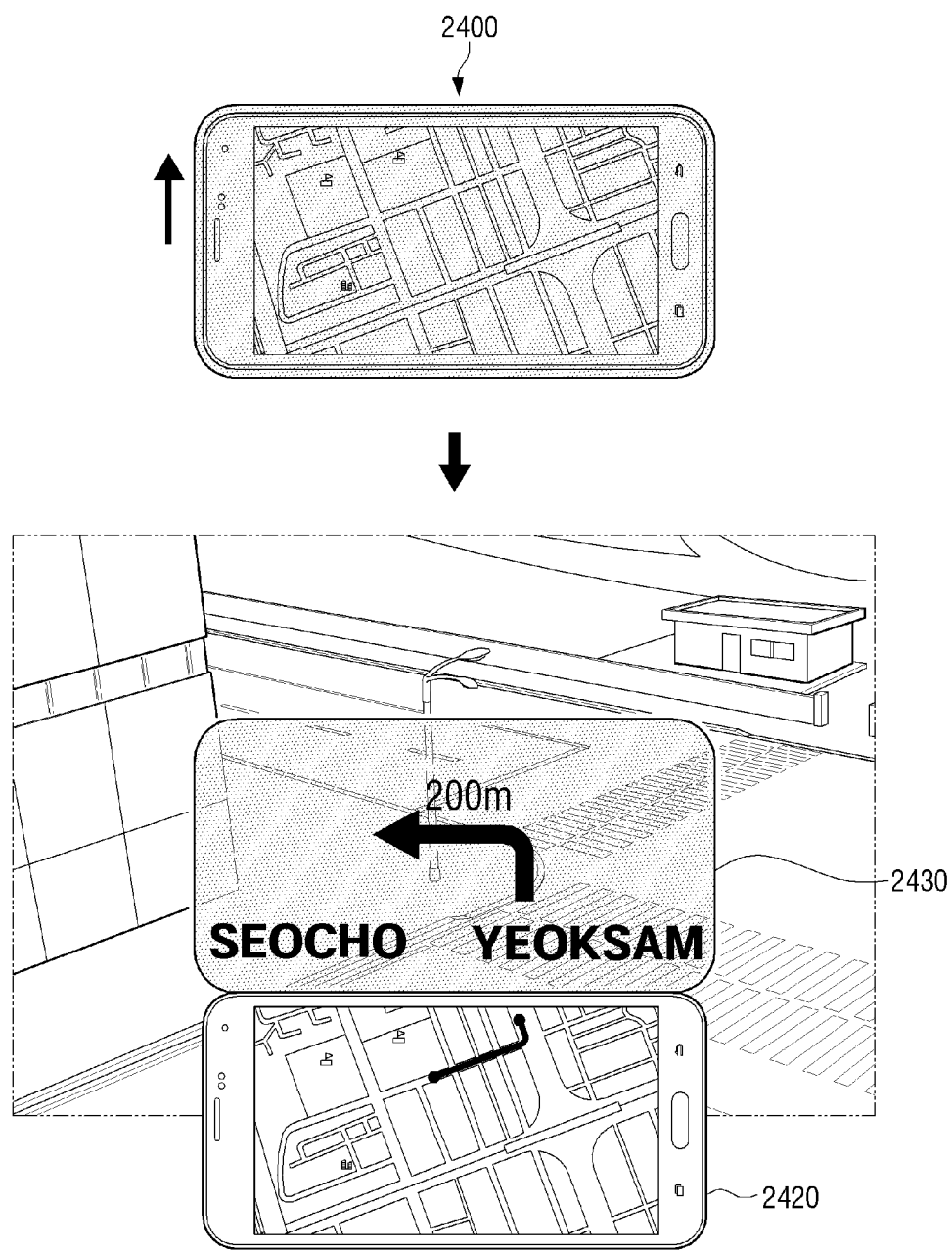
FIGS. 24 and 25 are diagrams for describing various examples of a third interaction in a state in which a first touch screen and a second touch screen overlay each other according to various embodiments of the present disclosure.
Figure 25:
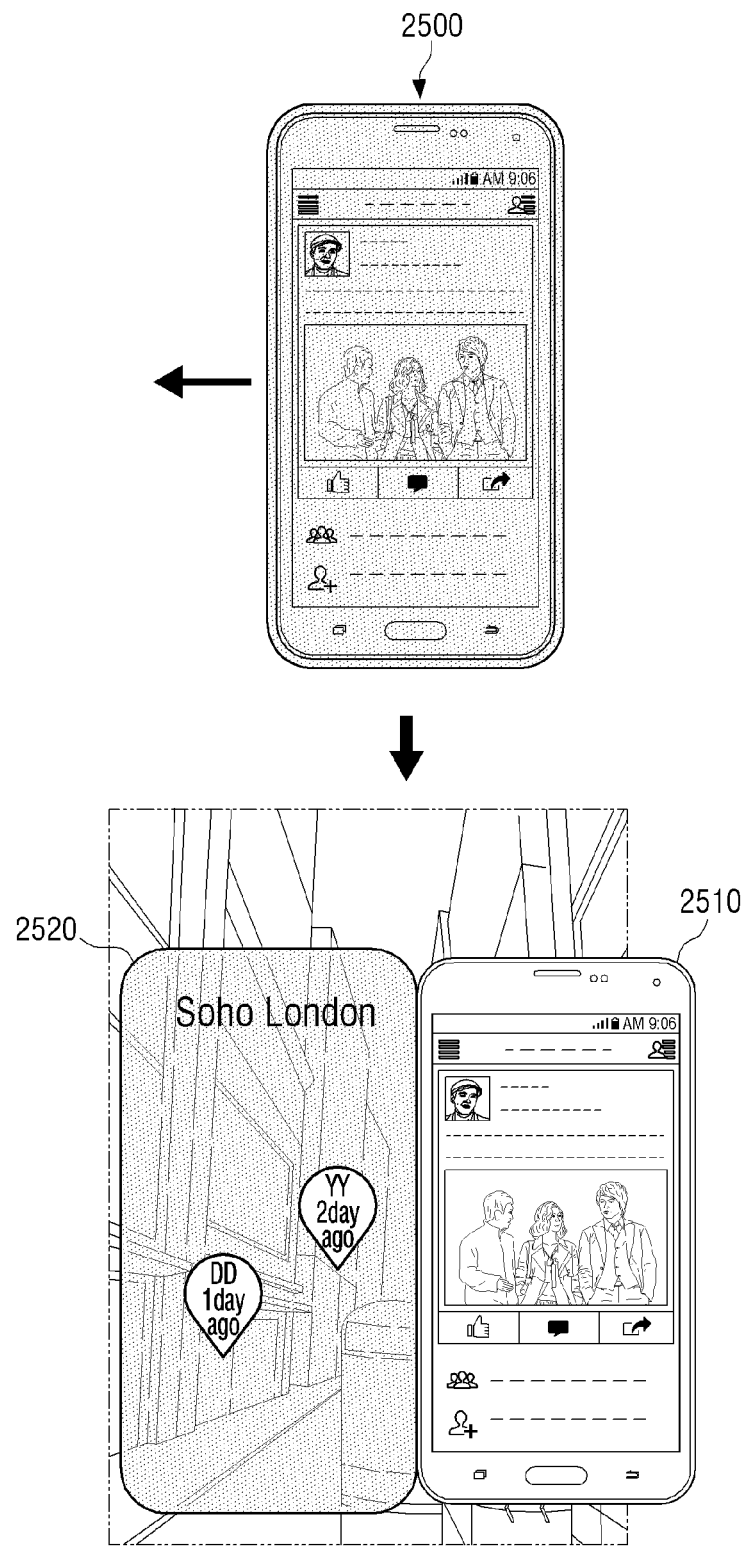

FIGS. 24 to 25 are diagrams for describing various examples of a third interaction in a state in which a first touch screen and a second touch screen overlay each other according to an embodiment of the present disclosure. In more detail, FIG. 24 is a diagram for describing an example of using a navigation function according to an embodiment of the present disclosure.

Referring to FIG. 24, a second touch screen is disposed to be overlaid on a first touch screen as shown at 2400. In this case, the second touch screen does not display a separate UI element and the first touch screen may display a map associated with the navigation function as a UI element while the user performs the navigation function.

In this case, the user may perform a movement (for example, a sliding) to unfold the second touch screen from the first touch screen without touching the second touch screen. In this case, the control unit 140 may operate the second touch screen to be operated as a head up display (HUD) for augmented reality. For example, the user may display the same map as before on the first touch screen 2420 and display distance/direction information for a guide on the second touch screen 2430 while the user performs the navigation function using the display apparatus 100.

FIG. 25 is a diagram for describing an example of using an augmented reality function according to an embodiment of the present disclosure.

Referring to FIG. 25, a second touch screen is disposed to be overlaid with a first touch screen as shown at 2500. In this case, the second touch screen does not display a separate UI element and the first touch screen may display various information associated with the SNS application as the UI element while the user uses the SNS application.

In this case, the user may perform a movement (for example, a sliding) to unfold the second touch screen from the first touch screen without touching the second touch screen. In this case, the control unit 140 may display information on a real world projected on a second touch screen 2520 on the second touch screen 2520 while keeping the display of the same UI element as before on the first touch screen 2510. For example, when moving path information of the user is pre-stored, visit history information on a place projected on the second touch screen 2520 may be displayed on the second touch screen 2520.

Although it is described above that the user completely unfolds the first touch screen 2510 and the second touch screen 2520 which are completely overlaid with each other, the user may also use the first touch screen and the second touch screen without completely unfolding the overlaid two touch screens. The above example will be described below with reference to FIG. 26.

Figure 26:
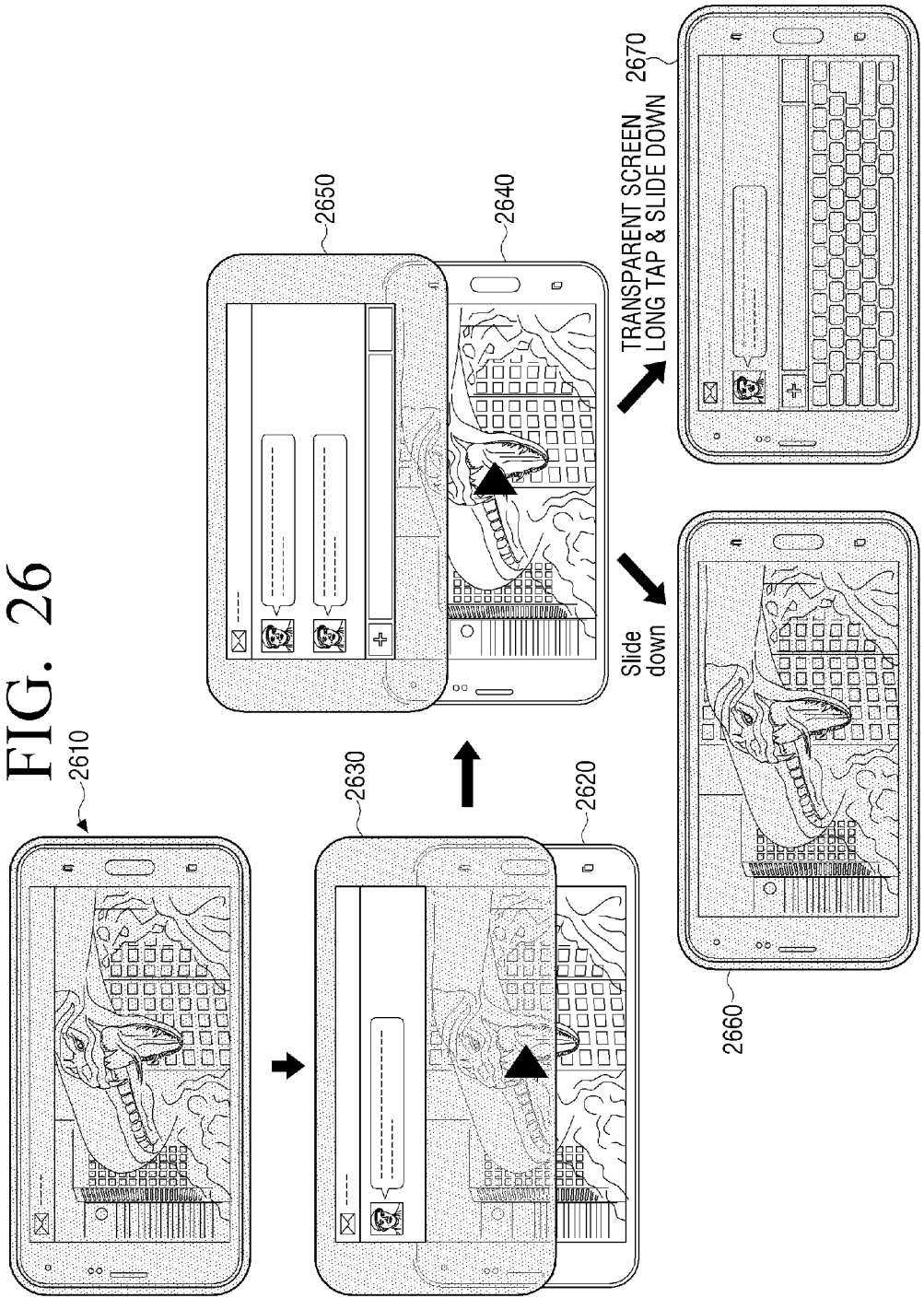
FIG. 26 is a diagram for describing an interaction operation depending on how much two touch screens overlay each other according to an embodiment of the present disclosure.

FIG. 26 is a diagram for describing an interaction operation depending on how much two touch screens overlay each other according to an embodiment of the present disclosure.

Referring to FIG. 26, a first touch screen and a second touch screen overlay each other as shown at 2610 and an image supported by a moving picture application may be displayed on the first touch screen.

In this case, when there is an alarm such as a text, the first touch screen may notify that texts are received in some of the display area. In this case, the user may perform a sliding operation to unfold the second touch screen from the first touch screen.

In this case, the control unit 140 may display a UI element associated with notice information on an area of a second touch screen that does not cover a first touch screen, in proportion to an area in which the first touch screen area and the second screen area do not overlay each other. For example, when a second touch screen 2630 and a first touch screen 2620 overlay each other as much as about ⅔, the second touch screen 2630 may display a UI element associated with notice information on a ⅓ area without the UI element displayed on the first touch screen 2620. Further, when the user scrolls the second touch screen 2630 to overlay the two touch screens by as much as about ⅓, the second touch screen 2630 may display a UI element associated with notice information on a ⅔ area without the UI element displayed on the first touch screen 2620.

That is, the control unit 140 may control the display areas of a second touch screen 2640 and a second touch screen 2650 depending on how much the touch screens overlay each other.

Meanwhile, when the user performs an action to overlay the second touch screen and the first touch screen, the UI element which is displayed on the first touch screen may be continuously displayed on the first touch screen or the UI element displayed on the second touch screen may be displayed on the first touch screen, depending on whether the user touches the second touch screen.

For example, if the user slides down the second touch screen without touching the second touch screen, the control unit 140 does not display the UI element on the second touch screen and may continuously display the same UI element 2660 on the first touch screen.

On the contrary, if the user slides down the second touch screen while touching the second touch screen, the control unit 140 does not display the UI element on the second touch screen and may display a UI element 2670 displayed on the second touch screen on the first touch screen.

It is described above that the second touch screen is scrolled only in one direction based on the first touch screen. However, if the second touch screen may move in various directions, more various forms of interactions may be implemented. This will be described below with reference to FIGS. 27 to 33.

FIGS. 27, 28, 29, 30, 31A, 31B, 32, and 33 are diagrams for describing examples of performing other interactions depending on a moving direction of a second touch screen in a state in which a first touch screen and the second touch screen overlay each other according to an embodiment of the present disclosure.

Figure 27:
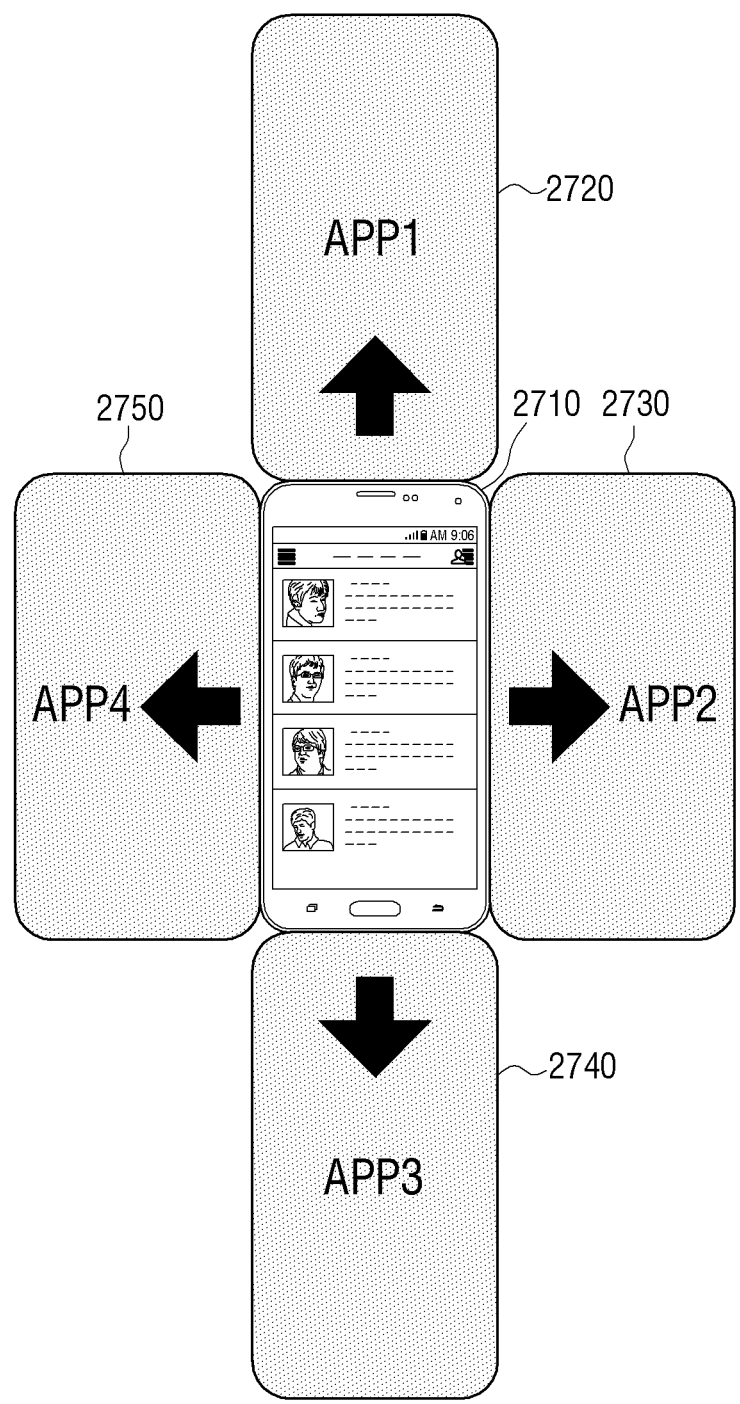

Referring to FIGS. 27 and 28, when the two touch screens overlay each other, a first touch screen 2710 may display a UI element 2800 corresponding to the existing operation of the user. In this case, when the user scrolls the second touch screen, various UI elements may be displayed on the second touch screen and as illustrated in FIGS. 27 and 28, other UI elements may be displayed corresponding to the moving direction of the second touch screen.

For example, an upward sliding movement may display a UI element 2820 corresponding to application 1 (for example, moving picture playing application) pre-registered by the user on a second touch screen 2720. Further, the sliding moving to the right may display a UI element corresponding to application 2 (for example, music playing application) pre-registered by the user on a second touch screen 2730. Further, a downward sliding movement may display a UI element corresponding to application 3 (for example, music playing application) pre-registered by the user on a second touch screen 2740. Further, a sliding movement to the left may display a UI element 2810 corresponding to new application 4 (for example, SNS application) on a second touch screen 2750.

Therefore, a first UI element corresponding to a first application may be displayed on the first touch screen and a second UI element corresponding to a second application may be displayed on the second touch screen. When the two touch screens are slid so that the two touch screens overlay each other in this state, only one of the two UI elements needs to be displayed to a user.

In this case, the control unit 140 may determine a UI element to be displayed to the user in the state in which the two touch screens overlay each other, based on a touch or a touch time on the second touch screen. For example, when the two touch screens overlay each other without the touch on the second touch screen, the control unit 140 may stop the display of the UI element displayed on the second touch screen. That is, the first touch screen may continuously display the UI element.

On the other hand, when the two touch screens overlay each other together, wherein the first UI 2810 is displayed on the first touch screen and a second UI 2830 is displayed on the second touch screen, when a touch or a long touch is received on the second touch screen, the control unit 140 may switch the UI element 2810 displayed on the first touch screen to the UI element 2830 displayed on the second touch screen and stop the display operation of the second touch screen, and thus provide a UI 2840.

Figure 29:
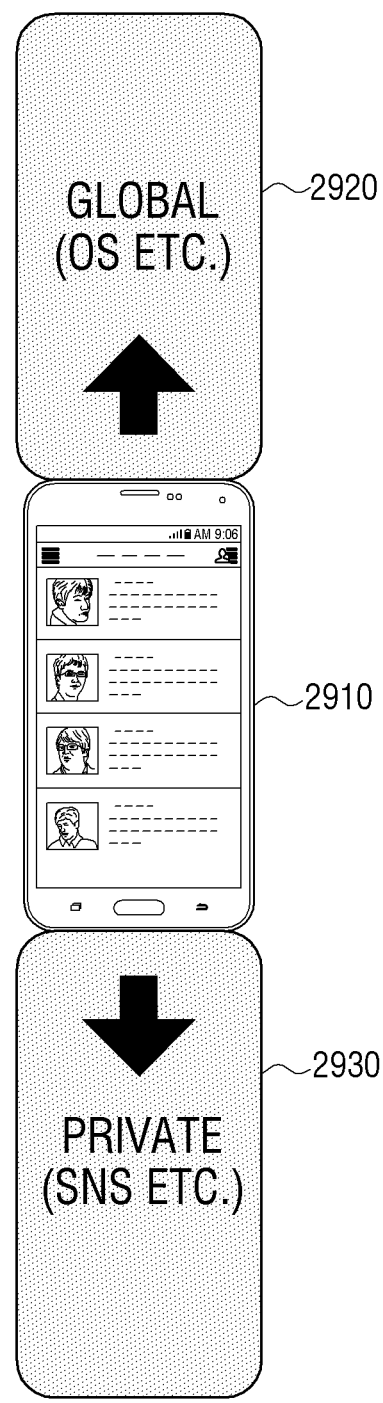
Figure 30:
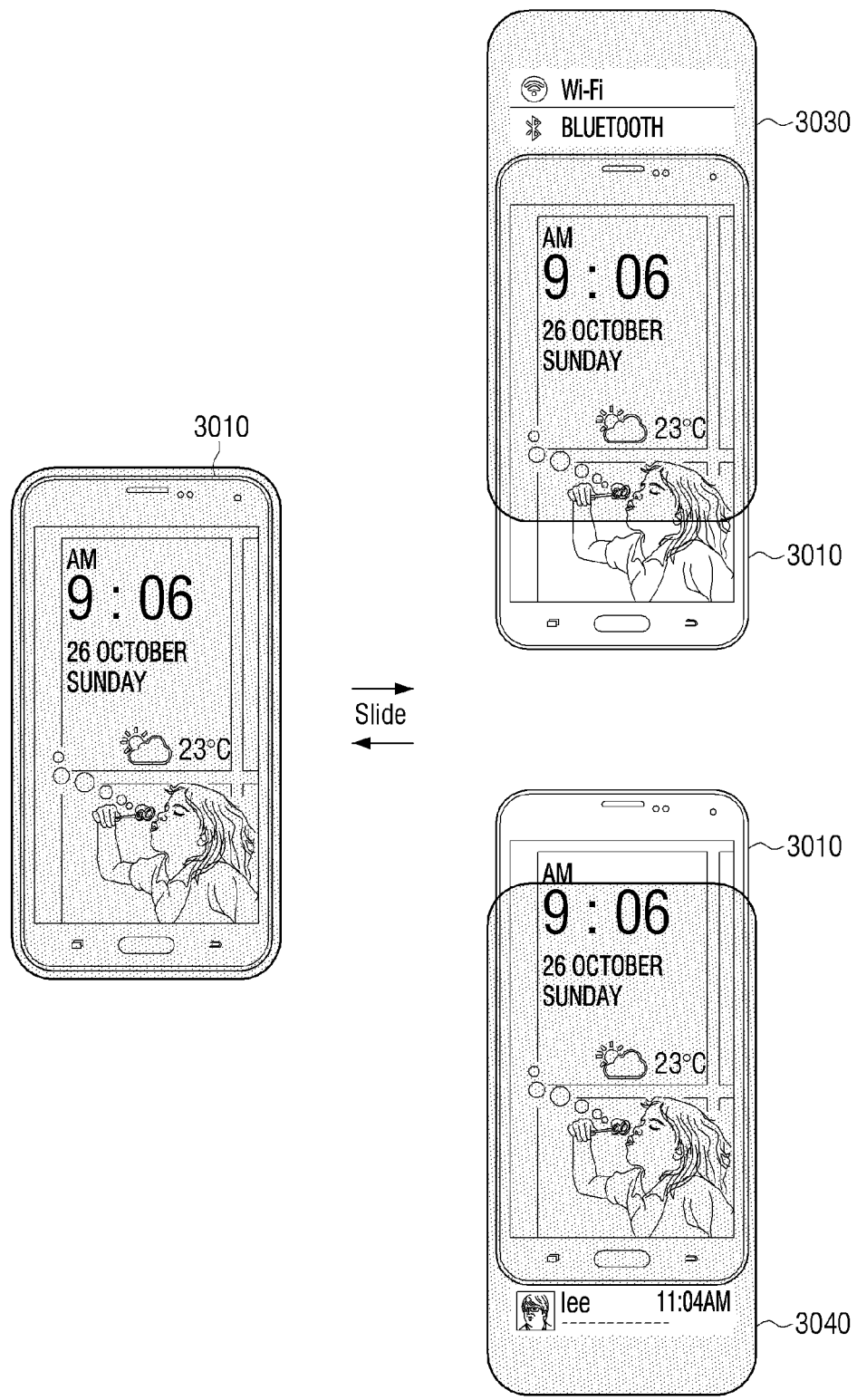

FIGS. 29 and 30 are diagrams for describing an interaction when a second touch screen may move upward or downward based on a first touch screen according to an embodiment of the present disclosure.

Referring to FIGS. 29 and 30, when two touch screens overlay each other, a first touch screen 2910 may display a UI element 3010 corresponding to the existing operation of the user. In this case, when the user scrolls the second touch screen upward, a sub menu UI 3030 associated with a control setting (for example, notice associated with system, setting, etc.) may be displayed on a second touch screen 2920. On the contrary, when the user scrolls the second touch screen downward, a sub menu UI 3040 associated with a personal message display may be displayed on a second touch screen 2930.

Figure 31A:
Figure 31B:

FIGS. 31A and 31B are diagrams for describing an interaction when a second touch screen may move left and right relative to a first touch screen according to an embodiment of the present disclosure.

Referring to FIGS. 31A and 31B, when the two touch screens overlay each other, a first touch screen 3110 may display a UI element corresponding to the existing operation of the user. In this case, when the user scrolls a second touch screen left, menus of the corresponding application may be displayed on a second touch screen 3120. On the contrary, when the user scrolls the second touch screen right, a sub menu UI associated with contacts may be displayed on a second touch screen 3130.

Although it is described above that different information is displayed as the first touch screen and the second touch screen are unfolded from each other, upon implementation, it is possible to extendedly display the same application information. The example will be described below with reference to FIGS. 32 to 35.

FIGS. 32, 33, 34, and 35 are diagrams for describing a UI extension function according to an embodiment of the present disclosure.

Figure 32:
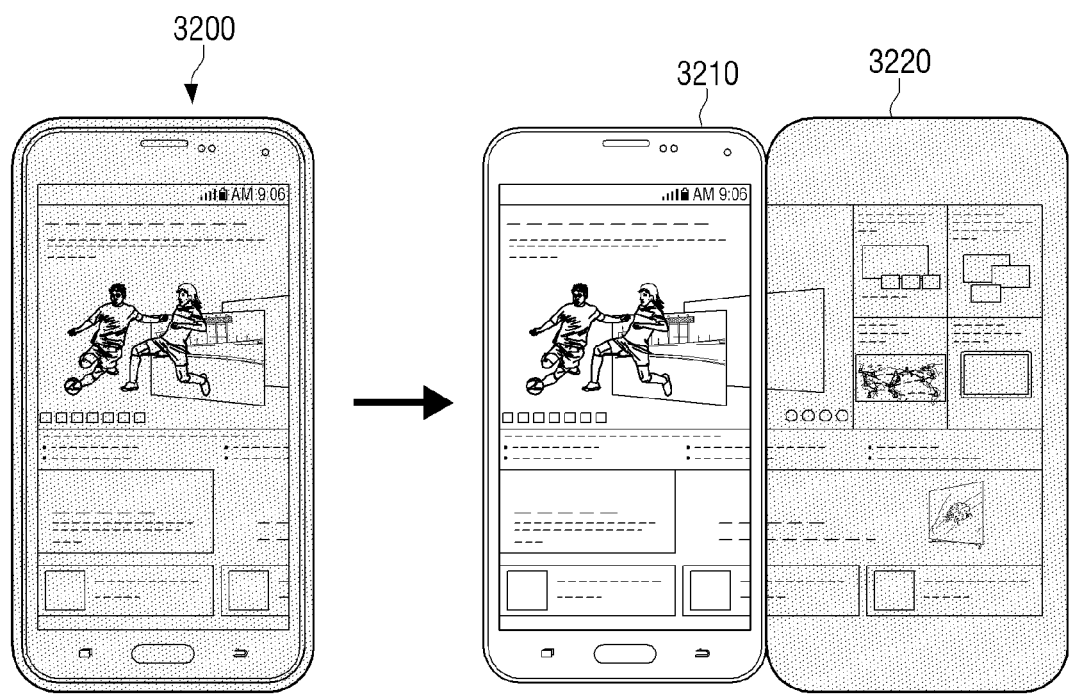
FIGS. 32, 33, 34, and 35 are diagrams for describing a user interface (UI) extension function according to various embodiments of the present disclosure.

Referring to FIG. 32, a second touch screen is disposed to be overlaid on a first touch screen as shown at 3200. In this case, the second touch screen does not display a separate UI element and the first touch screen may display a specific web page as the UI element. Meanwhile, the displayed web page is a web page which is extended in a horizontal direction or the current first touch screen 110 crops only some area of the web page and is displaying the area.

In this case, if the user performs a movement (for example, a sliding) of the form that the second touch screen is unfolded, the control unit 140 may display the UI element displayed on the first touch screen on both of a first touch screen 3210 and a second touch screen 3220.

Therefore, the user may see more information displayed at one time.

Figure 33:
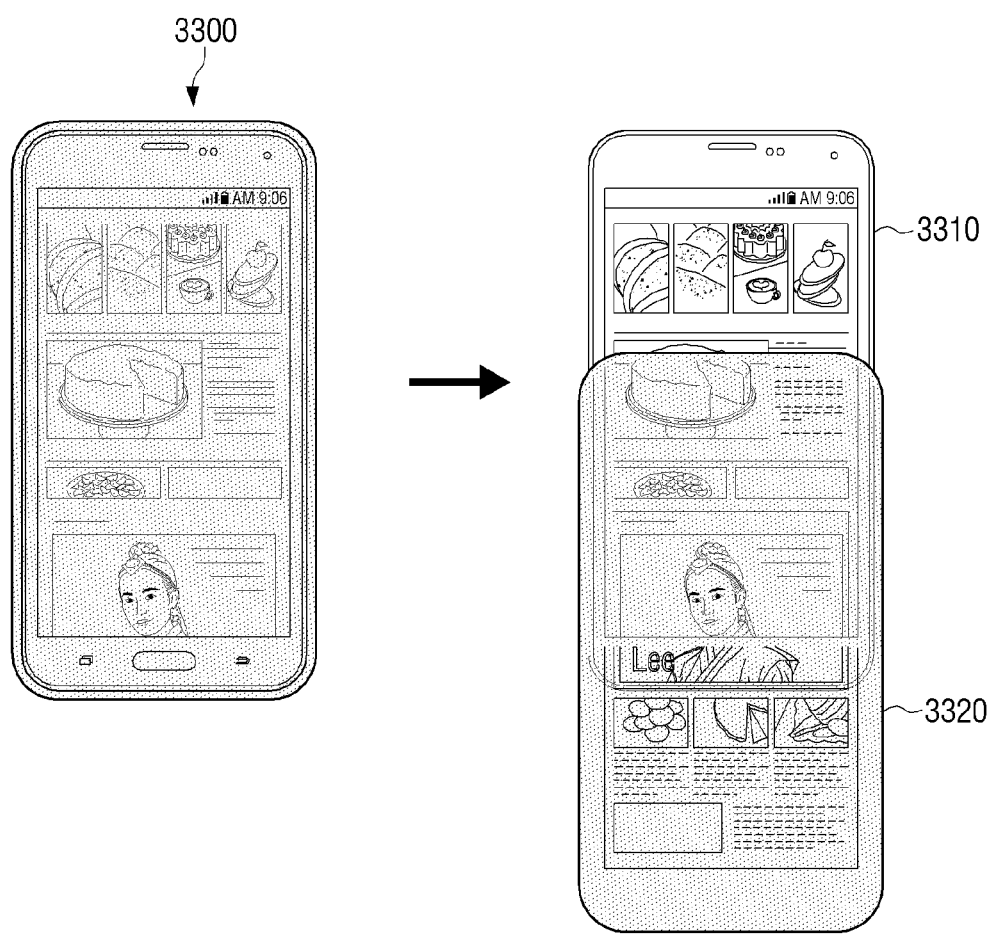

Referring to FIG. 33, a second touch screen is disposed to be overlaid on a first touch screen as shown at 3300. In this case, the second touch screen does not display a separate UI element and the first touch screen may display a specific web page as the UI element. Meanwhile, the web page is a web page which requires upper and lower moving scrolls.

In this case, if the user performs a movement (for example, a sliding downward) of the form that the second touch screen is unfolded, the control unit 140 may display the UI element displayed on the first touch screen on both of a first touch screen 3310 and a second touch screen 3320.

Meanwhile, as illustrated in FIG. 33, the two touch screens may be implemented to display the same UI element, display only the first touch screen, or display only the second touch screen, for the area in which the first touch screen and the second touch screen overlay each other. The selection may be made by the user setting or may be set as a default in one form in which the user legibility is better.

Figure 34:
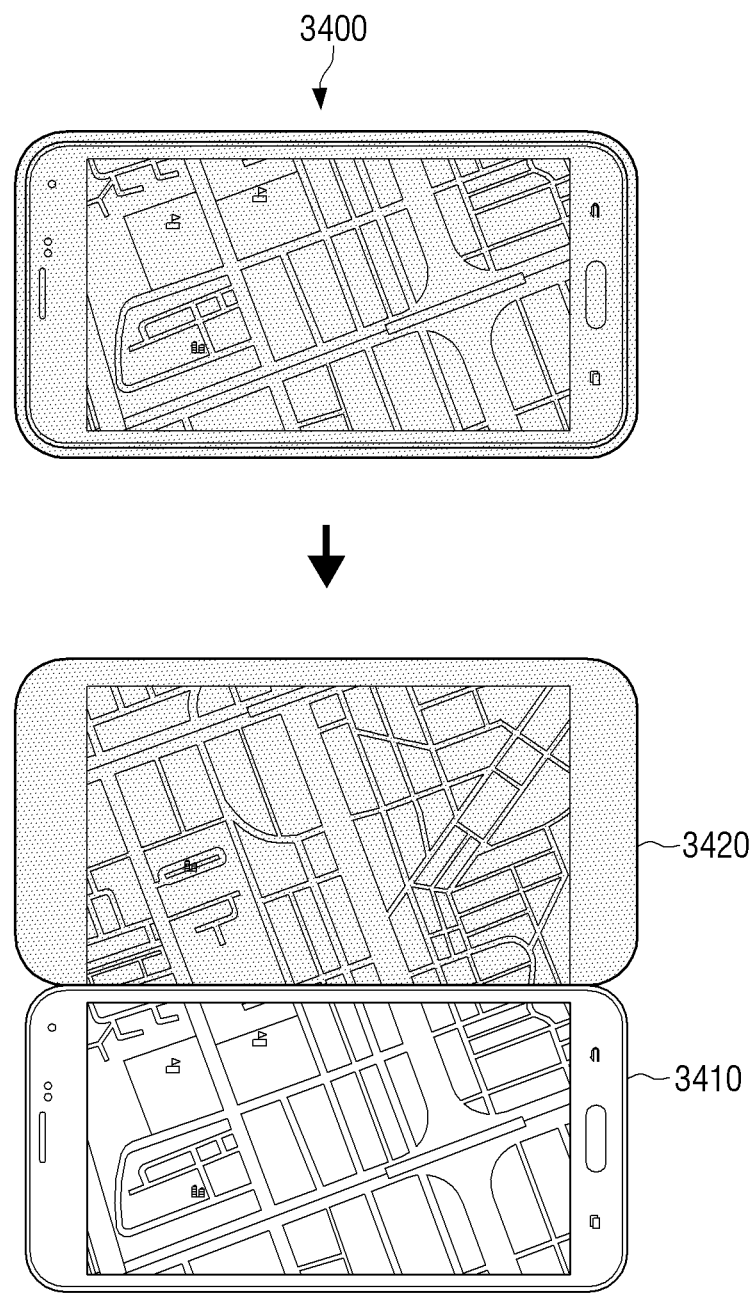

Referring to FIG. 34, a second touch screen is disposed to be overlaid on a first touch screen as shown at 3400. In this case, the second touch screen does not display a separate UI element and the first touch screen may display a map as a UI element.

In this case, if the user performs a movement (for example, a sliding downward) of the form that the second touch screen is unfolded, the control unit 140 may display a map displayed on the first touch screen on both of a first touch screen 3410 and a second touch screen 3420.

Figure 35:
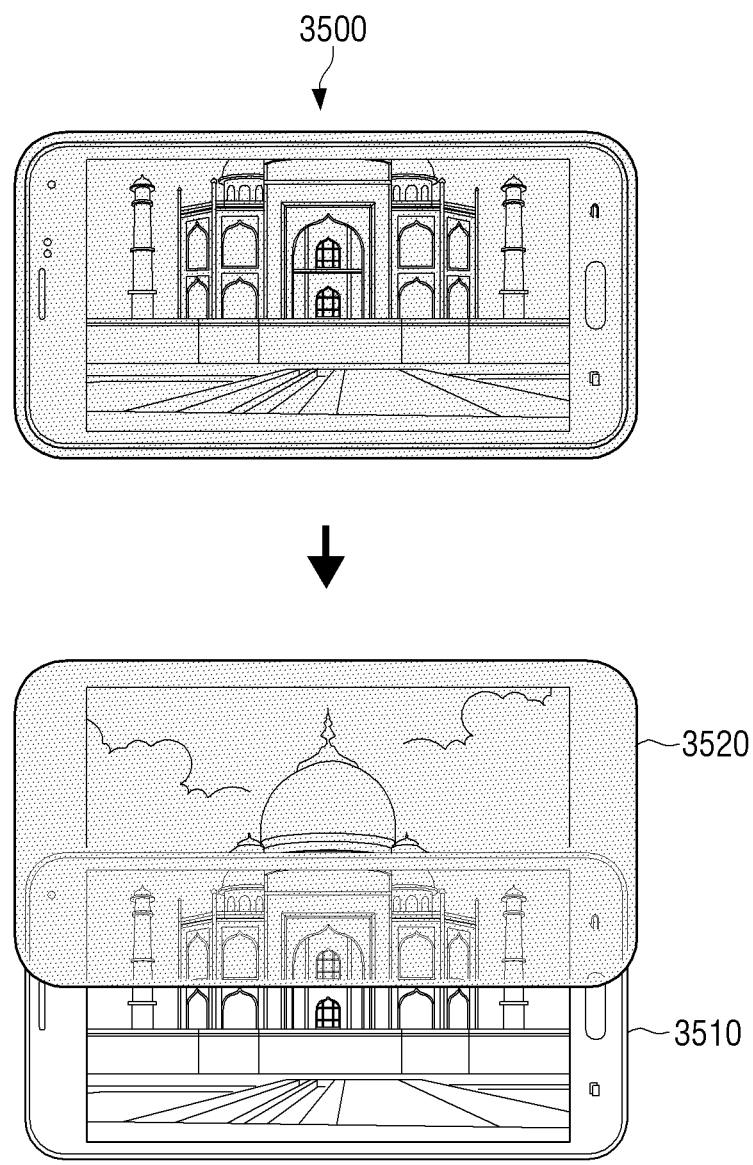

Referring to FIG. 35, a second touch screen is disposed to be overlaid on a first touch screen as shown at 3500. In this case, the second touch screen does not display a separate UI element and the first touch screen may display some area of a photograph image as a UI element.

In this case, if the user performs a movement (for example, a sliding downward) of the form that the second touch screen is unfolded, the control unit 140 may display a photograph image displayed on the first touch screen on both of a first touch screen 3510 and a second touch screen 3520.

Figure 36:
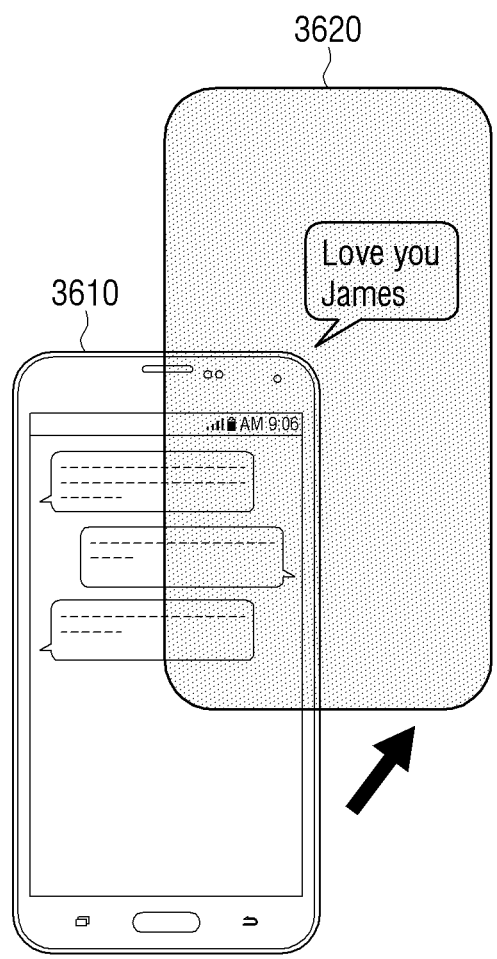
FIGS. 36, 37, and 38 are diagrams for describing various sliding schemes of the second touch screen according to various embodiments of the present disclosure.
Figure 37:
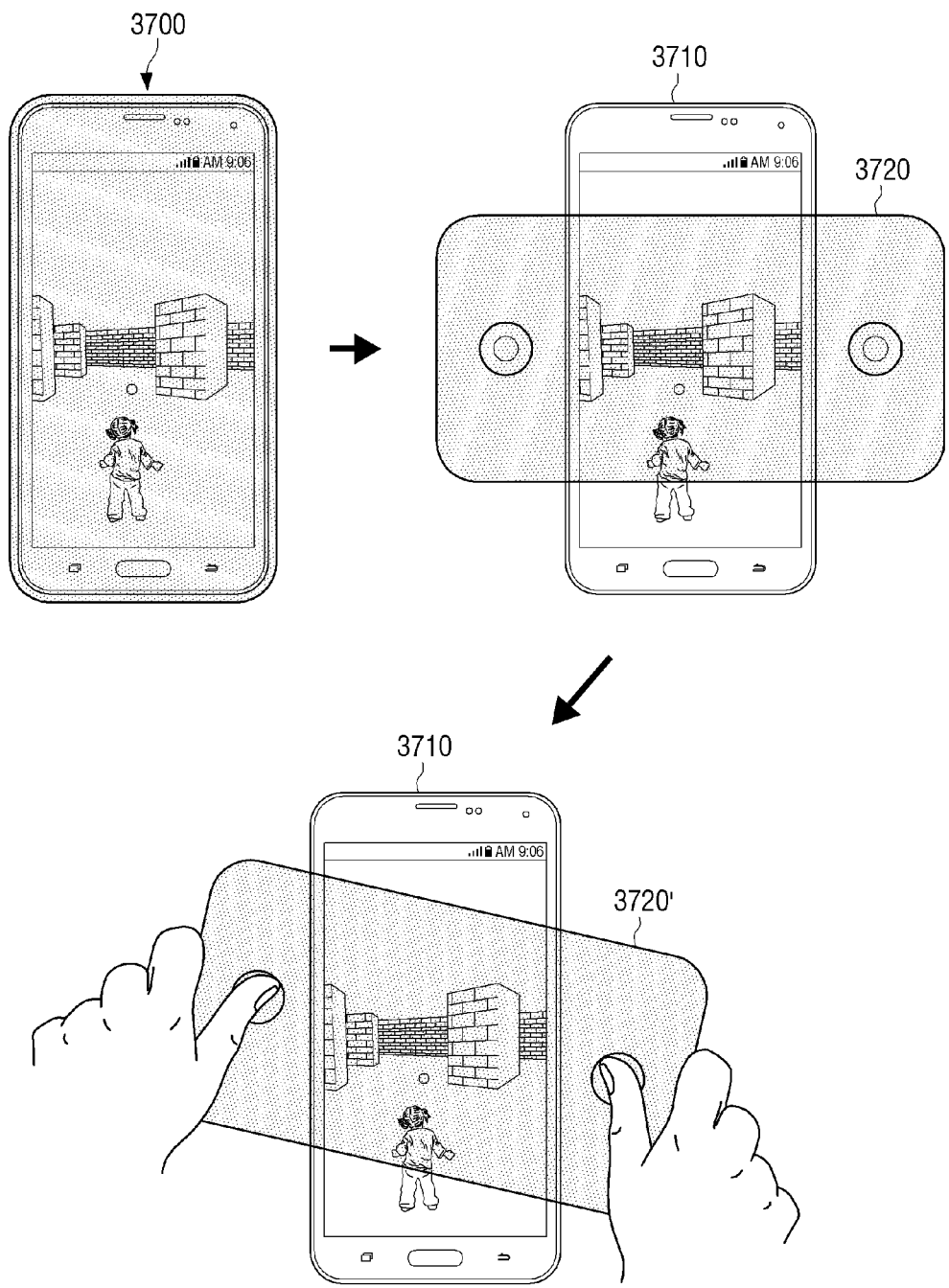
Figure 38:
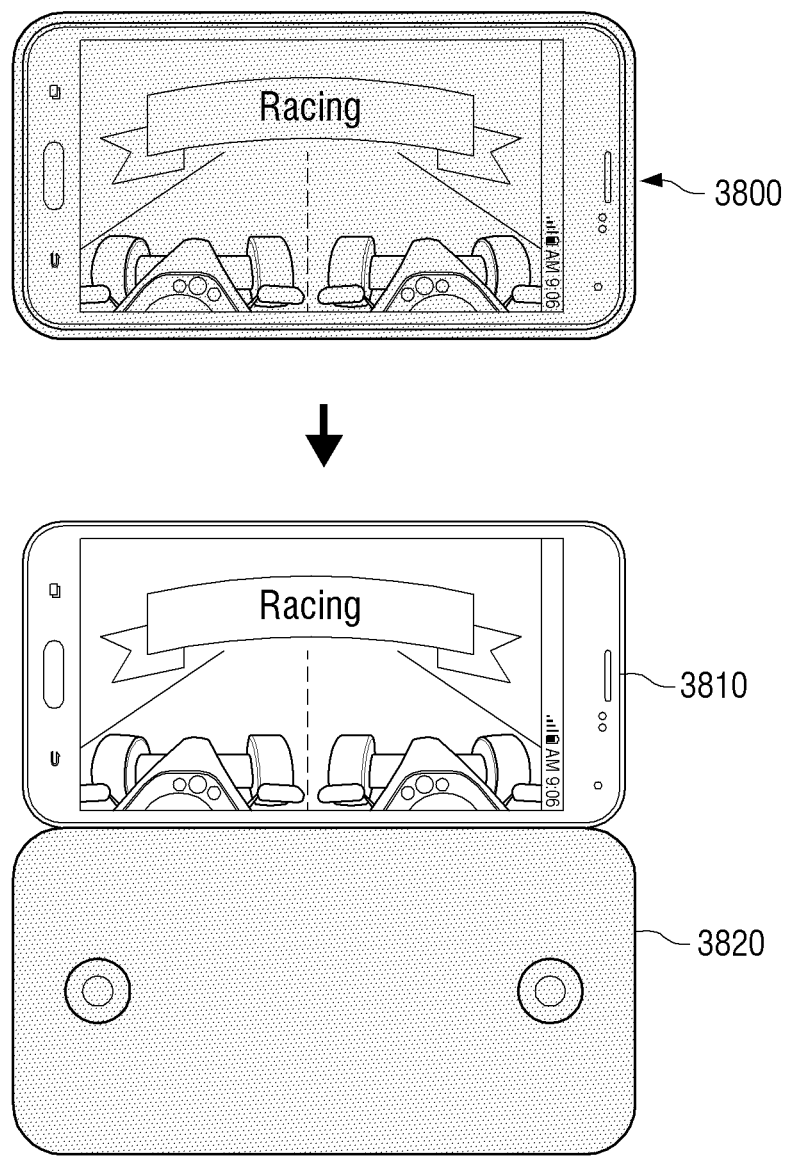

FIGS. 36, 37, and 38 are diagrams for describing various sliding schemes of a second touch screen according to an embodiment of the present disclosure.

Referring to FIG. 36, a second touch screen 3620 may be slid in a diagonal direction based on a first touch screen 3610. The second touch screen 3620 may display a hidden message as a UI element depending on the sliding.

Referring to FIG. 37, a second touch screen is disposed to be overlaid on a first touch screen as shown at 3700. The second touch screen 3720 may rotate based on a central area of the first touch screen 3710. The second touch screen 3720 displays a UI element receiving a user operation depending on the movement and the user may perform various interactions using the touch operation on the second touch screen and a rotation of a second touch screen 3720'.

Referring to FIG. 38, a second touch screen is disposed to be overlaid on a first touch screen as shown at 3800. The second touch screen 3820 may be slid downward based on the first touch screen 3810. Further, when the first touch screen 3810 is displaying a UI corresponding to a game application, the second touch screen 3820 may display an operation UI for operating the corresponding game.

Figure 39:
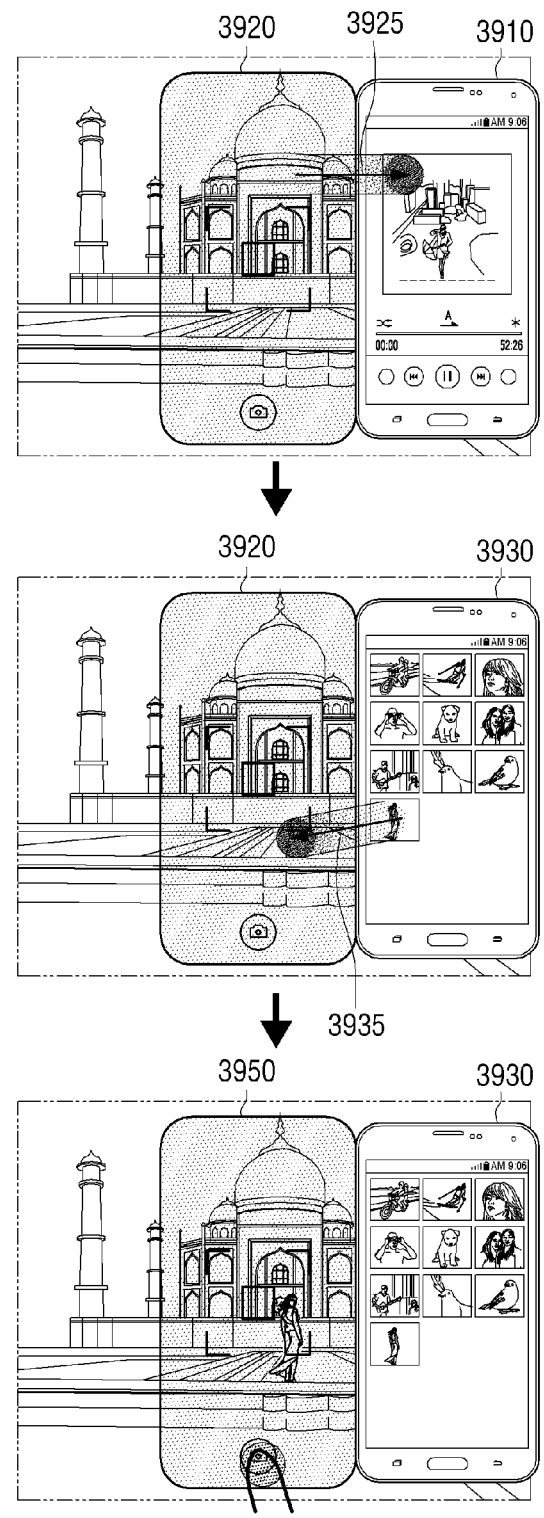
FIG. 39 is a diagram for describing an example of an interaction scheme in a state in which a first touch screen and a second touch screen are unfolded from each other according to an embodiment of the present disclosure.

FIG. 39 is a diagram for describing an example of an interaction scheme in a state in which a first touch screen and a second touch screen are unfolded from each other according to an embodiment of the present disclosure.

Referring to FIG. 39, a first touch screen 3910 may display a UI element associated with music playing and a second touch screen 3920 may display a UI element associated with photographing.

In the disposition state, if the user inputs a touch gesture 3925 ending on the first touch screen 3910 from the second touch screen 3920, the control unit 140 may control a first touch screen 3930 to display a sub screen associated with photographing. For example, the thumbnail of the previously photographed image may be displayed.

In this case, if the user again inputs a touch gesture 3935 ending on the second touch screen 3920 from a specific area of the first touch screen 3930, the control unit 140 may control a second touch screen 3950 to display an image corresponding to a thumbnail at a user touch start point on a final position of the corresponding touch gesture 3935.

In this case, if the user inputs a photographing command, the control unit 140 may compose the image corresponding to the user pre-selected thumbnail with the photographed image to generate image products confirmed by the user through the second touch screen 3950.

Figure 40:
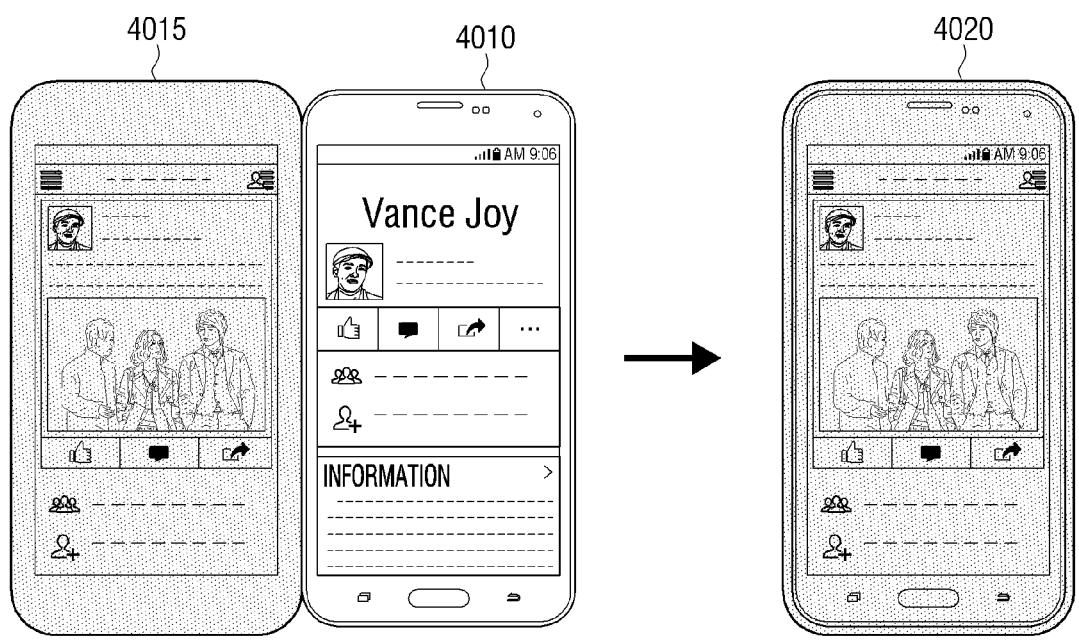
FIGS. 40, 41, and 42 are diagrams for describing an example of an interaction scheme in a state in which a first touch screen and a second touch screen are unfolded from each other according to various embodiments of the present disclosure.
Figure 41:
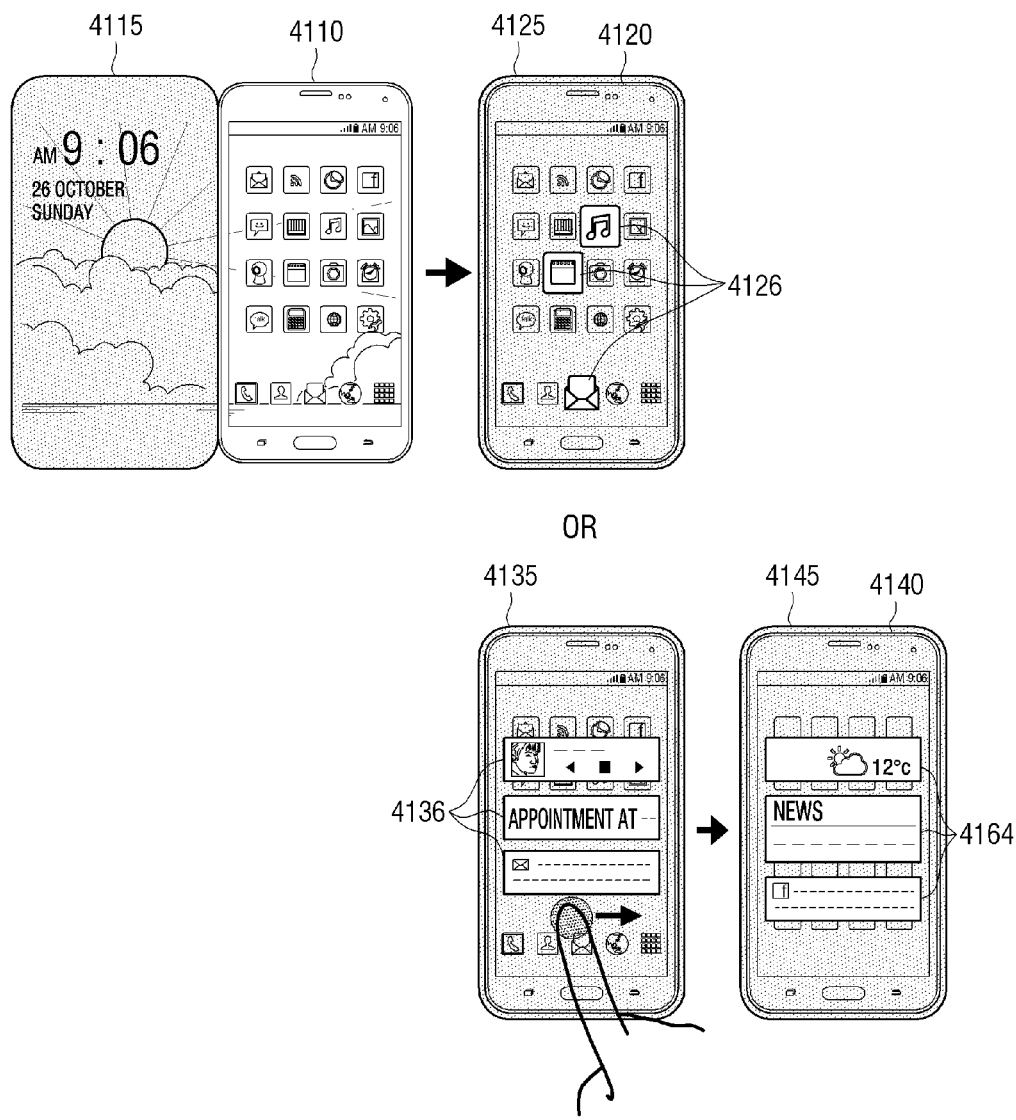
Figure 42:
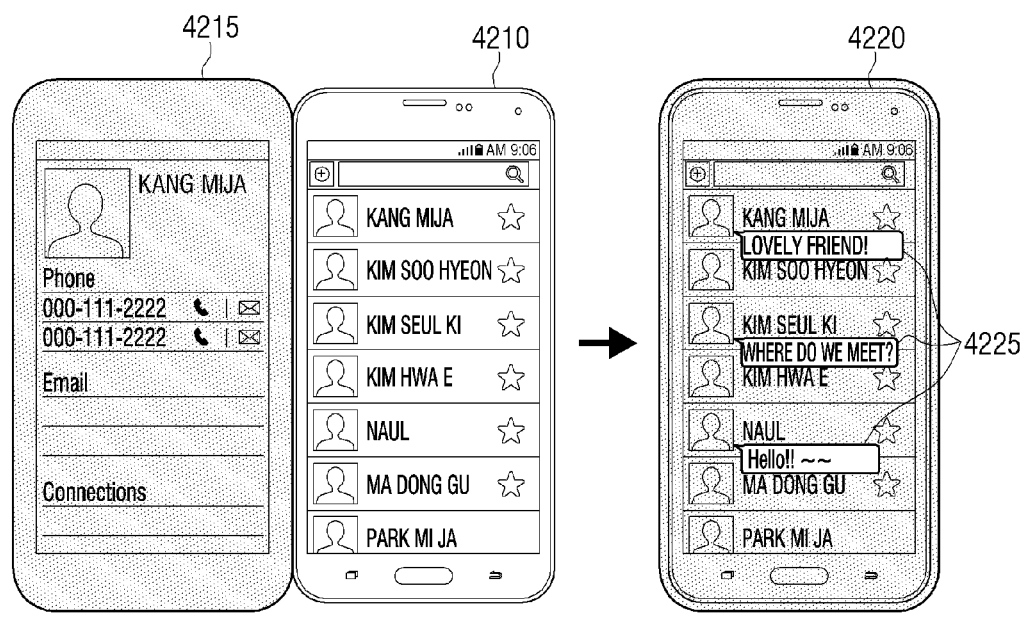

FIGS. 40, 41, and 42 are diagrams for describing an example of an interaction scheme in a state in which a first touch screen and a second touch screen are unfolded from each other according to an embodiment of the present disclosure.

Referring to FIG. 40, a first touch screen 4010 may display a UI element associated with music playing and a second touch screen 4015 may display a UI element associated with internet surfing.

In the disposition state, if the user wants to continuously use contents on the second touch screen 4015, he/she may perform a long touch on the second touch screen 4015 for a predetermined time or more and then overlay the two touch screens on each other. When it is sensed that the two touch screens overlay each other after the long touch, the control unit 140 may control the UI element which is displayed on the second touch screen to be displayed on a first touch screen 4020 and the second touch screen to stop the display operation.

Referring to FIG. 41, a first touch screen 4110 displays a first home screen and a second touch screen 4115 may display a second home screen.

In the disposition state, when the user overlays the two touch screens, the first touch screen 4120 may continuously display the same first home screen and a second touch screen 4125 may discriminately display that an icon having a notice among icons 4126 displayed on the first home screen is present. For example, the second touch screen 4125 may extendedly display the icon, display in other colors or display a pre-registered new icon.

Alternatively, when the two touch screens overlay each other, a notice message 4136 of an application on the first home screen may be displayed or widgets of the corresponding application may be displayed on the second touch screen 4135.

If the user performs left/right scrolls on the second touch screen, the first touch screen 4140 may display a home screen changed corresponding to the scroll and the second touch screen 4145 may display a notice message or a widget window 4164 corresponding to the changed home screen.

Referring to FIG. 42, a first touch screen 4210 may display an address book and a second touch screen 4215 may display information on a specified person.

In the disposition state, if the user overlays the two touch screens, a first touch screen 4220 may continuously display the same address book and the second touch screen may display additional information 4225 on persons shown in the address book. For example, the message or the SNS information received from a specified person may be displayed.

Figure 43:
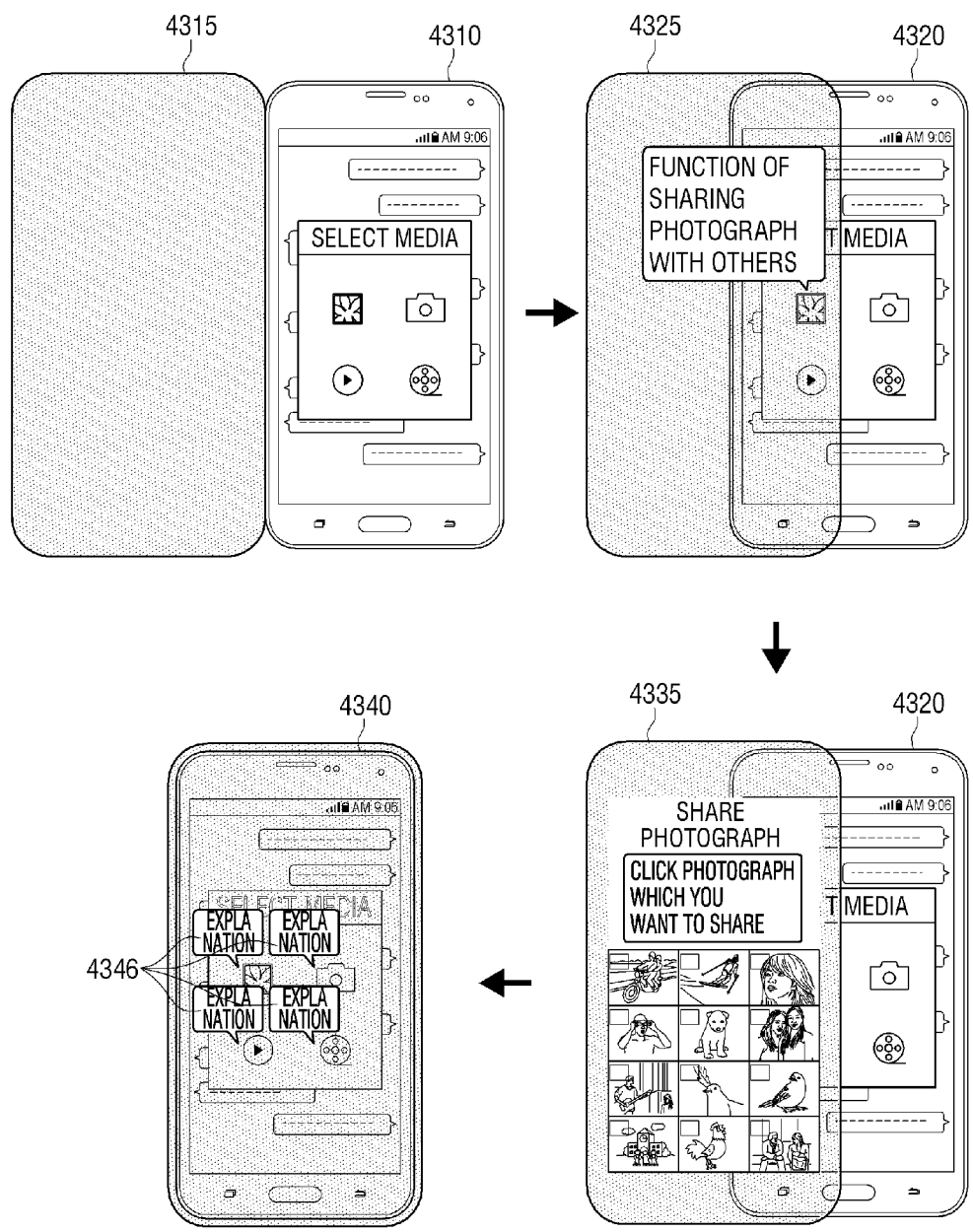
FIG. 43 is a diagram for describing an example of a second touch screen used as a manual providing function according to an embodiment of the present disclosure.

FIG. 43 is a diagram for describing an example of a second touch screen used as a manual providing function according to an embodiment of the present disclosure.

Referring to FIG. 43, a first touch screen 4310 and a second touch screen 4315 are unfolded from each other. In this case, if the user requests a manual function, the second touch screen 4315 may display information for describing a UI element displayed on the first touch screen 4310. For example, if the second touch screen is overlaid on the first touch screen 4320, the description on the UI element of the first touch screen displayed on the overlaid area may be displayed on a second touch screen 4325.

If the user selects the corresponding UI elements, information associated with a procedure required after the user selects the corresponding UI element may be displayed on a second touch screen 4335.

Meanwhile, if the first touch screen overlays the second touch screen, the second touch screen 4340 may display an icon 4346 displaying that there is a description corresponding to a function menu on the first touch screen. If the user selects the icon displayed on the second touch screen, the control unit 140 may display manual information corresponding to the corresponding icon on the second touch screen.

Figure 44:
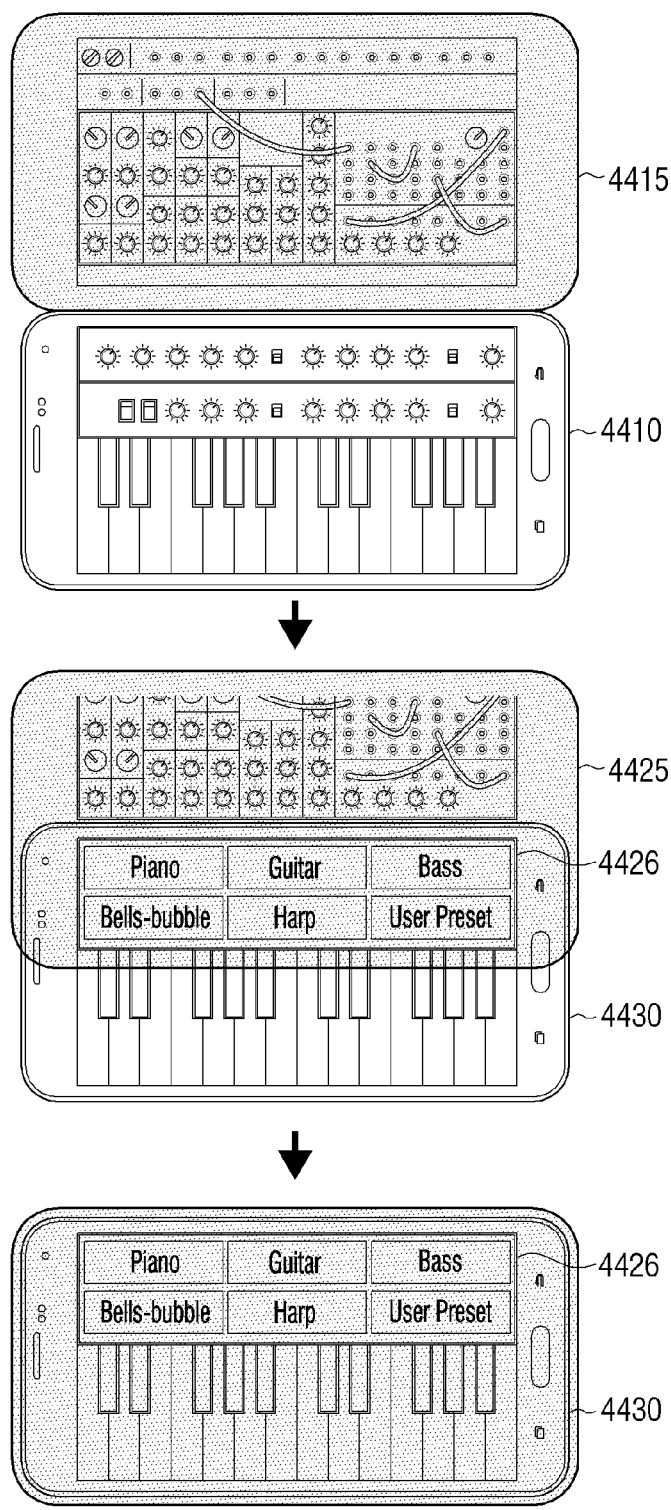
FIGS. 44 and 45 are diagrams for describing an interaction operation depending on how much two touch screens overlay each other according to various embodiments of the present disclosure.
Figure 45:
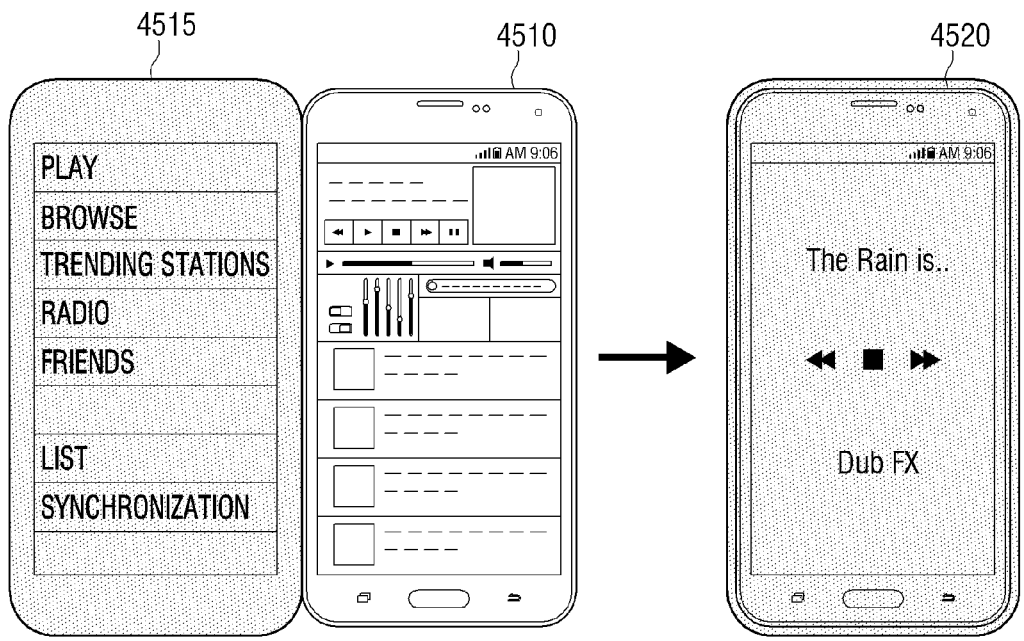

FIGS. 44 and 45 are diagrams for describing an interaction operation depending on how much two touch screens overlay each other according to an embodiment of the present disclosure.

Referring to FIG. 44, when a first touch screen 4410 and a second touch screen 4415 are unfolded from each other, the first touch screen 4410 may display a UI element associated with piano performance. Further, the second touch screen 4415 may display a UI element of a professional synthesizer function.

In this case, if a first touch screen 4430 and a second touch screen 4425 overlay each other, a UI element 4426 for an easy mode selection to play performance only by a preset timbre may be displayed in the overlaid two areas. The UI element 4426 may be displayed on the first touch screen 4430, may be displayed on the second touch screen 4425, and may commonly be displayed on the two touch screens.

Meanwhile, if the two touch screens completely overlay each other, a UI element associated with piano performance and only the UI element for the easy mode selection may be displayed on the first touch screen.

Referring to FIG. 45, when a first touch screen 4510 and a second touch screen 4515 are unfolded from each other, a category list associated with music playing and synthesizer information may be displayed on the first touch screen 4510 and a menu associated with music playing may be displayed on the second touch screen 4515.

Meanwhile, if the user overlaps the two touch screens, the control unit 140 displays an simple UI element 4520 on the first touch screen and may control the second touch screen to stop the display operation.

Figure 46:
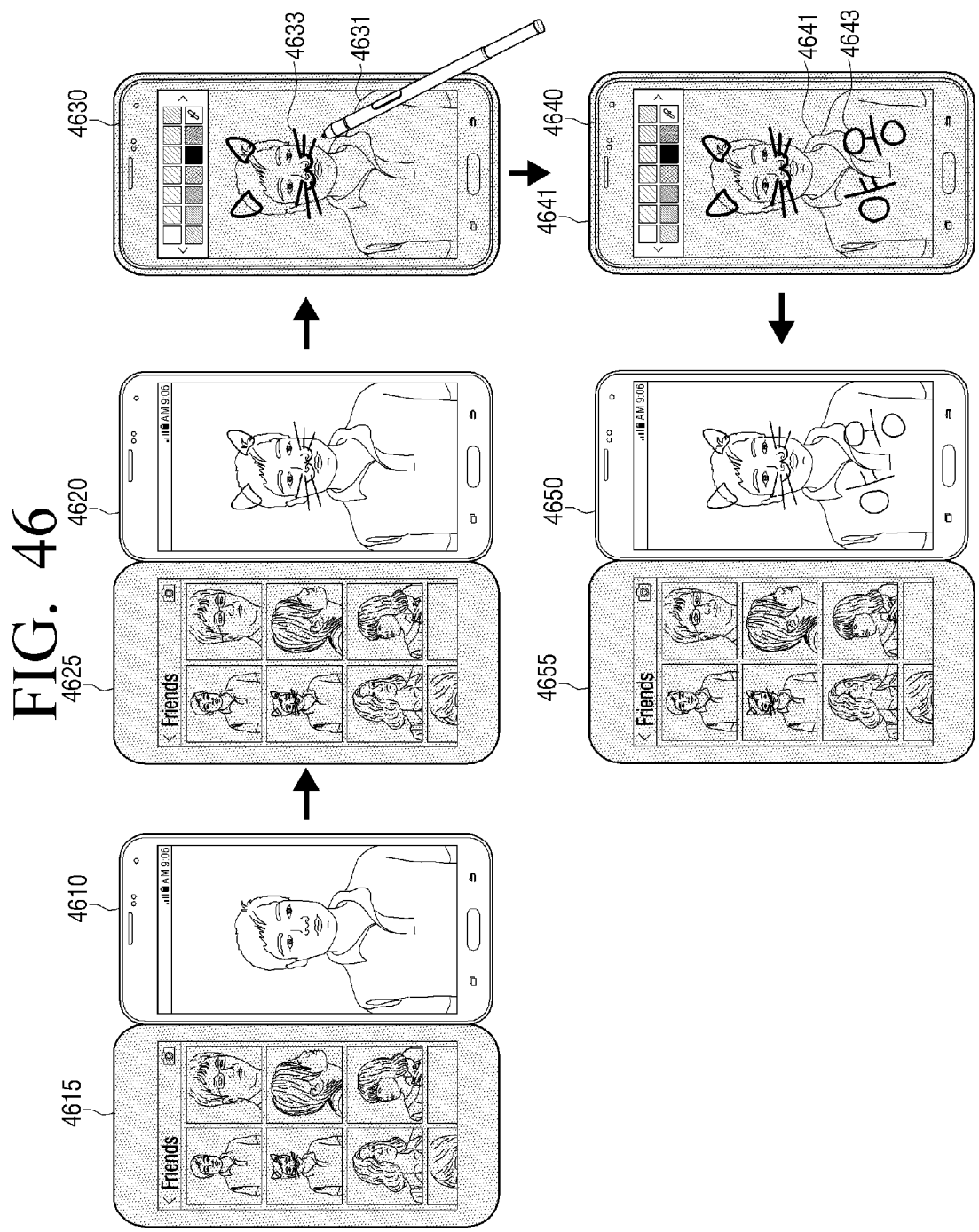
FIG. 46 is a diagram for describing an example of a second touch screen used as an editing layout layer according to an embodiment of the present disclosure.

FIG. 46 is a diagram for describing an example of a second touch screen used as an editing layout layer according to an embodiment of the present disclosure.

Referring to FIG. 46, when a first touch screen 4610 and a second touch screen 4615 are unfolded from each other, the first touch screen 4610 may display a specific image and the second touch screen 4615 may display a thumbnail of the pre-stored image.

In this case, if the user selects a specific thumbnail on a second touch screen 4625, a first touch screen 4620 may display an image corresponding to the selected thumbnail.

In this case, if the user overlaps the two touch screens, the control unit 140 may perform a control to display an image 4630 and a menu window for image editing on the first touch screen. Meanwhile, when the pre-selected image is an image divided into a plurality of layers 4640, 4641, for example, an image in which a user scribbles on an image captured by a camera, an actually captured image 4631, 4641 may be displayed on the first touch screen and graffiti 4633, 4643 of the user may be displayed on the second touch screen.

Therefore, the user may more easily modify and add only the scribbled portion.

If the user again unfolds the two touch screens after the modification, the graffiti by the user and the image may be displayed on a first touch screen 4650 while being composed and a thumbnail list may be displayed on a second touch screen 4655.

Figure 47:
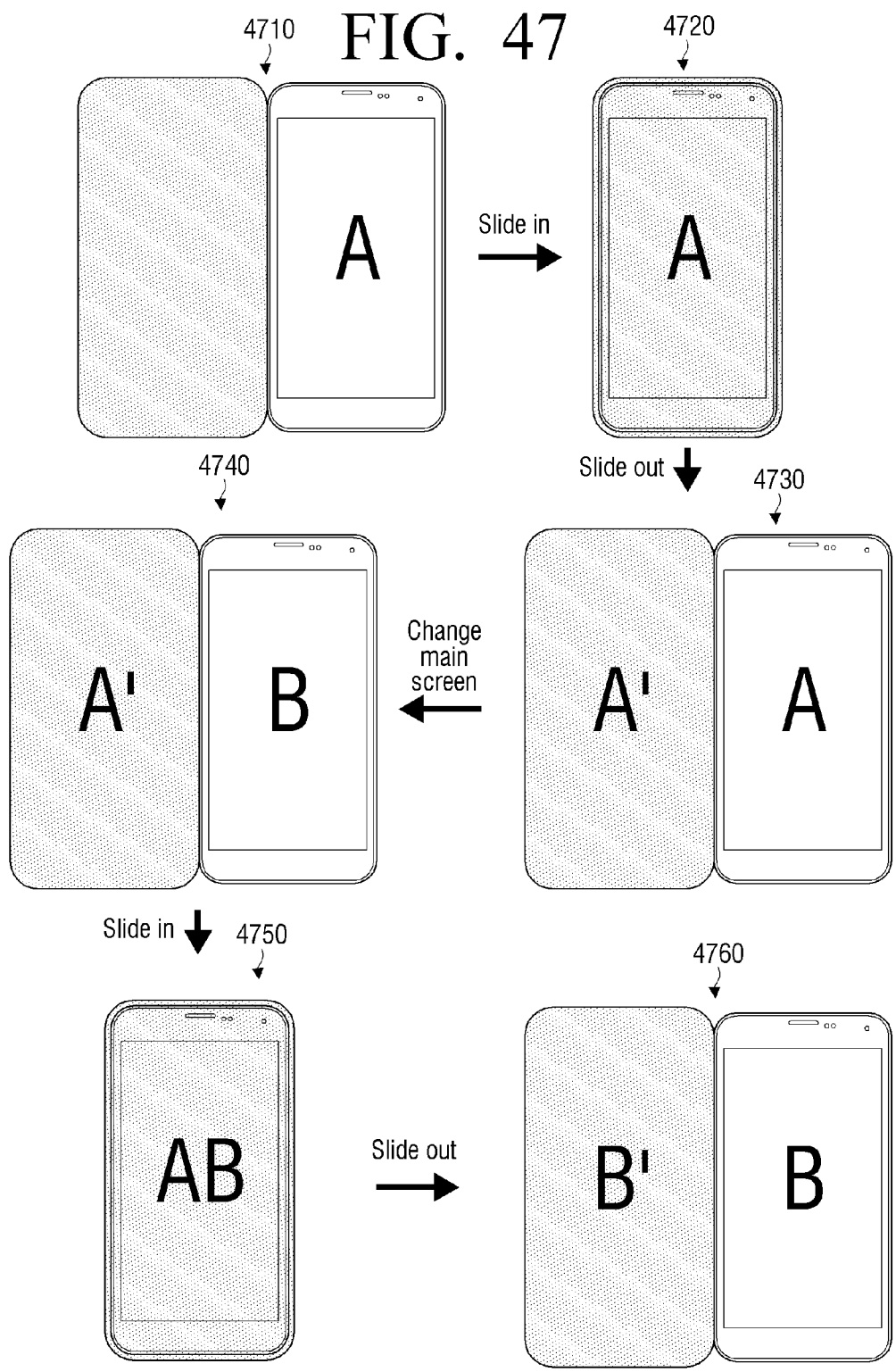

FIGS. 47 and 48 are diagrams for describing a bookmarking interaction according to an embodiment of the present disclosure.

Referring to FIG. 47, a first touch screen 4710 may display the home screen while the two touch screens are unfolded from each other. In this state, if the user continuously overlaps the two touch screens on each other and then unfolds the two touch screens, the first touch screen 4720 may continuously display the same home screen but the second touch screen 4730 may copy the screen which is displayed on the first touch screen 4720 and display the screen. Next, if the user changes a UI screen by an operation of a first touch screen 4740 and the first and second touch screens continuously overlay each other as shown at 4750 and are unfolded from each other again in that state, a second touch screen 4760 may copy a screen of the changed first touch screen 4740 and display the screen.

The operation may be variously used depending on what the UI element which is displayed on the first touch screen is and in the case of a drawing image, the operation may be used to store into a clipboard, capture a screen, or perform copying and, in the case of a web page, the operation may be used to bookmark the corresponding web page. If the bookmark is formed by the above process, as illustrated in FIG. 48, a pre-stored bookmark is displayed on a second touch screen 4810, unfolded from a first touch screen 4820 and the user may select any one of the plurality of UI elements displayed on a second touch screen 4830 to quickly access the specific web page by a bookmark displayed on a first touch screen 4840.

Figure 49:
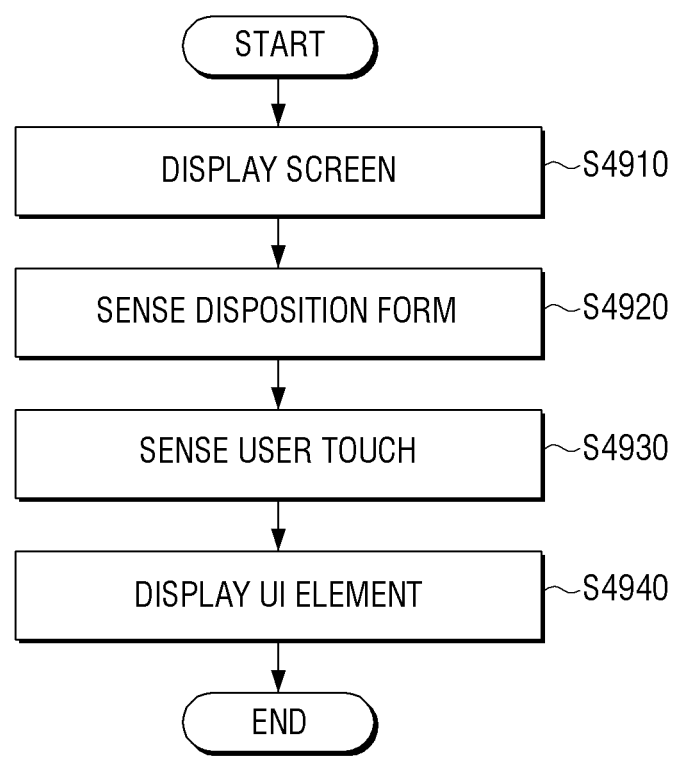
FIG. 49 is a flowchart for describing a controlling method of a display apparatus according to an embodiment of the present disclosure.

FIG. 49 is a flowchart for describing a controlling method of a display apparatus according to an embodiment of the present disclosure.

Referring to FIG. 49, a screen may be displayed on a first touch screen at operation S4910. In more detail, a UI element corresponding to a control command of a user may be displayed on the first touch screen.

The disposition form of the first touch screen and the second touch screen is sensed at operation S4920. In more detail, it may be sensed whether the two touch screens are disposed while being overlaid with each other or disposed while being unfolded by using sensors such as an angle sensor and a hall sensor which may sense a magnetic flux.

At operation S4930, a user touch is sensed. At operation S4940, the UI element corresponding to the sensed user touch may be displayed on at least one of the first touch screen and the second touch screen depending on the disposition form of the two sensed touch screens. In more detail, if a touch gesture is sensed on the second touch screen while the two touch screens overlay each other, the UI element corresponding to the touch gesture may be displayed on the first touch screen. Meanwhile, when the user touches the area in which the corresponding UI element is displayed while the UI element is displayed on the second touch screen, a new UI element corresponding to the UI element may be displayed on the first touch screen.

Further, for the touch gesture on the first touch screen while the two touch screens are unfolded from each other, the UI element corresponding to the touch gesture may be displayed on the first touch screen and for the touch gesture on the second touch screen, the UI element corresponding to the corresponding touch gesture may be displayed on the second touch screen. Meanwhile, when the touch gesture crossing the two touch screens is sensed while the two touch screens are unfolded from each other, the screen of the touch screen on which the final touch gesture ends may be changed. For example, when the touch gesture ending on the second touch screen from the first touch screen is sensed, a new UI element corresponding to the UI element displayed on the first touch screen may be displayed on the second touch screen.

As described above, a controlling method according to an embodiment of the present disclosure may provide various information to the user using the two touch screens and may provide various interactions depending on the disposition form of the two touch screens, and whether the disposition form thereof is changed by the touch gesture, etc., such that the user may experience various user environments.

Meanwhile, a controlling method of the display apparatus according to various embodiments of the present disclosure may be implemented as a program and may be provided to the display apparatus. Particularly, a program including the controlling method for the display apparatus may be stored and provided in a non-transitory computer readable medium.

The non-transitory computer readable medium is not a medium that stores data therein for a while, such as a register, a cache, a memory, or the like, but means a medium that semi-permanently stores data therein and is readable by a device. In more detail, various applications or programs described above may be stored and provided in the non-transitory computer readable medium such as a compact disc (CD), a digital versatile disc (DVD), a hard disk, a Blu-ray disk, a USB, a memory card, and a ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
   a first touch screen;
   a second touch screen capable of being slid on the first touch screen, wherein the second touch screen is configured to be slid out from the first touch screen, in plural directions, in a state in which the second touch screen overlays the first touch screen and is configured to project a screen on the first touch screen when the second touch screen overlays the first touch screen;

a sensor configured to sense a disposition form of the first touch screen and the second touch screen; and a processor configured to:
control the first touch screen to display a user interface (UI) element,
in response to the second touch screen being slid out from the first touch screen in a first direction, control the second touch screen to display a first information, and
in response to the second touch screen being slid out from the first touch screen in a second direction different from the first direction, control the second touch screen to display a second information different from the first information.

2. The display apparatus as claimed in claim 1, wherein the processor is further configured to display the UI element corresponding to a user touch received from the second touch screen on the first touch screen in a state in which the second touch screen overlays the first touch screen.

3. The display apparatus as claimed in claim 1, wherein the processor is further configured to display a new UI element on the second touch screen when the second touch screen is slid out from the first touch screen, in a state in which a user touch on the second touch screen is sensed.

4. The display apparatus as claimed in claim 3, wherein the new UI element displayed on the second touch screen corresponds to the UI element displayed on the first touch screen projected to a user touched area on the second touch screen.

5. The display apparatus as claimed in claim 3, wherein the new UI element displayed on the second touch screen includes notice information corresponding to a notification displayed on the first touch screen.

6. The display apparatus as claimed in claim 1,
wherein, if the UI element is a menu, the first or second information is a submenu of the menu,
wherein, if the UI element is brief information, the first or second information is detailed information including the brief information,
wherein, if the UI element is a hyperlink UI element, the first or second information is information linked to the hyperlink UI element, and
wherein, if the UI element is a UI element informing reception of a message, the first or second information is the message.

7. The display apparatus as claimed in claim 1, wherein the processor is further configured to extend the UI element displayed on the first touch screen to be displayed on the first touch screen and the second touch screen, when the second touch screen is slid out from the first touch screen, in a state in which a user touch on the second touch screen is not sensed.

8. The display apparatus as claimed in claim 1, wherein the processor is further configured to perform an event corresponding to the UI element displayed on the first touch screen when the disposition form of the second touch screen is continuously changed within a preset time.

9. The display apparatus as claimed in claim 8, wherein the event includes a bookmark or a capture of a webpage displayed on the first touch screen.

10. The display apparatus as claimed in claim 1, wherein the processor is further configured to control the second touch screen to display a new UI element having a size that changes depending on how much the first touch screen and the second touch screen overlay each other.

11. The display apparatus as claimed in claim 1, wherein the processor is further configured to:

display a UI element displayed on the second touch screen on the first touch screen when the second touch screen overlays the first touch screen with a user touch on the second touch screen, and
display the UI element displayed on the first touch screen on the first touch screen when the second touch screen overlays the first touch screen without the user touch on the second touch screen.

12. The display apparatus as claimed in claim 1, wherein the processor is further configured to when the second touch screen overlays the first touch screen without a user touch of the second touch screen, change the UI element displayed on the second touch screen to a new UI element corresponding to the UI element displayed on the first touch screen, while keeping the UI element displayed on the first touch screen.

13. A method of controlling a display apparatus having a first touch screen and a transparent second touch screen capable of being slid on the first touch screen, wherein the second touch screen is configured to be slid out from the first touch screen, in plural directions, in a state in which the second touch screen overlays the first touch screen, the method comprising:
displaying, by the first touch screen, a user interface (UI) element;
sensing a disposition form of the first touch screen and the second touch screen;
in response to the second touch screen being slid out from the first touch screen in a first direction, displaying, by the second touch screen, a first information; and
in response to the second touch screen being slid out from the first touch screen in a second direction different from the first direction, displaying, by the second touch screen, a second information different from the first information.

14. The method as claimed in claim 13, further comprising:
displaying the UI element corresponding to a user touch received from the second touch screen on the first touch screen when the second touch screen overlays the first touch screen.

15. The method as claimed in claim 13, further comprising:
displaying a new UI element on the second touch screen when the second touch screen is slid out from the first touch screen, in a state in which a user touch on the second touch screen is sensed.

16. The method as claimed in claim 15, wherein the new UI element displayed on the second touch screen corresponds to the UI element displayed on the first touch screen projected to a user touched area on the second touch screen.

17. The method as claimed in claim 13, further comprising:
extending the UI element displayed on the first touch screen to be displayed on the first touch screen and the second touch screen, when the second touch screen is slid out from the first touch screen, in a state in which a user touch on the second touch screen is not sensed.

18. A non-transitory computer readable recording medium comprising a program for executing a method of controlling a display apparatus having a first touch screen and a transparent second touch screen capable of being slid on the first touch screen, wherein the second touch screen is configured to be slid out from the first touch screen, in plural directions, in a state in which the second touch screen overlays the first touch screen, the method comprising:
controlling the first touch screen to display a user interface (UI) element;

sensing a disposition form of the first touch screen and the second touch screen;

in response to the second touch screen being slid out from the first touch screen in a first direction, controlling the second touch screen to display a first information; and in response to the second touch screen being slid out from the first touch screen in a second direction different from the first direction, controlling the second touch screen to display a second information different from the first information.

* * * * *